United States Patent
Humphries

(10) Patent No.: US 10,701,314 B2
(45) Date of Patent: Jun. 30, 2020

(54) INMATE DEVICE AND USER INTERFACE FOR INMATE INITIATED VIDEO VISITATION SYSTEM

(71) Applicant: HomeWAV, LLC, St. Louis, MO (US)

(72) Inventor: Gary James Humphries, Virginia Beach, VA (US)

(73) Assignee: HomeWAV, LLC, St. Louis, MO (US)

(*) Notice: Subject to any disclaimer, the term of this patent is extended or adjusted under 35 U.S.C. 154(b) by 0 days.

(21) Appl. No.: 16/392,223

(22) Filed: Apr. 23, 2019

(65) Prior Publication Data
US 2019/0297302 A1    Sep. 26, 2019

Related U.S. Application Data

(63) Continuation of application No. 15/788,542, filed on Oct. 19, 2017, now Pat. No. 10,313,632, which is a (Continued)

(51) Int. Cl.
*H04N 7/14* (2006.01)
*H04M 15/00* (2006.01)
(Continued)

(52) U.S. Cl.
CPC ......... *H04N 7/147* (2013.01); *H04L 65/1069* (2013.01); *H04L 65/1076* (2013.01);
(Continued)

(58) Field of Classification Search
None
See application file for complete search history.

(56) References Cited

U.S. PATENT DOCUMENTS 9,094,569 B1 * 7/2015 Humphries .............. H04N 7/14
9,124,763 B2 * 9/2015 Humphries .............. H04N 7/15
(Continued)

*Primary Examiner* — Quoc D Tran
(74) *Attorney, Agent, or Firm* — Armstrong Teasdale LLP

(57) ABSTRACT

A computer-implemented video vistation system of a correctional facility includes at least one inmate computer device in the correctional facility for use by an incarcerated inmate and being pre-programmed to communicate exclusively with a visitation services computer system. The at least one inmate computer device is configured, via an inmate interface presented on the inmate computer device, to accept a selection from a pre-registered authorized inmate user to initiate a visitation session with a remotely located non-incarcerated visitor without requiring endpoint control to schedule or initiate the visitation session by administrative personnel of the correctional facility. The visitation services computer system is configured to receive the accepted selection from the pre-registered authorized inmate user, transmit a text message to a visitor computer device of a remotely located non-incarcerated visitor including an invitation to a visitation session with the pre-registered authorized inmate user, and establish, when funds exist in a financial account to apply to a charge for the visitation session and when the visitor accepts the invitation via the visitor computer device, an interconnection between the visitor computer device and the at least one inmate computer device to commence an electronic visitation session.

30 Claims, 46 Drawing Sheets

Related U.S. Application Data continuation of application No. 14/842,611, filed on Sep. 1, 2015, now Pat. No. 9,800,830, which is a continuation of application No. 13/771,053, filed on Feb. 19, 2013, now Pat. No. 9,124,763, which is a continuation-in-part of application No. 13/363,498, filed on Feb. 1, 2012, now Pat. No. 9,094,569.

(51) Int. Cl.
*H04L 29/06* (2006.01)
*H04M 17/00* (2006.01)
*H04M 7/00* (2006.01)
*H04M 15/08* (2006.01)
*H04M 3/38* (2006.01)
*H04M 3/22* (2006.01)
*H04N 7/15* (2006.01)

(52) U.S. Cl.
CPC ........ *H04L 65/1096* (2013.01); *H04L 65/403* (2013.01); *H04M 3/2218* (2013.01); *H04M 3/2281* (2013.01); *H04M 3/38* (2013.01); *H04M 7/00* (2013.01); *H04M 7/006* (2013.01); *H04M 15/08* (2013.01); *H04M 15/09* (2013.01); *H04M 17/20* (2013.01); *H04N 7/15* (2013.01); *H04M 2201/50* (2013.01)

(56) References Cited

U.S. PATENT DOCUMENTS

| | | | |
|---|---|---|---|
| 10,313,632 B2* | 6/2019 | Humphries | H04N 7/15 |
| 2008/0000966 A1* | 1/2008 | Keiser | G06Q 10/10 235/382 |
| 2008/0068447 A1* | 3/2008 | Mattila | H04N 7/147 348/14.08 |
| 2011/0096139 A1* | 4/2011 | Rudolf | H04N 7/142 348/14.11 |
| 2012/0281058 A1* | 11/2012 | Laney | H04N 7/147 348/14.03 |

* cited by examiner

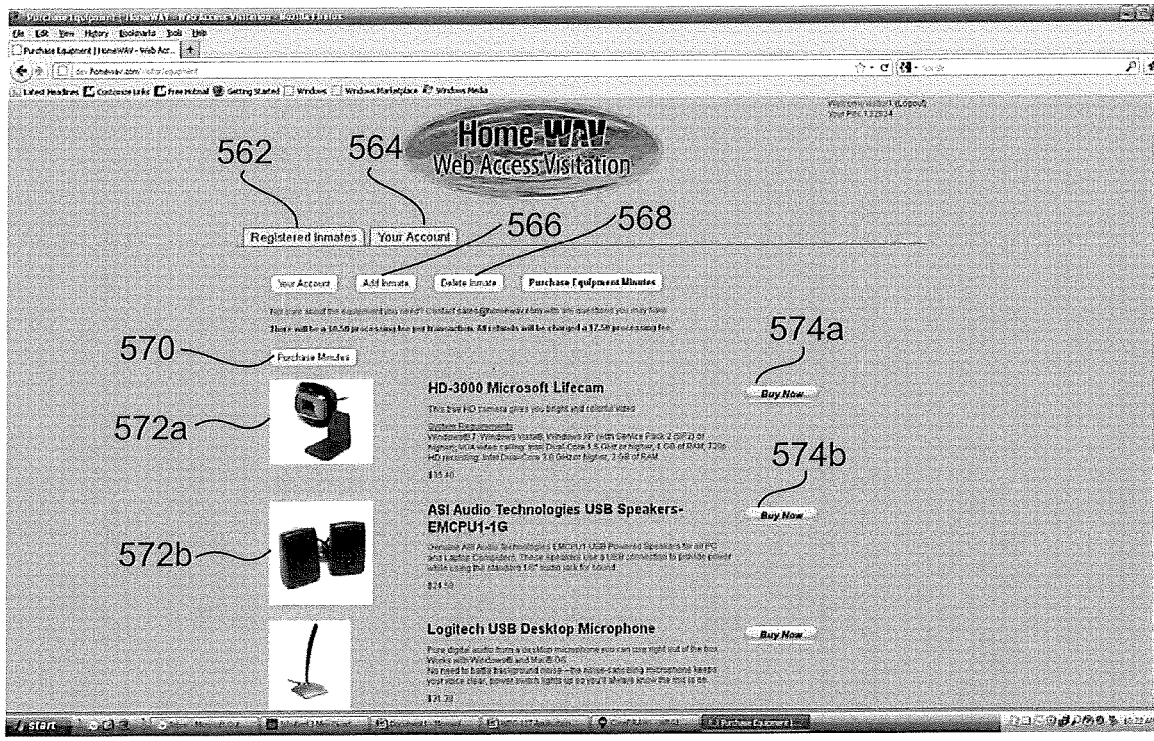
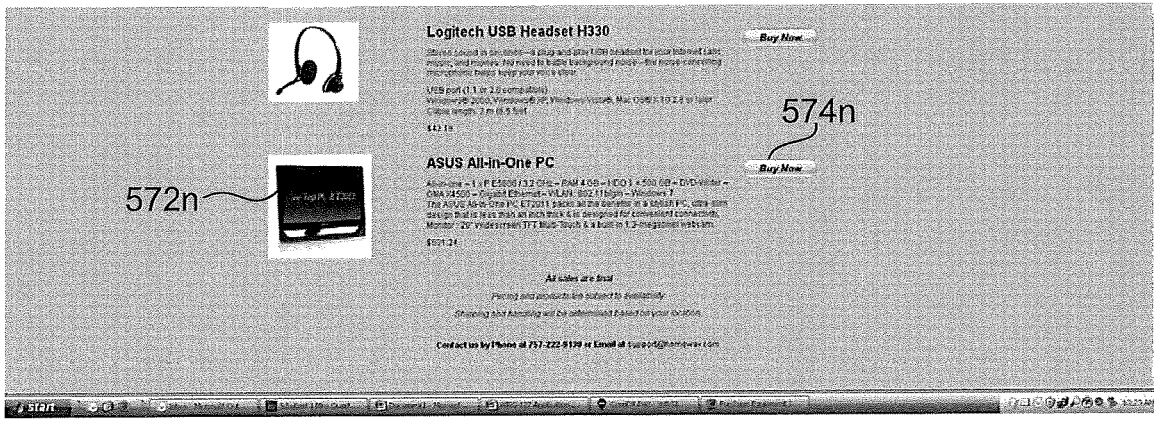
Fig. 4i

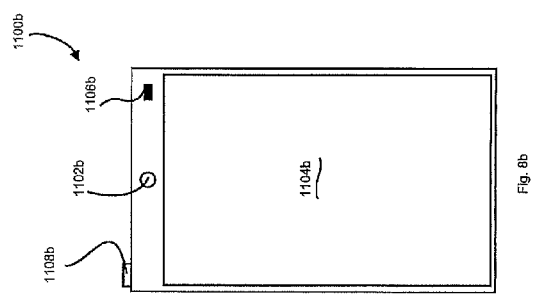
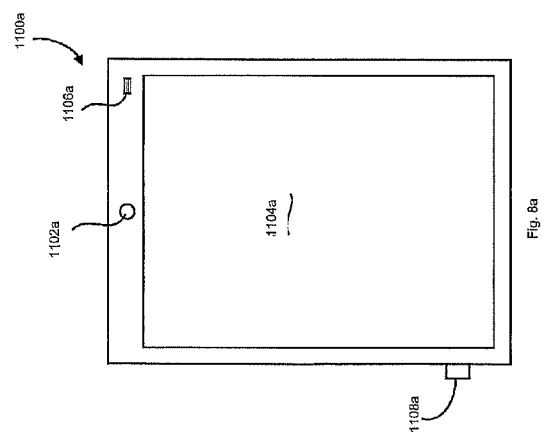

INMATE DEVICE AND USER INTERFACE FOR INMATE INITIATED VIDEO VISITATION SYSTEM

CROSS-REFERENCE TO RELATED APPLICATIONS

This application is a continuation of U.S. patent application Ser. No. 15/788,542 filed Oct. 19, 2017 and now issued U.S. Pat. No. 10,313,632; which is a continuation of U.S. patent application Ser. No. 14/842,611, filed on Sep. 1, 2015 and now issued U.S. Pat. No. 9,800,830; which is a continuation of U.S. patent application Ser. No. 13/771,053 filed on Feb. 19, 2013 and now issued U.S. Pat. No. 9,124,763; which is a Continuation-in-Part of U.S. patent application Ser. No. 13/363,498 filed Feb. 1, 2012 and now U.S. Pat. No. 9,094,569 (hereinafter the '569 Patent), the disclosures of which are hereby incorporated by reference in their entirety.

FIELD

The present disclosure relates to remote video and/or VoIP telephonic visitation and, more particularly, to an Internet-based system, enabling outside originated video and/or VoIP telephonic visitation from a remote site with incarcerated persons having a personal electronic device.

BACKGROUND

The statements in this section merely provide background information related to the present disclosure and may not constitute prior art.

When two parties want to communicate over great distances in real-time, the telephone has heretofore been the communication technology of choice. However, advancements in communication technologies over the past several years now allow both audio and video communication between parties over great distances, typically via the Internet. These forms of communication are commonly referred to as video conferencing. Modern video conferencing, depending on the complexity (and associated expense) of the equipment involved can provide virtually real-time communication among two or more parties.

Video conferencing typically requires local equipment associated with each person seeking to participate in the conference. When the conference is to be started, the equipment at each location is used to call in (e.g., "conference in") to a call center or the like. As each of these endpoints establishes a connection with the central location, the video and audio signals may then be accessed by all of the participants so that a conversation with both audio and video can take place. One common type of video conferencing equipment uses especially dedicated equipment at each geographic location for the participants. Such equipment typically uses an Integrated Services Digital Network (ISDN) or similar data connection to transmit and receive audio/video communication data during the video conference.

Unfortunately, conventionally available video conferencing equipment of the prior art has a common characteristic: each system requires initiation and/or termination of the communication at the visitor's and/or at the inmate's end (i.e., end point control. Such end point control is problematic when the video conferencing system used is a remote Internet-based visitation system where one participant is incarcerated (i.e., a prisoner in a jail, prison, penitentiary, etc.).

As used hereinafter, the term inmate will be applied to such incarcerated persons and the term prison will be used to refer to any and all facilities where an inmate may be incarcerated.

To allow an inmate to have unrestricted Internet access in order to gain end point control of a video visitation system is universally disallowed. Prisons do not want inmates to have unrestricted access to the Internet. Consequently, in such Internet-based systems of the prior art, prison personnel are required to be involved in audio/video and telephonic visitation initiation and termination.

However, the advantages of an Internet-based video visitation system in the prison environment are many. Often, an inmate is incarcerated in a location a great distance from his family or friends. Such distances often result in visitation of the inmate being inconvenient or even impossible due to travel time and expense for friends and family. Consequently, an audio/video conference with the inmate provides an alternative to an in-person visit.

As noted, the expense and complexity of traditional video visitation equipment, and associated personnel cost incurred by the prison to facilitate end point control is significant. A critically important aspect of end point control within the prison is the need to make sure that the correct inmate is communicating with the correct visitor. This issue is addressed as "positive party identification". A prison's Internet-based VoIP and video visitation system should provide positive identification of the parties to the communication. By means of illustration, it could be disastrous if a convicted child molester inmate was erroneously made a party to an incoming video visit from a minor child attempting to visit with another inmate.

Likewise, while inmate originated telephone calls to outside visitors are well known in the prior art, no system is known to the inventor that allows direct, incoming phone calls to an inmate, that is to say, without the need for intervention by prison personnel. Rather, only direct outgoing phone calls, from the inmate to the visitor, may be made. In addition, to take part in a phone call the visitor has to wait for an inmate to have access to an inmate phone, and then wait for the inmate to call. Of course the call can only be completed if the visitor is available.

The prior art discloses systems whereby an outside visitor may call in to an inmate in a prison. In such systems, prison personnel should locate the inmate and cause the inmate to move to an available inmate phone equipped to receive incoming telephone calls. Prison personnel then need to transfer the call to that phone once the inmate is in position to receive the call. Prison personnel then still need to monitor the call.

None of the known prior art means of communications maximize the recognized beneficial result of keeping an inmate connected with his family and loved ones. The presently available prior art means of communications do not allow visitors to initiate VoIP telecommunications or video visits directly with the particular inmate, spontaneously, at the visitor's convenience.

While traditional video conferencing equipment may be used in the prison environment, the above-mentioned problems are present. To illustrate the point; a VoIP telecommunication or video communication initiated outside of the prison, over the Internet, directed to an inmate, using a traditional video visitation system must be received by one or more designated prison employees. The prison employee then has to contact prison employees working in the inmate's cell block, and determine whether the inmate is available to receive the visit. If the inmate is available to receive a visit at that time the prison employees, working in the inmate's cell block, are then required to coordinate ushering the inmate to the designated video visitation station to receive the visit, and the visit is connected. Outgoing Internet based video visitation using traditional systems also puts demands on prison personnel in that the system requires prison personnel to initiate the communication and coordinate placement of the correct inmate at the correct visitation station within his or her cell block to receive the communication in accordance with industry standard operating procedures for party identification.

Thus, a traditional video visitation system, using the Internet to facilitate the communication, whether the communication is incoming or outgoing, places a heavy labor burden on the prison, and allows a risk of human error in the positive party identification. Further, Internet-based traditional video visitation using prior art systems cannot be initiated directly by an inmate, without prison personnel intervention, because prisons will not allow unrestricted inmate access to the Internet.

In applicants claimed priority patent '569, the applicant disclosed a system (i.e., the HomeWAV Video Visitation System) allowing inmate initiated video visitation with preregistered outside visitors that overcome known shortcomings of prior art video conferencing systems. That novel system requires no involvement by prison personnel to connect a video visit between the inmate and his visitor, and contains many security safeguards. For purposes of disclosure, a remote, web-based visitation system for prisons provided by HomeWAV, LLC, is described. HomeWAV and HomeWAV Web Access Visitation are trademarks of Home-WAV, LLC.

The system disclosed in the '569 Patent utilizes prison-hardened terminals located throughout the prison and usable by one inmate at a time during allowable time periods. Such an arrangement does not lend itself to receiving either video visitation or VoIP telephonic communication originated by an outside visitor wishing to communicate with an inmate. Simply put, there is no positive identification established on the receiving end at the commencement of the communication. Rather, any inmate walking past the receiving terminal could pick up the receiver and engage in a video visitation.

However, the advantages of a remote visitation video conferencing system in the prison environment are many. Often, an inmate is incarcerated in a location a great distance from his family or friends. Such distances often result in visitation of the inmate being inconvenient or even impossible due to travel time and expense for friends and family. Consequently, a video conference with the inmate would seem to provide an acceptable alternative to an in-person visit. However, the expense and complexity of traditional video visitation equipment, and associated personnel cost incurred by the prison to facilitate end point control may be prohibitive. Perhaps more important is the potential security risk if an inmate has endpoint control. In conventional face-to-face visits, conversations between inmates and their visitors are monitored to ensure that no greater security risk is created than already exists with an outsider's presence in the prison. However, if endpoint control, in Internet based video visitation, were given to an inmate, it would be difficult to effectively monitor the visit to ensure security. Potential security breaches include, but are not limited to, coded dialog between the inmate and a visitor, as well as hand and facial gestures used to communicate prohibited information.

While traditional video conferencing equipment could potentially be used in the prison environment, the above-mentioned problems would still be present. To illustrate the point; a video communication initiated outside of the prison, over the Internet, directed to an inmate, using a traditional video visitation system, must be received by one or more designated prison employees. The prison employee then has to contact prison employees working in the inmate's cell block, and determine whether the inmate is available to receive the visit. If the inmate is available to receive a visit then the prison employees, working in the inmate's cell block, are then required to coordinate ushering the inmate to the designated video visitation station to receive the visit, and the visit is connected. Outgoing Internet based video visitation using traditional systems also puts demands on prison personnel in that the system requires prison personnel to initiate the communication and coordinate placement of the inmate at a station within his cell block to receive the communication. Thus, a traditional video visitation system, using the Internet to facilitate the communication, whether the communication is incoming or outgoing, places a heavy labor burden on the prison. An Internet based traditional video visitation cannot be initiated directly by an inmate, without prison personnel intervention, because prisons will not allow unrestricted inmate access to the Internet.

One further reason traditional video conferencing would not be workable for prison visitation and other similar situations is the lack of synchronicity between data connections during the conference. More specifically, as each participant in the video conference connects to the conversation, a new data connection, or path, is created. In a prison situation, at least three data paths would be present: one for the inmate, one for the visitor, and one for the overseer monitoring the conversation. Unfortunately, an inherent latency exists between these multiple connections that pose a significant security risk for the prison. Because of latency in the data path during data transmission, communication is not instantaneous; the delay is a function of all intermediate equipment and media along the data path. Because different routes may be taken along each data path, there may exist a difference in latency and the delay experienced by each when each party is connected with a separate data path. Unfortunately, this difference in latency among multiple simultaneous data paths poses a significant security risk for a prison. As a result, the visitor or inmate may engage in an improper communication during the visit, but the difference in latency between connections prevents the overseer from learning of the improper conduct in time to prevent it or further improper conduct from occurring.

Accordingly, what is needed is an Internet based video or telephonic visitation system that; (i) permits video or telephonic visits between inmates and visitors that are initiated either by inmates or by authorized outside visitors, under strictly controlled parameters, and (ii) utilizes individual electronic devices in the possession of inmates to directly initiate and receive Internet-based video or telephonic visitation.

DISCUSSION OF THE RELATED ART

Several attempts to solve some of the problems, that are solved by the present disclosure, may be found in the prior art. For example, U.S. Pat. No. 5,382,972 for VIDEO CONFERENCING SYSTEM FOR COURTROOM AND OTHER APPLICATIONS, issued Jan. 17, 1995 to Kannes, teaches a conferencing system for interactive video (and preferably also audio) communication, which includes a composite video signal generation means. The system preferably also includes a recording unit for producing a permanent, combined video and audio record of a conference. The system includes a monitor for each conferee, which displays a composite video signal including a principal video image in a large picture region of the monitor screen and secondary video images in small picture regions of the monitor screen.

U.S. Pat. No. 6,844,893 for RESTAURANT VIDEO CONFERENCING SYSTEM AND METHOD, issued Jan. 18, 2005 to William G. Miller et al., provides a system and method that combines restaurant services with video-conferencing and multimedia access for diverse customer appeal. The MILLER et al. system and method employ a number of booths in a number of restaurants whereby each booth can video-conference with other booths, particularly in different time zones, while also providing multi-media access such as satellite TV, cable, broadcast TV, computer programs and gaming, internet access. Each booth is linked to a local area network and is equipped with a display screen and video and audio controls. The local area network of each restaurant is linked to the local area network of each other restaurant forming a corporate intranet that allows media uses and various management capabilities such as scheduling, accounting, security, training and the like.

U.S. Pat. No. 7,046,779 for VIDEO CONFERENCE SYSTEM AND METHODS FOR USE AT MULTI-STATION SITES, issued May 16, 2006 to Hesse, provides a video conference system that includes at each of several sites multiple participant stations and a control station. A conference coordinator (e.g., a guard or receptionist) operating the control station receives notice from the control station that a scheduled conference is about to begin and directs a person identified to be a participant of the conference to a station designated by the notice. Signals from participant stations are monitored and if a participant station is determined to be unavailable, the conference may be rescheduled to replace the available station with an alternate available station. Notice sufficient to direct a participant to the alternate station is provided via the control station to the coordinator. The subject of detecting availability and rescheduling alternatives may be an item of equipment or an equipment capability (e.g., a recorder channel to be used for recording the conference). Higher ranking requests may force rescheduling of already scheduled lower ranking conferences.

U.S. Pat. No. 7,061,521 for VIDEO CONFERENCE SYSTEM PROVIDING PRIVATE AND ATTORNEY-CLIENT PRIVILEGED COMMUNICATIONS, issued Jun. 13, 2006 to Bulriss et al., discloses a conference system that includes a first conference station generating at least one of audio and video signals from at least an attorney and a second conference station generating at least one of audio and video signals from the attorney's client, the attorney and the attorney's client having a relationship protected by the attorney-client privilege. The system also includes at least one communications link connecting the first and second conference stations that carries the audio and/or video signals between the first and second conference stations. A signal processor is disposed within the communications link between the first and second conference stations to route signals between the first and second conference stations. At least one control panel communicates with the signal processor and provides control over audio and/or video signals so that the attorney and the attorney's client are permitted to engage in a private communication without vitiating the attorney-client privilege.

U.S. Pat. No. 7,256,816 for SYSTEMS AND PROCESSES FOR SCHEDULING AND CONDUCTING AUDIO/VIDEO COMMUNICATIONS, issued Aug. 14, 2007 to Profanchik et al., discloses methods of scheduling and conducting video visits, as well as computer architecture for providing such scheduling and conducting, where the participants in the visit are not required or able to interact with the audio/video equipment for the initial connection to start the video visit. In some embodiments, participants are also not able to interact with the equipment during the actual visit, and thus the equipment employed during the video visit may be isolated from physical contact by the participants. To initiate or terminate a video visit, a data center establishes a data connection with each participant, and thus the flow of data between the participants moves across a computer network via the data center. The visit may be monitored in virtually real-time by splitting the data transmitted between the participants and sending it to a monitoring terminal, rather than establishing a separate connection for the monitoring.

United States Published Patent Application No. 2009/0228383 for SYSTEM AND METHOD FOR PROACTIVELY ESTABLISHING A THIRD-PARTY PAYMENT ACCOUNT FOR SERVICES RENDERED TO A RESIDENT OF A CONTROLLED-ENVIRONMENT FACILITY, published Sep. 10, 2009 upon application by Veronica Martinez et al., provides systems and methods for proactively establishing a third party payment account for services rendered to a resident of a controlled-environment facility ("CEF"). A campaign-triggering event is detected, which triggers contact of prospective third-party ("3rd party") payers for a resident of a CEF in order to encourage such prospective 3rd party payers to establish 3rd-party payment accounts for the resident. In this manner, the prospective third party payers are proactively contacted prior to an expected future demand for service by the resident. A method thus comprises identifying at least one prospective third-party payer for a resident of a controlled-environment facility, and proactively contacting the identified at least one prospective third-party payer prior to demand for service by the resident to encourage the identified at least one prospective third-party payer to establish a third-party payment account for payment for future service expected for the resident.

U.S. Pat. No. 4,054,756 for METHOD AND APPARATUS FOR SPECIAL SERVICE CALL HANDLING, issued Oct. 18, 1977 to Comella et al., discloses an apparatus for serving special service calls such as collect, person-to-person and charge-to-third number on a wholly automatic basis without any operator intervention normally being required. The system requests specific information from the calling party such as, his or her name for collect calls, and utilizes the received answers in the formulation of additional announcements to the "called" subscriber. The system is responsive to information received from the called station or third party station for instituting billing for the requested call after a connection is established between the calling and called stations.

U.S. Pat. No. 7,158,621 for PRE-PAID CALLING AND VOICE MESSAGING SERVICE FOR INMATES, issued Jan. 2, 2007 to Anthony J. Bayne, discloses a system wherein inmates place free incoming calls to a call processing system and are prompted to choose between accessing a voice mail system and calling an outside party. If an outside party is to be called, an inmate provides a phone number and an outgoing call is placed to the outside party. If the outside party provides payment for the call, the inmate is connected to the outgoing call and the incoming call is terminated. If the outgoing call is not accepted, the inmate may record a voice message for the outside party in a voice mailbox assigned to the inmate. For an access fee, the outside party may access the voice mailbox assigned to the inmate. Advertising messages may be presented to inmates during incoming calls and/or to outside parties during outgoing calls. Advertising revenue may cover incoming call charges. Inmates and/or outside parties may record voice messages for advertisers.

U.S. Pat. No. 8,064,580 for TELEPHONY SYSTEM AND METHOD WITH IMPROVED FRAUD CONTROL, issued Nov. 22, 2011 to Wesley Larry Apple et al., teaches an inmate communications system providing a feature-rich platform with a high degree of flexibility and security employing call control facilities located off institutional premises. Authentication processes for calling and called party verification include biometric techniques in some embodiments. Distributed processing of call control and billing provide flexible interactive call payment processes. Preferred embodiments feature voice over IP transmission and control featuring controlled access to avoid addition of unauthorized third-party call participants. Monitoring, recording and selective forwarding of calls is provided under control of system administrators.

U.S. Pat. No. 8,160,219 for CONTROLLED THREE-WAY CALLING, issued Apr. 17, 2012 to Anthony Jeremiah Bayne, provides a system wherein an inmate calls a call processing system and provides two phone numbers to it. The first phone number is for a 2nd Party who will accept the inmate's collect call and who will agree to pay any additional charge for adding a third party to the collect call. The second phone number is for a 3rd Party the inmate would like added to the collect call. The call processing system places the inmate on hold while the system dials the 2nd Party. When the 2nd Party accepts the inmate's collect call and agrees to pay for an additional fee for establishing a three-way call during the collect call, the inmate is taken off hold and is connected to the 2nd Party.

None of the patents and the published patent application, taken singly, or in any combination, are seen to teach or suggest the present disclosed and claimed system and method.

SUMMARY

The present invention provides an inmate initiated an audio/video conferencing system and method adapted for use in providing remote visitation of inmates incarnated in a prison, wherein the inmate is enabled to initiate the remote visitation via a text message initiated by the inmate. The need for prison personnel to provide endpoint control to initiate or terminate a visit is eliminated in the novel visitation system of the invention. Further, all visitations are initiated by the inmates during defined visitation times established by the prison.

The present disclosure provides, in some embodiments, a VoIP telecommunication and video visitation system and method adapted for use in providing both inmate and outside visitor originated remote, Internet-based visitation with inmates incarcerated in a prison. The need for prison personnel to provide endpoint control to schedule, initiate, or terminate a visit is eliminated in the novel visitation system of the present disclosure. Further, all visitations are initiated or received by the inmates during defined visitation times established by the prison. Also importantly, while this is a fee for services system, with a programmable per minute charge, no monies pass through the prison, but rather are paid directly to the owner/operator of the remote visitation system.

In one aspect, a method of providing inmate text message initiated audio/video visitation services to inmates located in a prison on an endpoint control free basis for self-initiating via texting communication services to an inmate selected visitor located external to the prison, in a server having a processor, memory and non-transitory memory with computer executable instructions, and having instructions for performing the following method includes the steps of hosting a web-based audio/video visitation service application having one or more webpages accessible over a data network and hosting an inmate interface, a visitor interface and an administrative interface, each of which is configured separately and each of which has separate and distinct functions, but each of which cooperate to provide the functioning of the audio/video visitation service application. This further include the administrative interface hosting an administrative user web-interface accessible over the data network of the audio/video visitation service application and providing authorized access to one or more administrators having administrative terminals having an administrator web-browser application, as authorized by the prison in which the inmate is located, the authorized access including the administering of the audio/video visitation service application including inmate use and operations thereof and use of the audio/video visitation service, the operations of the inmate interface and the visitor interface, and the web-based communications between the inmate interface and the visitor interface. Additionally, this includes the visitor interface hosting an visitor-inmate user web-interface accessible over the data network by a communication terminal of the visitor having a visitor web-browser application, the visitor interface configured to enable the visitor terminal to receive an inmate initiated request to establish a web-based communication with the visitor terminal. The method also includes the inmate interface hosting an inmate-visitor user web-interface accessible over the data network by a communication terminal of the inmate having an inmate web-browser application, the inmate interface configured to enable the inmate terminal to initiate the inmate initiated request to a visitor by creating a text message to establish the web-based communication with the visitor terminal. The method additionally includes the server further configured for performing the steps of receiving from the administrative interface a registration of the inmate interface for the inmate including a plurality of inmate operating parameters and receiving from the administrative interface an inmate-visitor for the inmate interface including visitor information containing name and communication address for the visitor terminal of the visitor. Additionally the steps of providing to the inmate interface a displayed listing of the name of each inmate visitor for the inmate, the providing including enabling the inmate to initiate a text message to a potential visitor requesting a web-based audio/video visitation communication with the visitor and receiving from the inmate interface the inmate initiated request to send a text message to a potential selected visitor for requesting the establishment of a web-based audio/video visitation communication with that selected visitor. This further includes the steps of verifying a current authority at the time of the receipt of the inmate initiated text message request for the inmate to have a text message communication with the potential selected visitor and in response to the verified current authority for the inmate to send the text message communication to the selected visitor, transmitting the inmate initiated text message to the visitor interface of the selected visitor. The steps further include receiving from the visitor interface an acceptance input from the selected visitor for having a web-based audio/video visitation communication with the inmate and establishing a web-based audio/video communications between the inmate interface and the selected visitor interface to form the inmate initiated web-based audio/video visitation between the inmate terminal and the visitor terminal. The steps also include receiving a request to terminate the established inmate initiated web-based audio/video visitation from at least one of the administrative terminal, the inmate terminal, the visitor terminal and terminating the web-based communication in response to the receive termination request.

In another aspect, a web-based audio/video visitation system for prisons providing inmate initiated audio and video communications, includes a webserver having a processor and non-transitory memory with computer executable instructions to host the web-based audio/video visitation web service over an Internet, the webserver having a administrative interface interfacing to an administrative system and hosting an administrative user web-interface and being associated with a prison in which a particular inmate is located, an inmate-visitor interface hosting an inmate-visitor user web-interface interfacing with an inmate-visitor workstation of an inmate-visitor of the particular inmate with each being located remote from a location of the particular inmate and providing an inmate-visitor user web-interface to the inmate-visitor, a inmate interface hosting an inmate user web-interface on an inmate terminal accessible by the particular inmate, the inmate interface being enabled to receive an input from the inmate user web-interface as to a selection of the inmate-visitor and a request from the inmate to establish a web-based communication to the workstation of the selected inmate-visitor. The webserver is further configured with computer executable instructions stored in a non-transitory memory to operatively communicate with each of the inmate-visitor workstations via the Internet to host the inmate-visitor user web-interface, to operatively communicate with the administrative system via the Internet to host the administrative user web-interface and to enable the management of the inmate user web-interface and the inmate-visitor user web-interface and the webserver, and to store in a database information related to both the particular inmate and the inmate-visitor using the visitor workstation associated with the particular inmate. The server is further enabled to monitor the inmate-visitor interface to determine a current availability for the inmate-visitor to receive a web-based communication from the particular inmate, and to communicate via the inmate interface to the inmate user web-interface the determined current availability indicator status for the inmate-visitor of the particular inmate that indicates their current availability. The server is also configured to enable the inmate to prepare and transmit a text-message to an inmate selected inmate-visitor, the text-message indicating a request of the inmate to establish an web-based audio/video communication with a selected inmate-visitor, the enablement of the inmate transmitting of the text-message being limited to when the current call receipt status of the selected inmate-visitor indicates that the selected inmate-visitor is not currently available to receive an web-based audio/video communication from the particular inmate, to enable the visitor interface of the selected inmate-visitors to receive the inmate initiated text-message, and to establish the inmate initiated web-based audio/video communication to the inmate-visitor workstation of the selected inmate-visitor, the established web-based audio/video communication forming a visit.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

Various aspects, features, and attendant advantages of the present disclosure will become more fully appreciated as the same becomes better understood when considered in conjunction with the accompanying drawings, in which like reference characters designate the same or similar parts throughout the several views, and wherein:

FIG. 4i is a screenshot of a purchase equipment/minutes screen of the system for practicing the method of the invention;

FIGS. 8a and 8b are top plan schematic views of a representative tablet style and representative smart phone style electronic device, respectively, suitable for use in some embodiments as described herein;

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

The present invention provides a system for providing audio/video conference visitation between an inmate incarcerated in a prison and a visitor having an Internet connected computer or other Internet appliance.

Figure 1A:
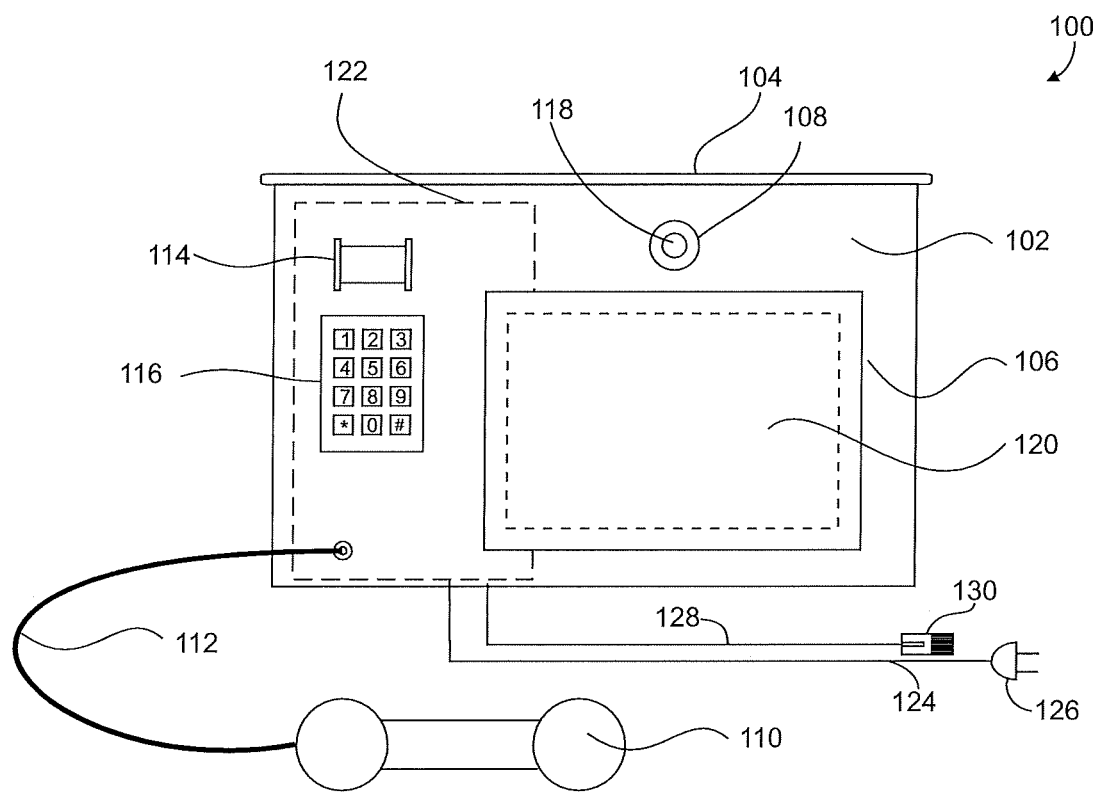
FIG. 1a is a front, elevational, schematic view of a "jail-hardened" communication station for use by an inmate using the system of the invention.

Referring first to FIG. 1a, there is shown a front, elevational, schematic view of a "jail-hardened" communication station for use by an inmate using the system of the invention, generally at reference number 100.

A "jail-hardened" steel cabinet 102 has a top or lid 104 securely affixed thereto. Cabinet 102 is typically formed from 14 gauge hardened cold rolled steel and is formed using a uni-body design to prevent any seams being accessible. Cabinet 102 is designed for ease of installation and maintenance while providing the necessary security required for equipment installed in a prison. Cabinet 102 is typically mounted to a vertical wall, not shown, and is provided with five holes, not shown, in the back wall, not shown, of cabinet 102. Four of the holes may be keyed holes allowing cabinet 102 to be hung on preinstalled screws or other similar fasteners, not shown. However, a fifth hole is a non-keyed hole to prevent cabinet 102 from being slid upward and removed from the wall. Once cabinet 102 is hung on the wall by four screws or the like through the four keyed holes, the screws may be tightened and finally, a screw is placed through the non-keyed hole thereby securely fastening cabinet 102 to the wall.

Ventilation for the equipment housed in cabinet 102 is provided by a series of offset holes, not shown, in an upper edge of cabinet 102. These offset holes are hidden by cabinet top 104 and align with complementary offset holes, not shown in cover 104.

Lid or top 104 is typically secured to cabinet 102 with a single security screw, not shown, that, in combination with a series of interlocks, not shown, allow ready access to an internal region of cabinet 102 by authorized service personnel.

The cabinet is finished with an electrostatically applied sintered metal, scratch resistant finish to maintain a good cabinet appearance in a potentially hostile environment.

It is believed that numerous alternate construction methods and materials may be known to those of skill in the art.

Cabinets formed from such material or construction methods may be substituted for the steel cabinet 102 chosen for purposes of disclosure. Consequently, the invention is not considered limited to the cabinet chosen for purposes of disclosure. Rather, the invention is intended to include any suitable cabinet.

Openings 106 and 108 are provided in a front surface of enclosure 102 for a video monitor and a camera, respectively. Both openings 106 and 108 are covered with a transparent but destruction resistant polymer, not specifically identified. Suitable transparent materials include ⅜ inch thick Lexan®. Lexan® is a trademark of SABIC Innovative Plastics (formerly General Electric Plastics) brand of polycarbonate resin thermoplastic. It will be recognized that alternate material suitable for use in prisons may be known to those of skill in the art and any suitable material may be substituted for the Lexan® material chosen for purposes of disclosure. Lexan® covered openings 106 and 108 are considered to be resistant to most physical forces applied thereto, including bullets.

An institutional commercial grade telephone handset 110, also formed from a material suitable for a jail telephone system is connected to enclosure 102 by a steel sheathed cable 112 and a steel lanyard, not specifically identified.

A chrome steel handset cradle 114 is provided on the front surface of enclosure 102 to facilitate storage of handset 110 when not in active use. Cradle 114 is secured to cabinet 102 in a way to render its removal difficult.

An institutional keypad 116 is also provided on the front surface of enclosure 102. Keypad 116 is also constructed as a "jail-hardened" device to prevent vandalism or destruction. Keypad 116 is typically a USB connected device.

A video camera (typically a USB camera) is housed in enclosure 102 and aligned therein such that a camera lens, not specifically identified, is aimed forward through opening 108. A video monitor 120 is mounted within enclosure 102 and a front screen area thereof is aligned with monitor opening 106. In the embodiment chosen for purposes of disclosure, video monitor 120 is a 20 inch video monitor forming a part of a so-called all-in-one PC computer. An ASUS Model ET-2011 has been found satisfactory for the application. It will be recognized by those of skill in the art that other similar computers are or may become available and any suitable computer may be used. Consequently, the invention is not considered limited to the ASUS computer chosen for purposes of disclosure.

An electronic unit, shown schematically at reference number 122, typically implemented as part of the all-in-one PC computer, is housed within enclosure 102 and operatively connected to handset 110, camera 118, and video monitor 120. Electronic units such as electronic unit 122 are believed to be well known to those of skill in the video conferencing arts and, consequently, are not further discussed herein. In the embodiment chosen for purposes of disclosure, electronic unit 122 is the CPU of the all-in-one PC computer of which video monitor 122 is a part. Electronic unit 122 includes a power supply, not specifically identified, that is typically connected externally to an electrical power receptacle via an electrical power cord 124 terminating in a connector 126. Typically, electrical power cord 124 is not accessible to an inmate using inmate communication station 100. Only authorized personnel have access to electrical power cord 124.

In addition, electronic unit 122 includes a network communication interface, not specifically identified, that is typically designed to connect to an Ethernet or another standard network type via communication cable 128 terminating in a connector 130. The electrical cable 128 and connector 130 are also inaccessible to all but an authorized person. In the embodiment chosen for purposes of disclosure, connector 130 is a standard RJ-45 8 conductor connector.

It will be recognized that other configurations for a "jail-hardened" inmate communication stations may be substituted for the communication station 100 chosen for purposes of disclosure. Consequently, the invention is not considered limited to communication station 100. Rather, the invention is intended to include any suitable alternate inmate communication station configurations.

Figure 1B:
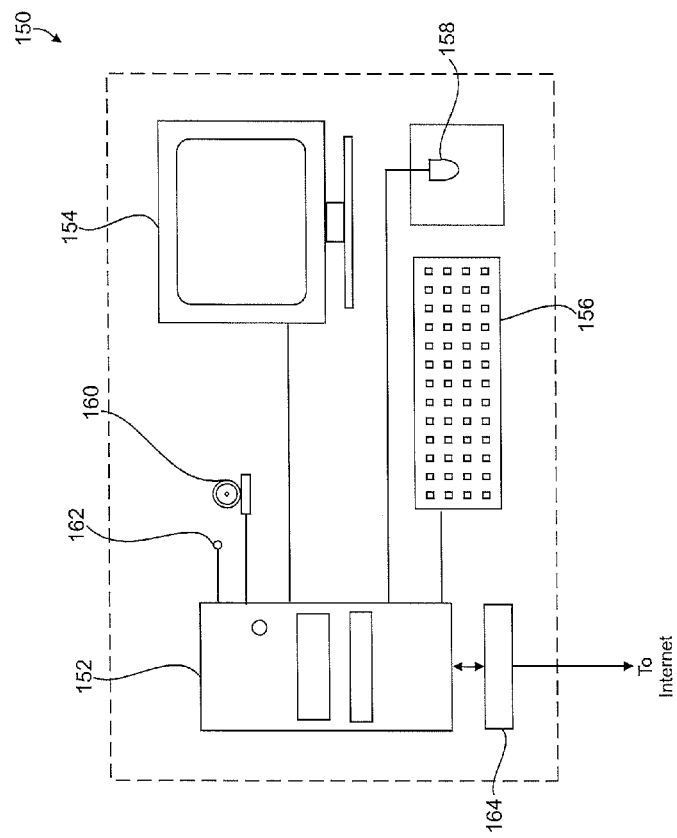
FIG. 1b is a simplified schematic block diagram of a web-enabled computer suitable for use as a visitor workstation.

Referring now also to FIG. 1b, there is shown a simplified schematic block diagram of a web-enabled computer suitable for use as a visitor workstation, generally at reference number 150. While a typical so-called "desktop" computer configuration is shown in FIG. 1b for purposes of disclosure, it will be recognized by those of skill in the art that any Internet enabled device may be substituted therefor. Such devices include, but are not limited to, smartphones, tablet computers, netbook computers, notebook computers, laptop computers, and dedicated Internet appliances, etc.

The exemplary Internet enabled computer system 150 has a CPU 152, a video monitor 154, a keyboard 156, a pointing device (e.g., a mouse) 158, and a modem 164, each operatively connected to CPU 152 In addition, a camera 160 and a microphone 162 are also operatively connected to CPU 152. A camera 160 and a microphone 162 complete a computer system suitable for use as a visitor computer system. Such system topologies as well as all included and/or attached components are believed to be well known to those of skill in the art. Consequently, neither the system topology nor any individual component are further described or discussed herein.

Figure 2:
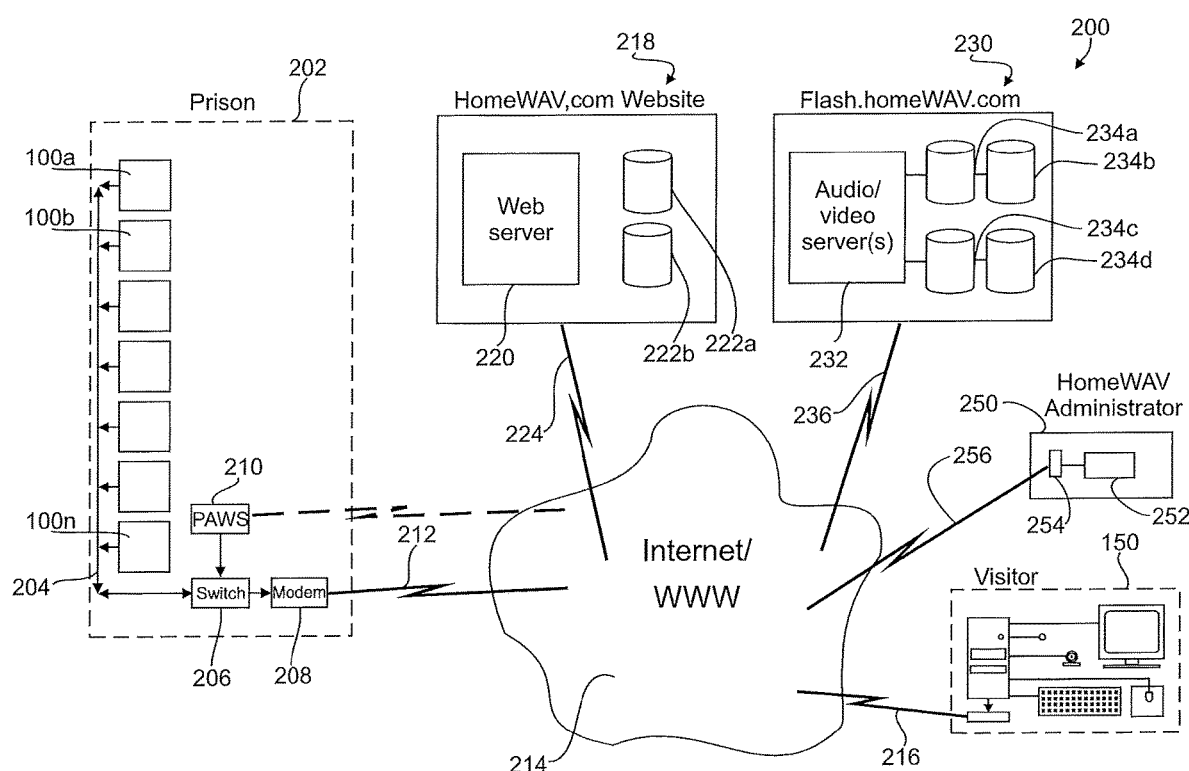
FIG. 2 is a simplified schematic diagram of a system suitable for use in practicing the method of the invention.

Referring now also to FIG. 2, there is shown a simplified system block diagram of the remote web-based visitation system (RWVS) in accordance with the invention, generally at reference number 200. For purposes of disclosure, a remote, web-based visitation system for prisons provided by HomeWAV, LLC, a limited liability company of the state of Virginia, located in Virginia Beach Va. is described. HomeWAV and HomeWAV Web Access Visitation are trademarks of HomeWAV, Inc.

A prison facility, 202 contains one or more inmate communication stations 100a, 100b, 100n typically disposed throughout prison 202. While most inmate communication terminals 100a, 100b . . . 100n are typically located in cell block common areas, not specifically identified, such terminals 100a, 100b . . . 100n may be placed at any other convenient locations throughout prison 202. In some prisons 202, public visitation terminals, not specifically identified, may be located in areas of the prison accessible to the public. Each inmate communication station 100a, 100b . . . 100n is connected to a network, shown schematically at reference number 204. Network 204 is supported by a network device 206, typically a multiport switch. It will be recognized that numerous network topologies may be implemented within prison 202. Consequently the invention is not considered limited to any particular network topology or any specific networking components.

Network component 206 is connected to an Internet interface, typically a modem 208. The type of modem 208 and the nature of the Internet connection depends upon the number of inmate visitation stations 100a, 100b . . . 100n at the prison 202. In the embodiment chosen for purposes of disclosure, modem 208 is a cable modem. As cable modems, as well as other Internet interface devices are believed to be well known to those of skill in the art, they are not further described or discussed herein. Consequently, the invention is not considered limited to the cable modem chosen for purposes of disclosure. Rather, the invention comprehends any and all network interface devices, known and to be invented.

A prison administrator workstation (PAWS) 210 may be located within prison 202 and also connected to either network 204 or directly to network controller (e.g., switch) 206. In alternate embodiments, PAWS 210 may have its own modem associated and connected directly to the Internet. Also PAWS 210 may be located outside prison 202 when desired.

An Internet connection 212 is provided between Internet interface/modem 208 and the Internet "cloud" represented schematically at reference number 214.

A visitor workstation or Internet "appliance" 150 discussed in detail hereinabove is also connected to Internet 214 via an Internet connection 216. Visitor workstation 150 is intended to represent a plurality of visitor workstations, each connected to Internet 214.

HomeWAV website 218 supports a web server 220. Web server 220 runs application code, not shown, that implements the applications of the novel remote web-based visitation system of the invention. In the embodiment chosen for purposes of disclosure, the applications, discussed in detail herein below, are implemented in either JAVA or PHP (http://www.php.net). PHP is a server-side HTML embedded scripting language that provides web developers with a full suite of tools for building dynamic websites. In addition, some custom Adobe® Flash® ActionScript codes are provided to interact with flash.homeway.com 230 discussed in more detail herein below. ActionScript is a dialect of ECMAScript (i.e., it is a superset of the syntax and semantics of the language more widely known JavaScript), and is used primarily for the development of websites and software targeting the Adobe Flash Player platform. ECMAScript is the scripting language standardized by Ecma International in the ECMA-262 specification and ISO/IEC 16262 specifications. The language is widely used for client-side scripting on the web.

It will be recognized that website design and implementation is believed to be well known to those of skill in the art. Consequently, alternate web development tools/languages may be utilized to develop similar applications. Consequently, the invention is not considered limited to the development tools and/or languages chosen for purposes of disclosure. Rather, the invention is intended to include any suitable languages, scripts, etc.

HomeWAV website 218 also embodies and supports storage, shown schematically at reference numbers 222a, 222b to contain application code and the databases necessary to implement the remote web-based visitation system of the invention.

A second website associated with the remote web-based visitation system of the invention is Flash.HomeWAV.com website 230. Flash.HomeWAV.com website 230 records and stores all audio/video (A/V) visits. As later discussed, certain A/V visits by clergy or legal representatives may be exempt from recording. Typically, all other A/V visits are recorded by one or more A/V servers 232. Storage devices, shown schematically at reference numbers 234a . . . 234d retain A/V transcripts of all visits not exempt from the recording requirement.

Finally, one or more HomeWAV Administrators at workstations 250 that include a computer 252 and a modem 254 and that are connected to the Internet by Internet connection 256 provide certain gate keeping and administrative functions by interacting with HomeWAV website 218. Such gate keeping and administrative functions are discussed in detail herein below. The system of FIG. 2 is suitable for practicing the method of the invention. For brevity, the novel remote web-based visitation system for prisons is abbreviated RWVS. RWVS operates completely differently than any prison visitation system of the prior art. Two of the important differences between RWVS and the prior art include the feature that all visitation calls are initiated by inmates with no need for any intervention by prison personnel. All calls are automatically recorded (both audio and video) unless the call is between an inmate and a clergy person or a lawyer or another professional who has the right to privileged communication with the inmate. A flag in the visitor record of such a visitor automatically suspends recording.

A second unique feature of the RWVS of the invention is that prison personnel are not involved in collecting, or handling, the fees charged for using the system. Rather, RWVS is a pay-for-services based system wherein all money transactions are initiated by a visitor and all monies are recorded and tracked by the RWVS software. An online payment service such as PayPal® is used to receive payments from visitors or potential visitors. Received payments are credited to the visitor's account for use in visiting with a particular inmate. Generally, funds associated with one inmate may not be used for visitation with a different inmate. Also, deposited funds are associated with the visitor making the deposit and may not be used by a different visitor for visiting that inmate.

Before the RWVS is functional, administrative startup tasks must be performed, both by HomeWAV administrative personnel and prison administrative personnel at each prison.

A person wishing to utilize the HomeWAV system logs into the system in one of three user categories: as a visitor, as an inmate, or as an administrator. The features available to a visitor are first described.

Visitor Station

Figure 3:
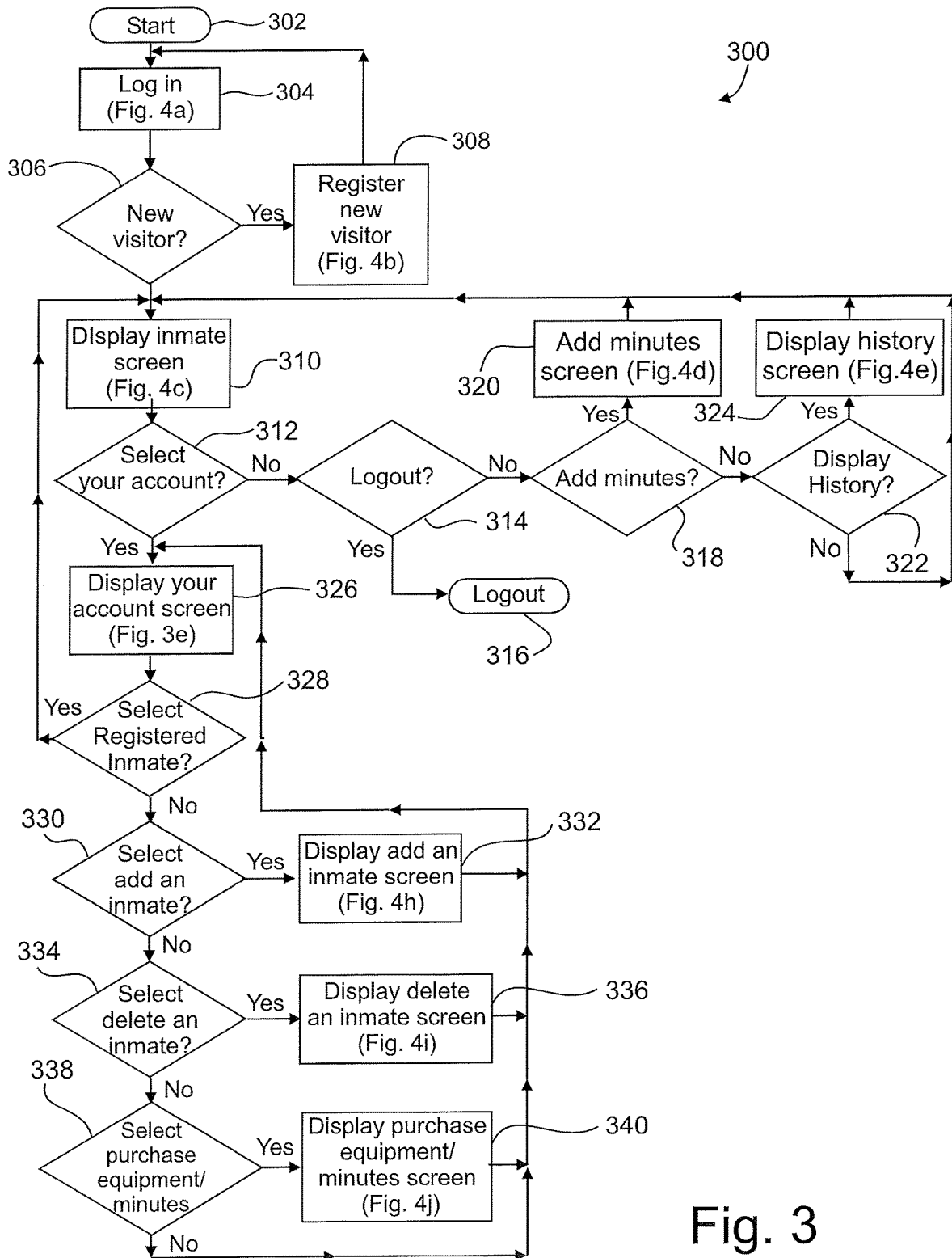
FIG. 3 is a simplified flow chart of the visitor process of the invention.
Figure 4A:
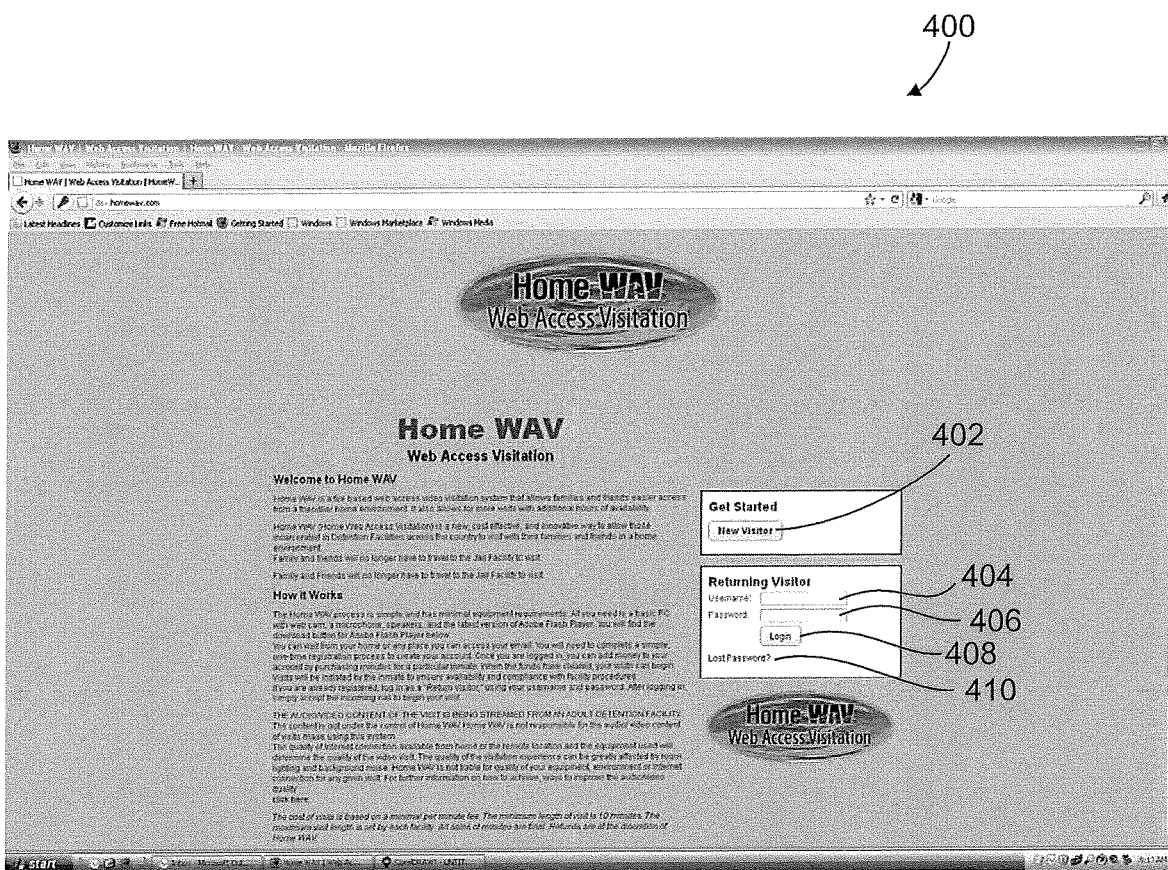
FIG. 4a is a screenshot of a login screen of the system for practicing the method of the invention.

Referring now also to FIG. 3, there is shown a simplified flow chart generally at reference number 300, of the operation of the HomeWAV features available to a visitor (i.e., a person outside the prison who will communicate (i.e., "visit") with an inmate in accordance with the method of the invention. The visitor process starts, block 302 with a login process 304. FIG. 4a is a screenshot of the HomeWAV login screen, shown generally at reference number 400.

Figure 4B:
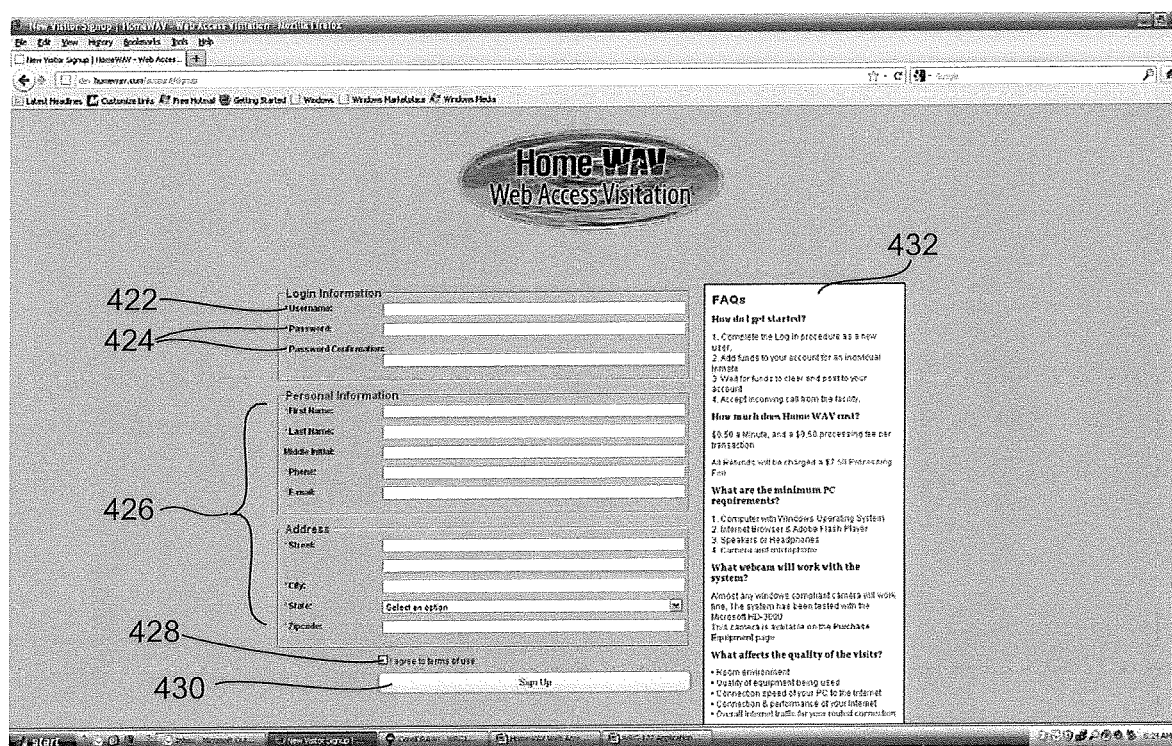
FIG. 4b is a screenshot of an add a new visitor screen of the system for practicing the method of the invention.

If the visitor is logging in for the first time, block 306, the "New Visitor" button 402 is selected and the new visitor is then directed to a new visitor screen 420 (FIG. 4b).

Referring now also to FIG. 4b, there is shown a screenshot of the new visitor screen, generally at reference number 420. A proposed user name 422 and a password 424 are entered. The user must then re-enter the password 424. After that, typical demographic information 426 is entered.

The new user is required to agree to the terms of use, button 428 and then select "Sign Up" button 430.

A FAQs section 432 is provided on screen to assist new users with their registration process.

If however, the visitor has already registered, block 306, he/she enters a user name 404 and password 406 and selects the "Login" button 408. In the event that the visitor has forgotten his/her password, the "Lost Password" button 410 may be selected for password help. If "Lost Password" button 410 is selected, the user is asked to enter his/her e-mail address and a reset password request is then forwarded to that address.

Upon entry of a valid username 404 and password 406 and pressing the login button 408 the visitor is logged into the HomeWAV system and immediately presented the Registered Inmate screen 440 (FIG. 4c), block 310.

Figure 4C:
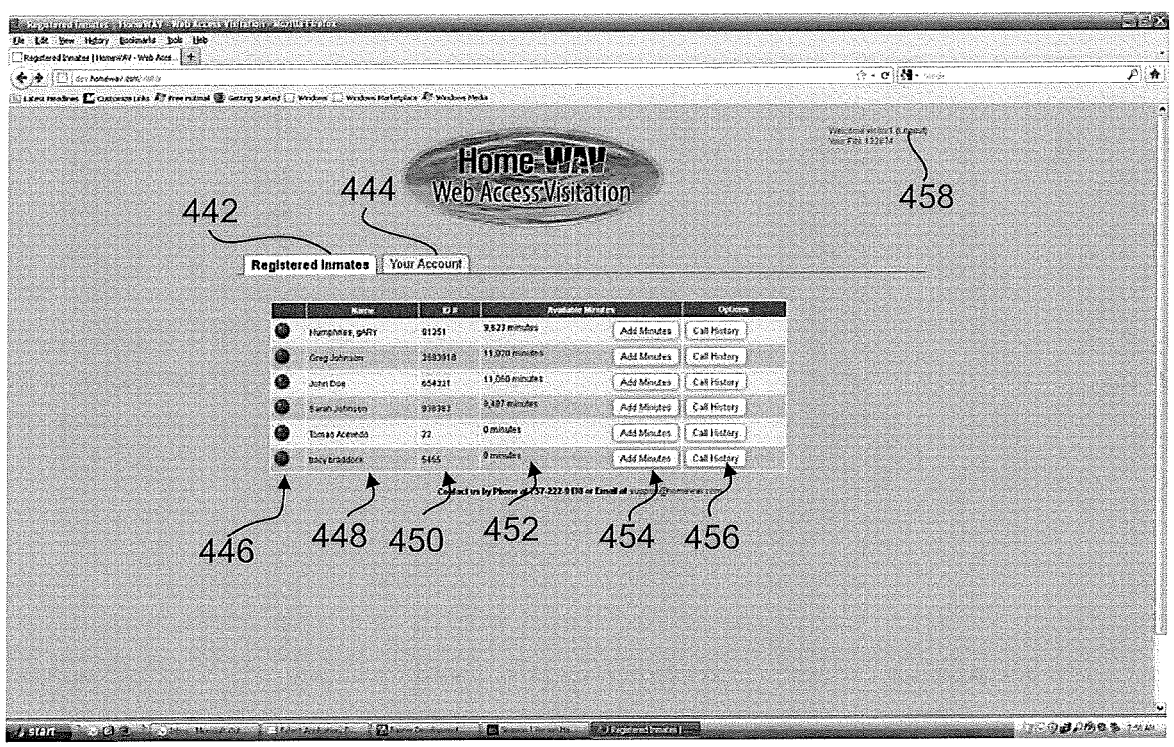
FIG. 4c is a screenshot of a registered inmate screen of the system for practicing the method of the invention.

Referring now also to FIG. 4c, there is shown a screen shot of the "Registered Inmates" screen 440. Several actions are available to the visitor: proceed to the "Your Account" screen 500 (FIG. 4f) selectable from the "Your Account" tab 444, or log out of the HomeWAV system, tab 458. Note that the "Registered Inmates" tab 442 does nothing as the visitor is already at the registered inmate screen 440.

Selecting link 458 allows the user to log out of the HomeWAV system.

The "Registered Inmates" screen 440 provides information relating to all inmates with which the visitor has registered and with whom a HomeWAV visit may be conducted. The Inmate Status Ball column 446 displays a colored ball indicating the current status of each registered inmate. The colors have the following meanings:

Red—Inmate not logged on and/or there are no funds available for a visit with the selected inmate. If this is so, the call is not allowed;

Green—Inmate is currently logged into the HomeWAV system at an inmate visitation station 100 and there are funds available to allow a visit.

A green ball indicates that the inmate is available to initiate a call. The process whereby an inmate initiates a call is discussed in detail herein below.

The columns "Name" 448, and "ID Number" 450, are believed to be self explanatory.

Available minutes column 452 indicates the number of minutes in the visitor's account available for a visit with the selected registered inmate. Note that minutes purchased for visitation cannot be used for visitation with another inmate. Adjacent the remaining minutes value is an "Add Minutes" button 454 that allows the visitor to add additional minutes when necessary.

Selecting the "Add Minutes" button 454 associated with any registered inmate transfers a visitor to an "Add Minutes" screen 460 (FIG. 4d) to which the user is directed.

Figure 4D:
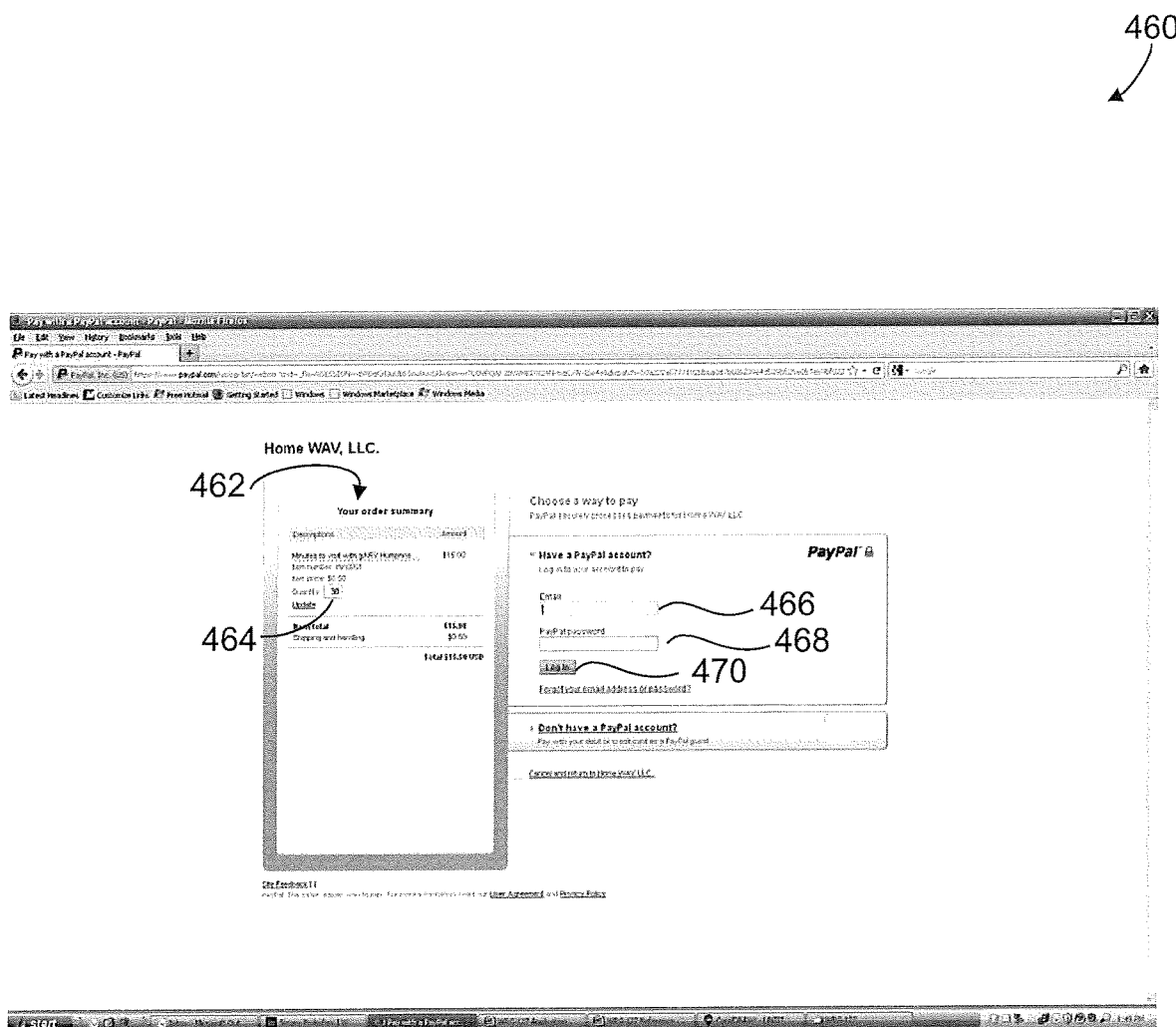
FIG. 4d is a screenshot of an add minutes screen of the system for practicing the method of the invention.

Referring now also to FIG. 4d, there is shown an "Add Minutes" screen 460. An "Order Summary" block 462 displays the selected inmate name. An "Order Quantity" box 464 allows the visitor to enter the number of minutes he/she wishes to purchase for visitation with the inmate.

For purposes of disclosure PayPal® has been chosen as the online payment service through which a visitor may purchase minutes for a selected inmate. PayPal® is believed to be well known to those of skill in the art and is, therefore, not further discussed herein. It will be recognized that any alternate online payment service may be used in addition to or in place of PayPal® to purchase visitation minutes. Consequently, the invention is not considered limited to any particular on-line funds collection and/or transfer agent. Funds paid through PayPal® or the like to purchase minutes are automatically transferred to HomeWAV server 220 (FIG. 2) and are typically recorded and made available to a visitor's account for use in as little as 15 seconds.

A HomeWAV visitor is assumed to have a PayPal® or other equivalent account and enters his/her e-mail address 466 and password 468 and then clicks the login button 470. When the PayPal® transaction has been completed, the user is returned to the Registered Inmate screen 440 (FIG. 4c).

Figure 4E:
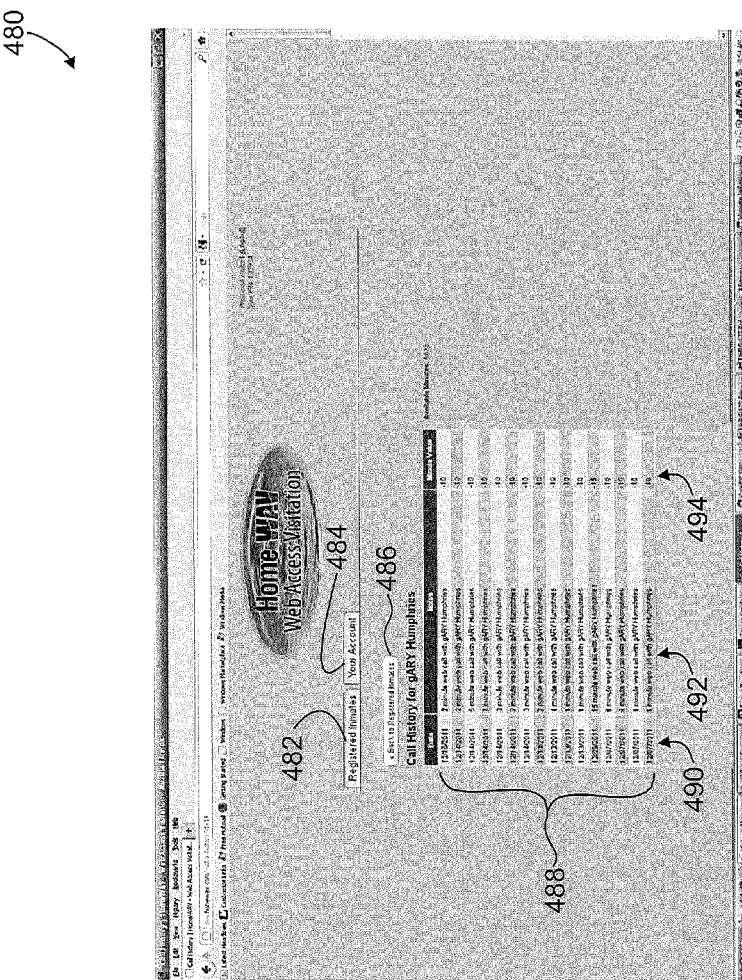
FIG. 4e is a screenshot of a call history screen of the system for practicing the method of the invention.

"Call History" button 456 allows a user access to a call log for a selected inmate. Referring now also to FIG. 4e there is shown a screen shot of a portion of a call history or call log for the selected inmate, generally at reference number 480.

Two navigation buttons, "Registered Inmates" 482 and "Your Account" 484 are provided. In addition a "Return to Registered Inmates" button 486 performs identically to "Registered Inmates" button 482. Call log records 488 each show a date 490, a duration and inmate name 492, and the billed time 494 for the call. Billed time 494 is based upon the minimum number of minutes billed for a call regardless of the actual call duration. Typically there is no minimum call length.

Selecting any "Your Account" button, for example "Your Account" button 484 on "Call History" screen 480 directs the user to the "Your Account" screen 500 (FIG. 4f), block 326. For simplicity, not all paths to block 316 are included on flow chart 300.

From "Your Account" screen 500, four actions are possible. First, a user may return to the "Registered Inmate" screen 440 (FIG. 4c). In addition, the user may select one of three other functions: "Add an Inmate" button 506, "Delete an Inmate", button 508, and "Purchase Equipment/Minutes", button 510.

If the user selects "Registered Inmate" button 502, block 328, he/she is returned to "Registered Inmate" screen 440 (FIG. 4c), block 310. If, however, the user selects "Add an Inmate" button 506, block 330, he/see is transferred to "Add an Inmate" screen 520 (FIG. 4g).

Figure 4F:
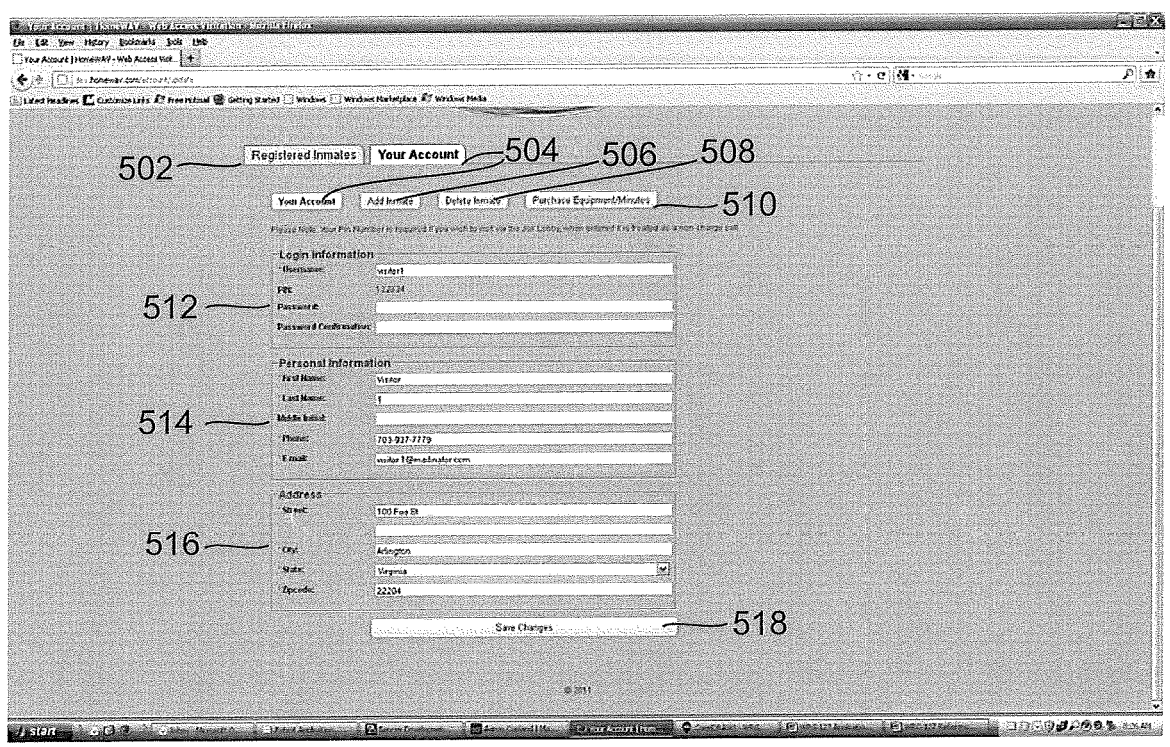
FIG. 4f is a screenshot of "your account" screen of the system for practicing the method of the invention.
Figure 4G:
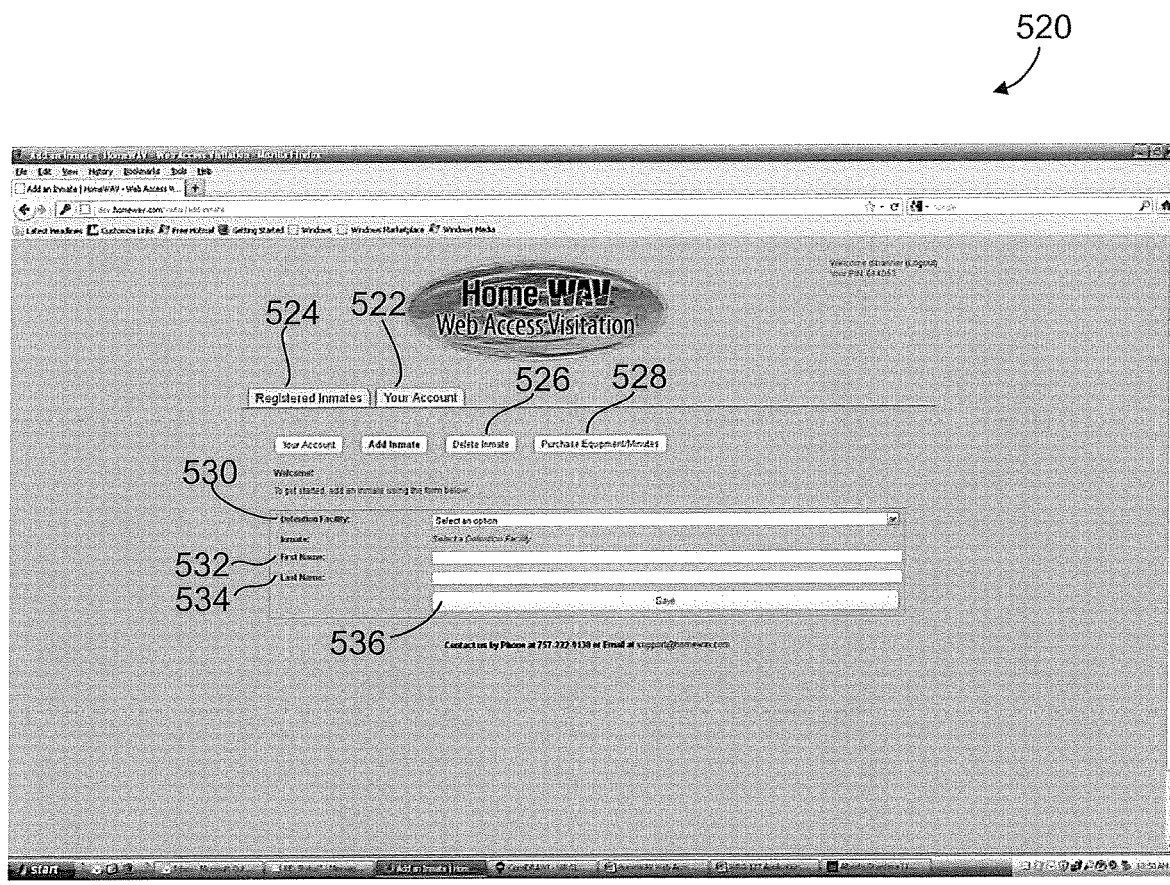
FIG. 4g is a screenshot of an add a new inmate screen of the system for practicing the method of the invention.

Selecting the "Your Account" button 522 returns the user to the "Your Account" screen 500 (FIG. 4f).

Selecting the "Registered Inmate" button 524 returns the user to the "Registered Inmate" screen 440 (FIG. 4c).

Figure 4H:
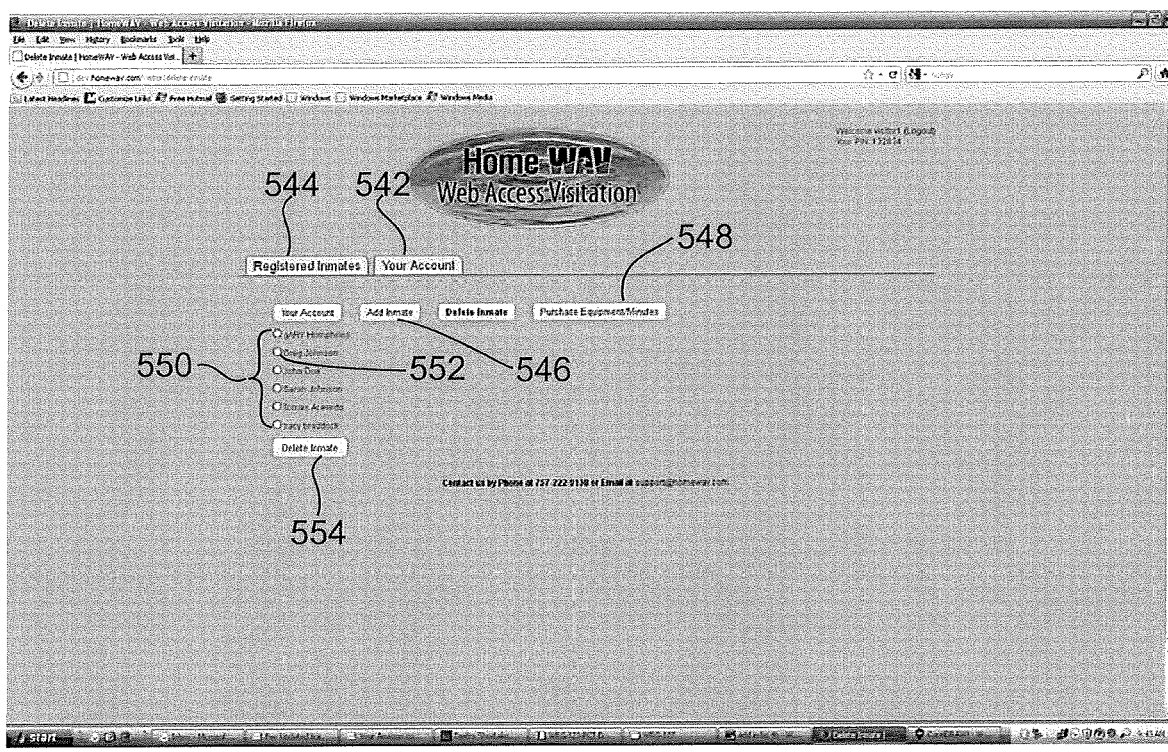
FIG. 4h is a screenshot of a delete an inmate screen of the system for practicing the method of the invention.

Selecting "Delete Inmate" button 526 transfers the user to the "Delete Inmate" screen 540 (FIG. 4h).

When registering a new inmate, the visitor first selects the detention facility (i.e., prison) housing the inmate to be registered using a pull down list box 530.

Once the detention facility has been selected, the visitor enters the inmate's first and last name, 532, 534, respectively.

Finally, the visitor selects "Save" button 536 to save the inmate information to the HomeWAV web server 220 (FIG. 2).

Referring now also to FIG. 4h, there is shown a screenshot 540 of the delete an inmate process.

Selecting the "Your Account" button 542 returns the user to the "Your Account" screen 500 (FIG. 4f).

Selecting the "Registered Inmate" button 544 returns the user to the "Registered Inmate" screen 440 (FIG. 4c).

If the visitor selects "Add an Inmate" button 546, he/she is transferred to the "Add an Inmate" screen 520 (FIG. 4g).

A list of inmates 550 registered by the visitor is shown on screen 540, each having a radio button control 552 adjacent each listed inmate name 550. Only one radio button 552 is labeled to maintain clarity of screen 540. Selecting the radio button 552 adjacent the name of the inmate from list 550 who is to be deleted, and then selecting "Delete Inmate" button 554 deletes (i.e., unregisters) the selected inmate at the HomeWAV server 220. If the visitor selects "Purchase Equipment/Minutes" button 548, he/she is transferred to the "Purchase Equipment/Minutes" screen 560, (FIG. 4i).

Referring now also to FIG. 4i, there is shown the "Purchase Equipment/Minutes" screen 560.

Selecting the "Your Account" button 564 returns the user to the "Your Account" screen 500 (FIG. 4f).

Selecting the "Registered Inmates" button 562 returns the user to the "Registered Inmates" screen 440 (FIG. 4c).

Selecting the "Add Inmate" button 566 transfers the visitor to the "Add an Inmate" screen 520 (FIG. 4g).

Selecting the "Delete Inmate" button 568 transfers the visitor to the "Delete Inmate" screen 540 (FIG. 4h).

Selecting the "Purchase Minutes" button 570 returns the visitor to "Registered Inmates" screen 440 (FIG. 4c) where button 454 associated with the inmate name 448 for which additional minutes are required is used to add the minutes. A series of equipment 572a, 572b . . . 572n is displayed. Any equipment 572a, 572b . . . 572n may be purchased by selecting the associated "Buy Now" button 574a, 574b . . . 574n.

As has previously been mentioned, all visitation calls are initiated by an inmate. The process whereby an inmate initiates a call is described in detail herein below.

To receive a call, a visitor logs into the HomeWAV system as previously described and then selects the "Registered Inmate" screen 440 (FIG. 4c). As previously discussed, Inmate Status Ball column 446 displays a colored ball indicating the current status of each registered inmate. Any inmate displaying a green ball is on-line and may initiate a call.

Figure 4J:
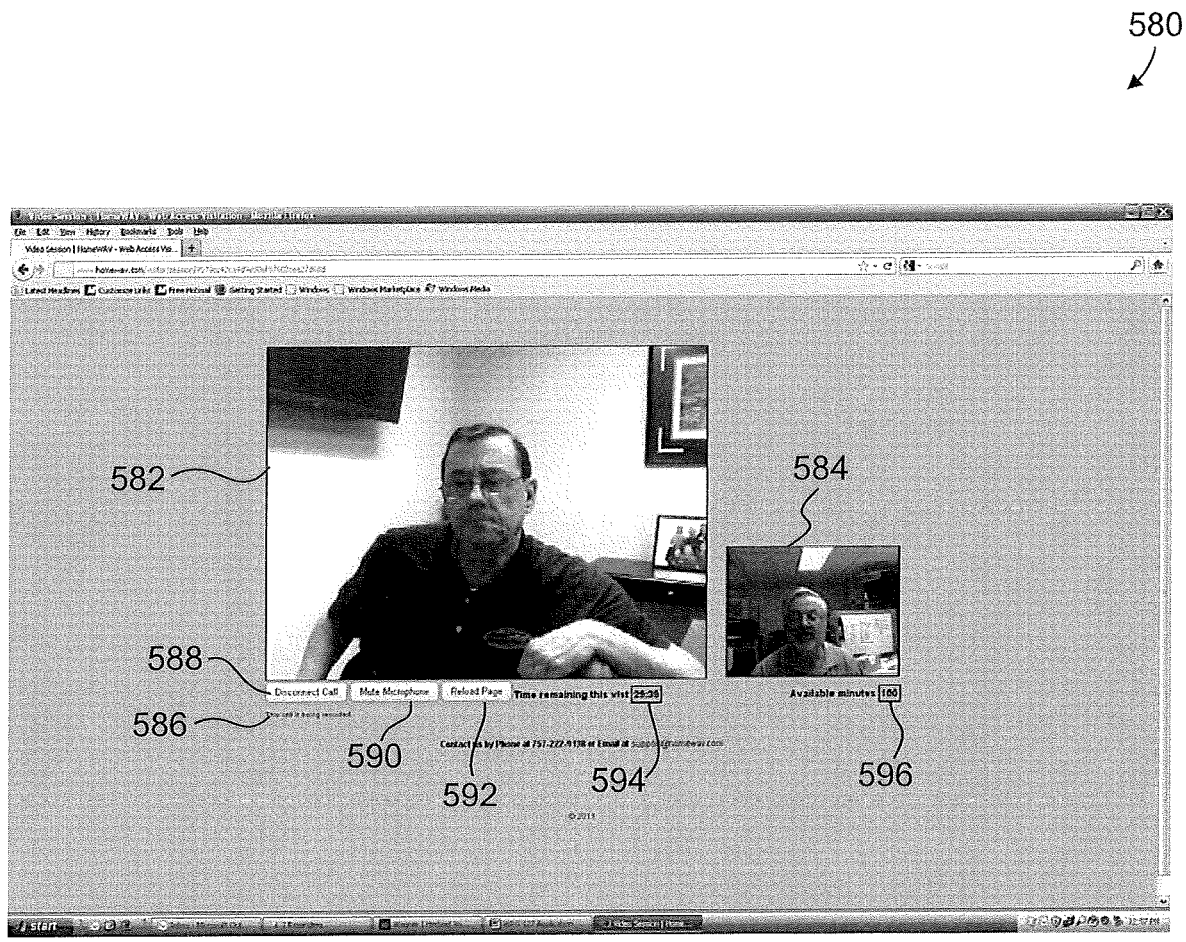
FIG. 4j is a screenshot of a visit screen of the system for practicing the method of the invention.

When an inmate initiates a call, a ringing sound is heard through speakers 160 at the visitor station 150 at which the visitor is logged into the HomeWAV system. A pop up box also appears on the screen showing the name of the calling inmate. An "Answer" button in the pop-up box is selected to answer the call. Referring now to FIG. 4j, there is shown a screen 580 that is displayed once the call is answered. An image of the caller 582 is displayed at the left side of screen 580 while a smaller image 584 of the visitor is displayed at the right side of the screen 580.

A message 586 reminds the visitor that the call is being recorded.

The visitor may terminate the call using "Disconnect Call" button 588.

The visitor may mute his/her microphone 162 (FIG. 1b) sing "Mute Microphone" button 590.

The time remaining for the call based upon the maximum allowable call length is displayed at reference number 594.

Finally, the number of minutes remaining in the account for the inmate to which the visitor is currently "talking" is displayed at reference number 596.

Inmate Station

Figure 5A:
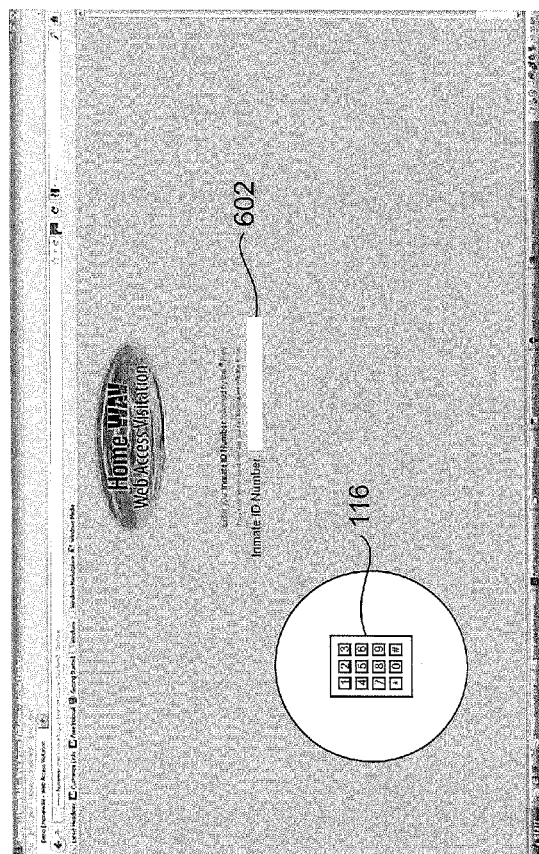
FIG. 5a is a screenshot of a first portion of an inmate's login screen of the system for practicing the method of the invention.

Up to this point, the HomeWAV system has been described from the perspective of a visitor. The system as utilized by an inmate is now described. Referring now also to FIG. 5a, there is shown a screenshot of an inmate sign in screen, generally at reference number 600. A schematic representation of keypad 116 forming a part of a "jail-hardened" terminal forming an inmate communication station 100 as shown in FIG. 2. Keypad 116 is the only device available to an inmate with which to communicate at a "jail-hardened" inmate communication station 100.

A single field "Inmate ID #" 602 is available on screen 600. The inmate must enter his/her ID number using keypad 116. As there is neither an "Enter" key nor a "Backspace" key on keypad 116, the "*" is used as an enter key while the # is used as a backspace key. Consequently, when the inmate has entered his/her ID number, he/she presses the "*" key on keypad 116.

Figure 5B:
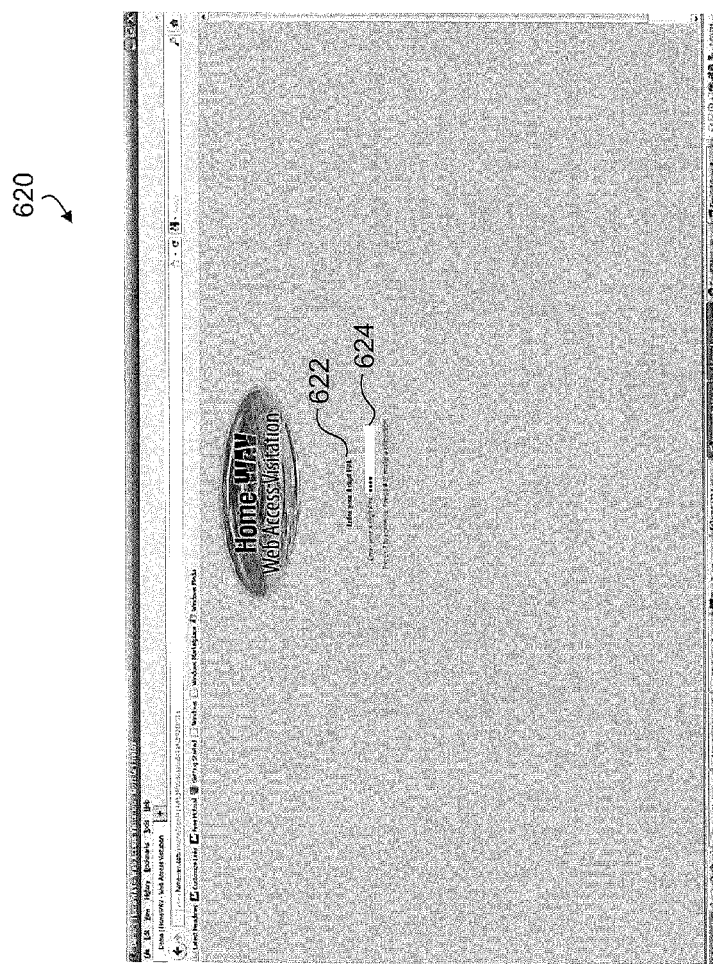
FIG. 5b is a screenshot of a second portion of an inmate's login screen of the system for practicing the method of the invention.

The inmate ID number is validated and, if not recognized, the inmate must reenter his/her ID number. Once the inmate ID is validated, an inmate PIN screen 620 (FIG. 5b) is displayed. Referring now also to FIG. 5b, there is shown an "Inmate PIN" screen 620. The inmate is instructed at 622, to "ENTER" his/her PIN. The inmate then enters his/her PIN in field 624 using "*" as an enter key.

Once the entered PIN 624 is verified, a screen 640 appears that displays a list of the inmate's visitors and their availability status.

Figure 5C:
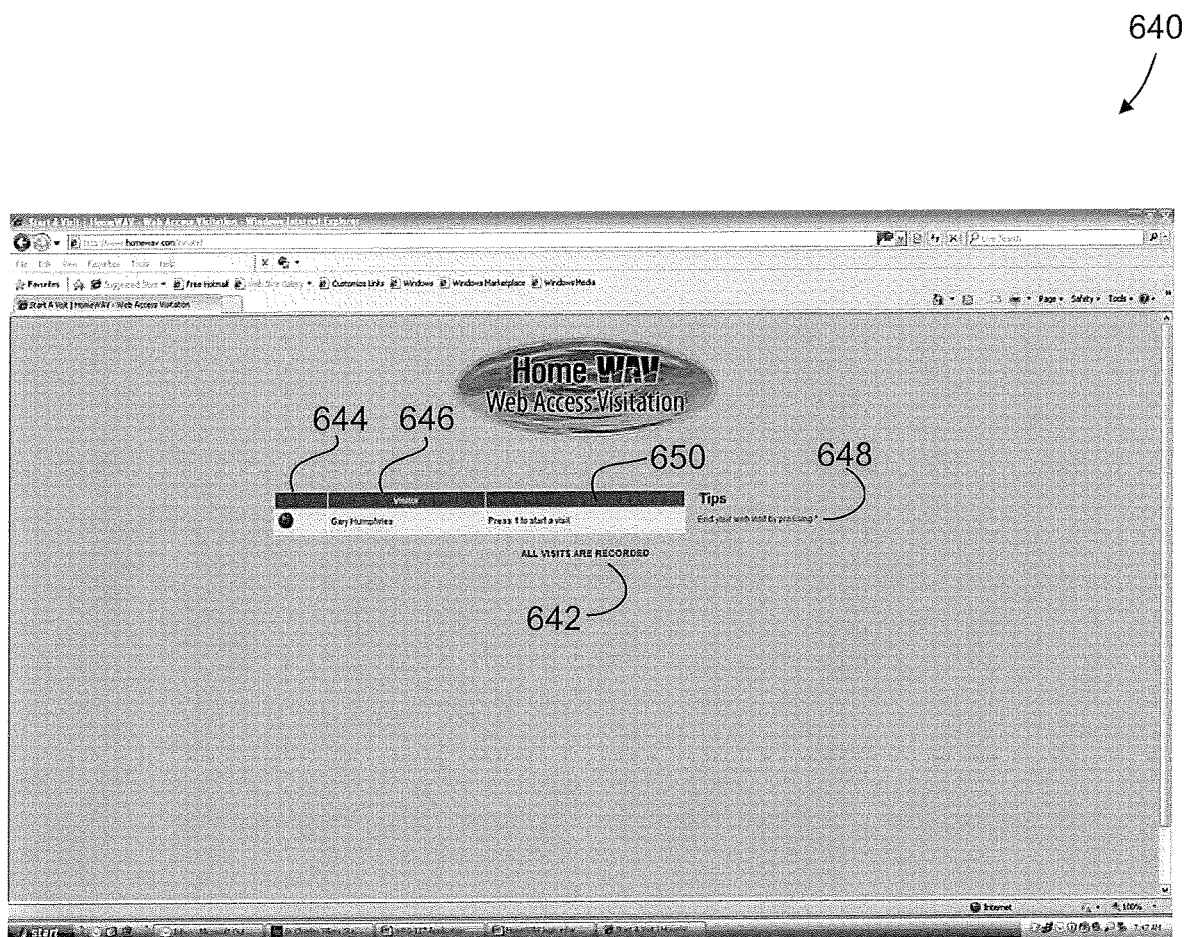
FIG. 5c is a screenshot of a begin visit screen of the system for practicing the method of the invention.

Referring now also to FIG. 5c there is shown a screenshot of a "Begin Visit" screen 640. The inmate is provided with a reminder 642 that "ALL VISITS ARE RECORDED." However, as discussed herein below, certain visits with clergy, legal representatives, etc. are generally not recorded.

A second reminder 648 reminds the inmate that the web visit may be ended by pressing the "*" key on keypad 116 (FIG. 1a).

Figure 5D:
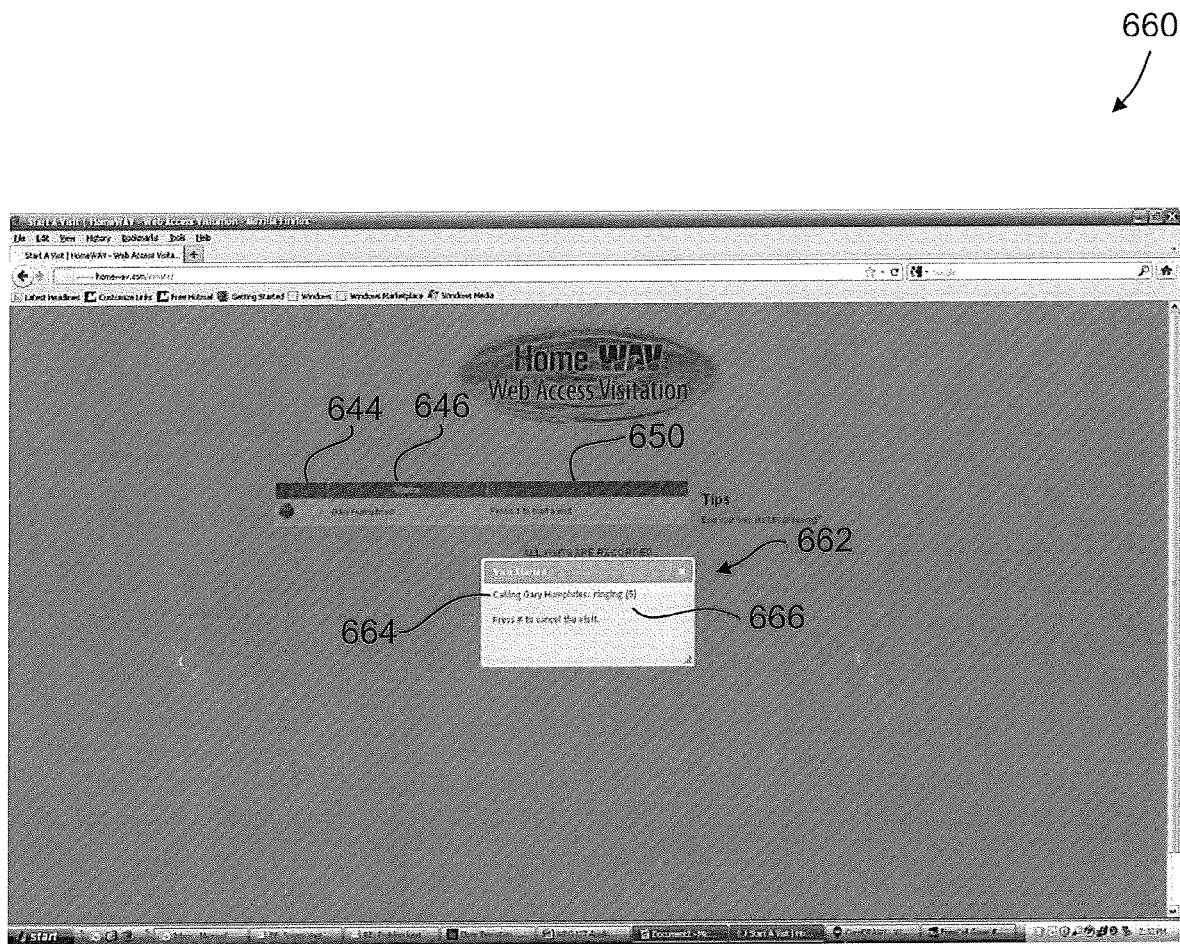
FIG. 5d is a screenshot of a call initiation screen of the system for practicing the method of the invention.

The names of one or more potential visitors are displayed, column 646, each with an associated visitor status ball 644. A particular number 650 is assigned to each listed visitor, which number must be entered on keypad 116 to initiate a visit with that visitor. Assuming that the visitor status ball is green, pressing the associated number 650 initiates the visiting process. If the visitor status ball is red, the visitor is not logged on and/or there are no funds available for a visit with this visitor, and accordingly no visit can be initiated. In such an event, the inmate can select an option to send a text message to the red status visitor, advising the visitor that the inmate is ready and desiring to initiate a visit. Referring now also to FIG. 5d, there is shown a screenshot of A "Begin Visit" screen 660 having a pop-up box 662 displayed thereupon. Pop-up box 662 shows the name 664 of the visitor being called and the number of rings 666.

Once the visitor "answers" the call, an "Inmate Visit Screen" 680 is displayed.

Figure 5E:
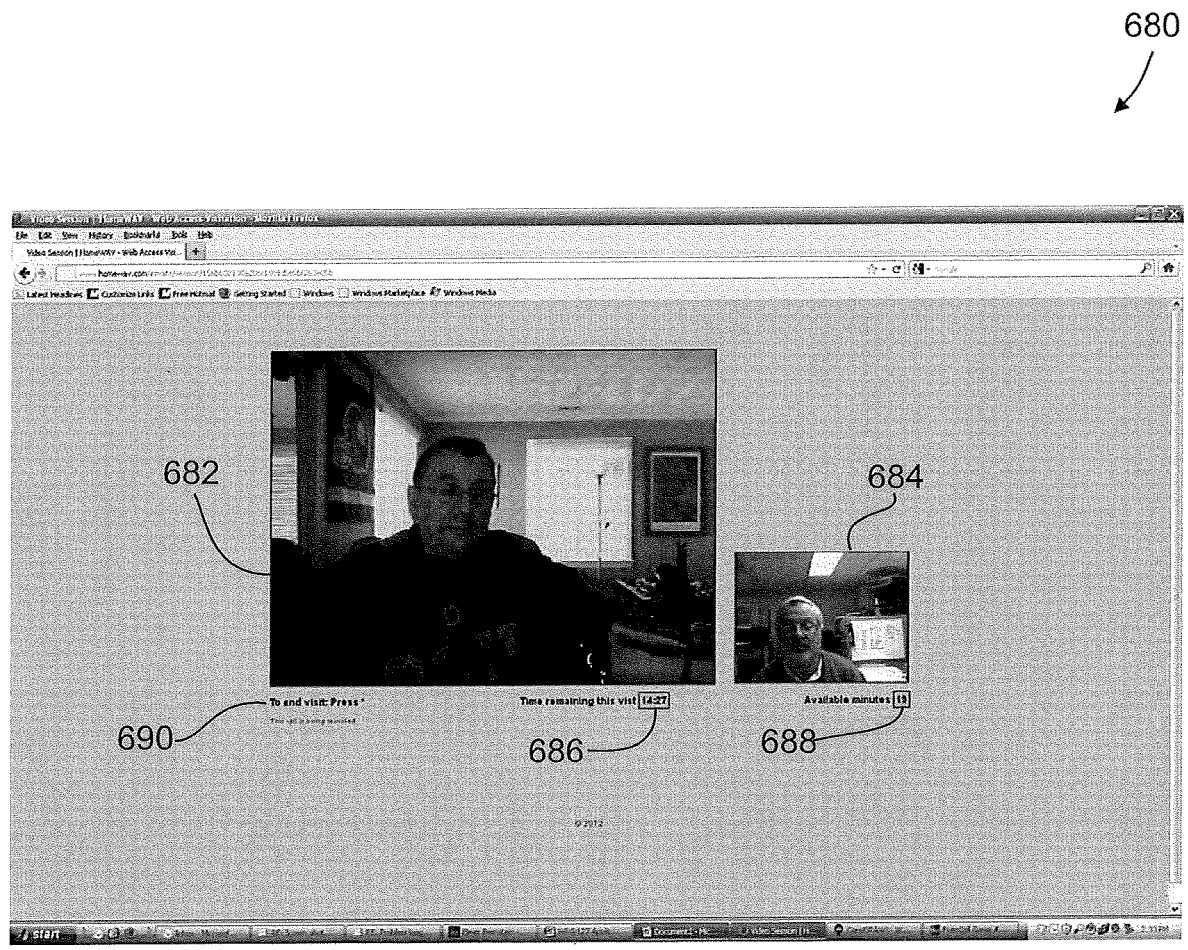
FIG. 5e is a screenshot of an inmate view of a visit screen of the system for practicing the method of the invention.

Referring now also to FIG. 5e, there is shown a screenshot of an "Inmate Visit" screen 680. An image 682 of the called visitor is displayed at the left side of screen 680 while a smaller image 684 of the inmate is displayed at the right side of screen 680.

The remaining available minutes for the call 686 are displayed beneath image 682. The remaining time 686 is based upon the maximum call length allowed as well as the minutes remaining in the visitor's account for the calling inmate.

Available minutes 688 are displayed beneath image 684.

To end the call (i.e., web visit), the inmate may simply press the "*" key on keypad 116.

Administrator Station

The third class of HomeWAV users is administrators. Some functions performed by HomeWAV administrative personnel using management software residing on web server 220 (FIG. 2) associated with the HomeWAV.com website 218 include:

Enter or Delete a prison
Assign Prison Administrators
Set cost per minute for calls
Delete Recorded Video
Set retention duration of archived recorded video Register Visitors including Name, Address, Phone, and Password
Reset a Visitor Password
Delete a Visitor
Manage Visitors minutes
Manage Purchase of Minutes
Track Used and unused minutes
Issue Credit for unused minutes
Update Inmate List as data is provided by a prison
Generate usage and other reports There are currently three classes of administrator defined within the HomeWAV system. The names and privileges (i.e., the allowable operations) of each of these classes of administrator are:

Class 1—Facility Manager
1) Manage Detention Facility
Can View Facility Information (i.e. Name, Location, Min/Max Call Length, Price per Minute).
Can modify the Facility Maximum Call Length.
Has the ability to disable all Calls
2) Manage Inmates
View Inmate Information (i.e. Name, ID #, Available Minutes).
Can disable calls for a specific Inmate.
Can Reset PIN for specific Inmate.
Can View List of Registered Visitors for a specific Inmate and have the ability to turn off their Record.
Can View Visitor Information (i.e. First and Last Name, Phone Number, Address)
Video Playback
a) Can playback recorded video for specific Inmates.
Manage operators
View operator information (i.e. Username, Email, Privileges).
Has the ability to edit operator information and privileges.
Class 2—Jail Administrator
Detention Facility
a) Can view facility information (i.e. Name,
Location, Min/Max Call Length, Price-per-Minute).
Manage Inmates
View inmate information (i.e. Name, ID #, Available Minutes).
Can disable calls for a specific inmate. Reset PIN for a specific inmate.
View registered visitors for a specific inmate.
View visitor information (i.e. First and Last Name, Phone Number, Address).
3) Video Playback.
a) Playback recorded video for specific inmates.
Class 3—Monitor
1) Detention Facility
a) Can view facility information (i.e. Name,
Location, Min/Max Call Length, Price-per-Minute).
2) Inmates
View inmate information (i.e. Name, ID #, Available Minutes).
View registered visitors for a specific Inmate.
View visitor information (i.e. First and Last Name, Phone Number, Address)
3) Video Playback
a) Playback recorded video for specific inmates An administrator logs into the HomeWAV system using login screen 400 (FIG. 4a). Once the administrator's user name 404 and password 496 are validated, he/she is immediately transferred to the "Manage Detention Facility" screen.

Figure 6A:
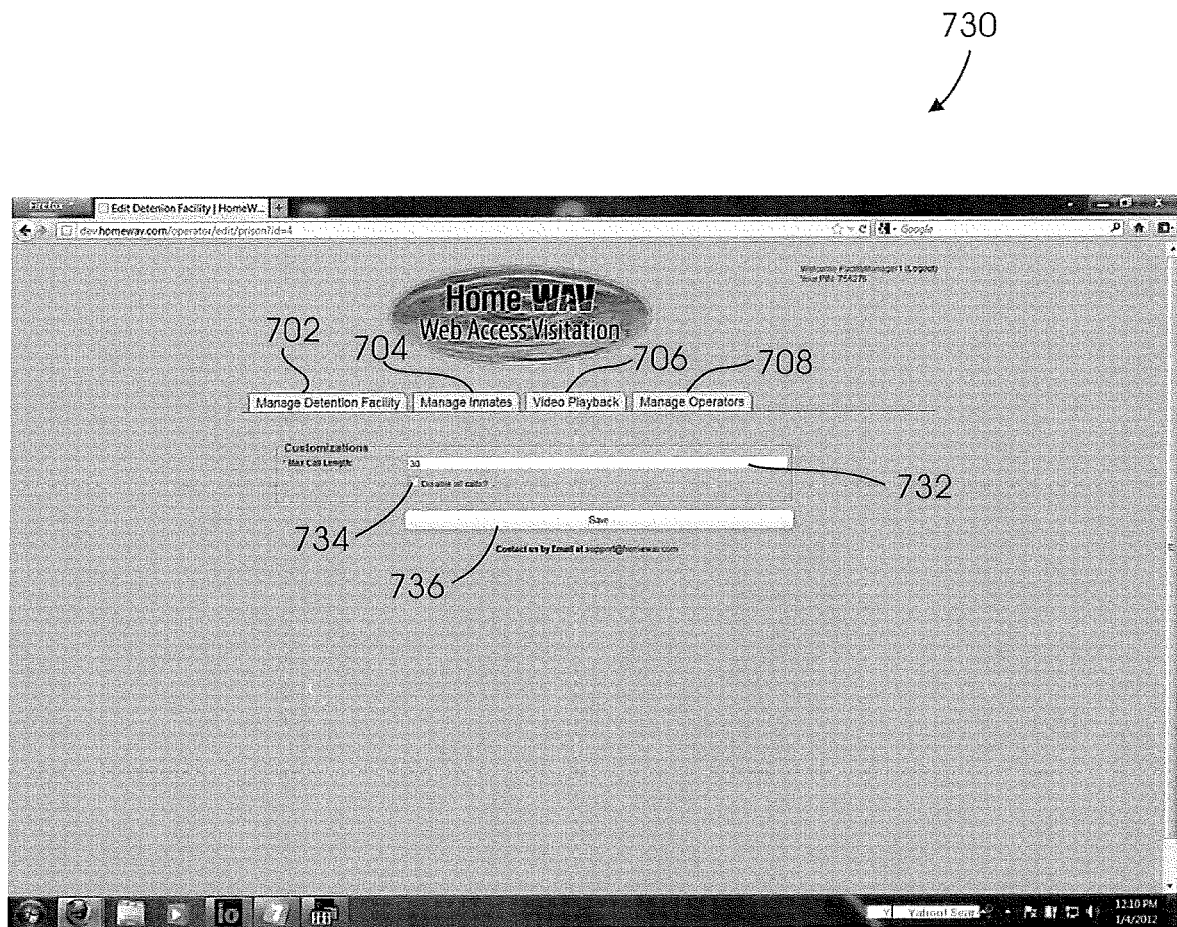
FIG. 6a is a screenshot of a manage detention facility screen of the system for practicing the method of the invention.

Referring now also to FIG. 6a, there is shown a screenshot of "Manage Detention Facility" screen 700.

"Manage Inmates" buttons 704, "Video Playback" button 706, and "Manage Operators" button 708 all direct the operator to different screens, each discussed in detail herein below. Log out link 724 logs the operator out of the HomeWAV system.

Displayed on "Manage Detention Facility" screen 700 are the Facility Name 710, the Facility Location 712, Maximum Call Length 716, Cost per Minute 718, and All Calls Disabled 720.

Pressing "Update Detention Facility Settings" button 722 directs the operator to "Update Detention Facility Settings" screen 730.

Figure 6B:
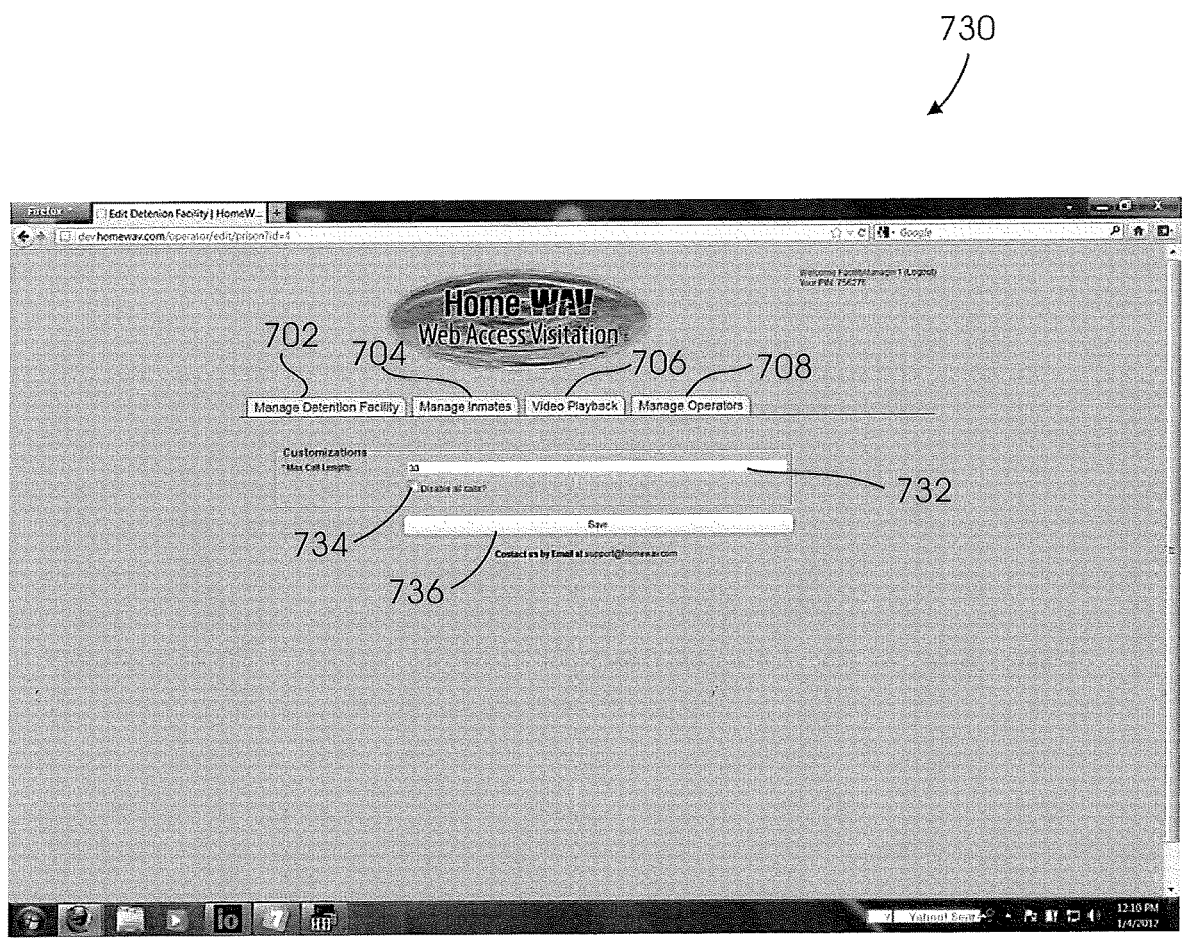
FIG. 6b is a screenshot of a disable calls screen of the system for practicing the method of the invention.

Referring now also to FIG. 6b, there is shown the "Update Detention Facility Settings" screen 730.

The Maximum Call Length value 732 may be set to a desired call length. All calls may be disabled for the facility by clicking check box 734.

Save button 736 records any changes made to the maximum call length or to the all calls disabled status.

The operator may return to "Manage Detention Facility" screen 700 by selecting button 702. Other actions "Manage Inmates", "Video Playback", and "Manage Operator" may be selected using buttons 704, 706, and 708, respectively.

If the operator selects "Manage Inmates" using button 704 from any screen, he/she is directed to the "Manage Inmates" screen 750.

Figure 6C:
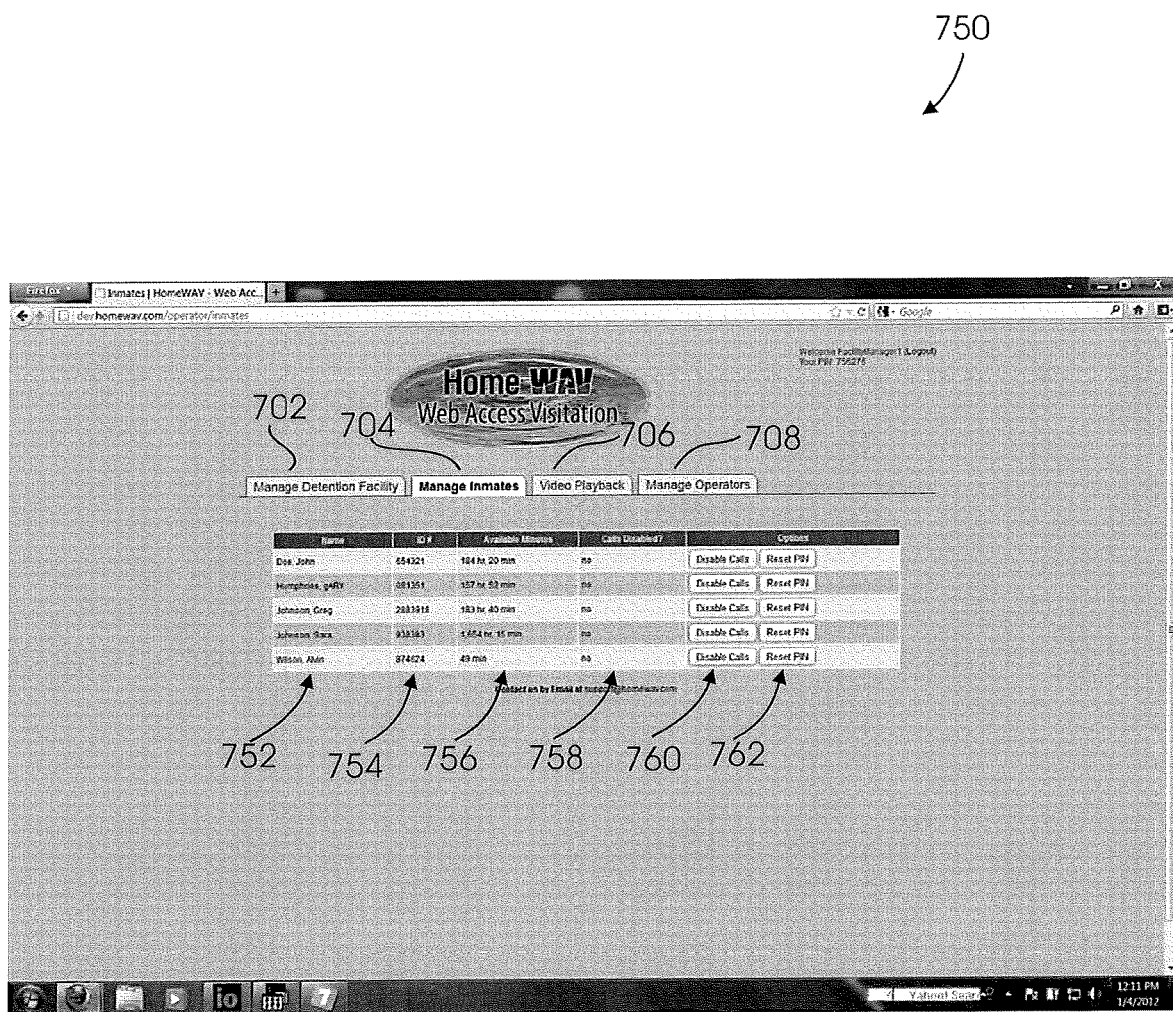
FIG. 6c is a screenshot of a manage inmates screen of the system for practicing the method of the invention.

Referring now also to FIG. 6c, there is shown the "Manage Inmates" screen 750.

A list of inmate names 752 reflects the registered inmate population of the selected detention facility. A column of associated PINs (Personal Identification Numbers) 754, Available Minutes 756, and Calls Disabled Status 758 are associated with each inmate name. Each inmate name 752 also has a "Disable Calls" button 760 and a "Reset Pin" button 762.

Selecting either "Disable Calls" or "Reset PIN" buttons 760, 762, respectively, does not transfer the operator to a different screen but merely presents a pop-up box requesting confirmation of the action.

As with previous screens, the operator may return to "Manage Detention Facility" screen 700 by selecting button 702. Other actions "Manage Inmates", "Video Playback", and "Manage Operators" may be selected using buttons 704, 706, and 708, respectively.

If an operator selects "Video Playback" from any screen using the "Video Playback" button 706, he/she is transferred to "Video Playback" screen 790.

Figure 6D:
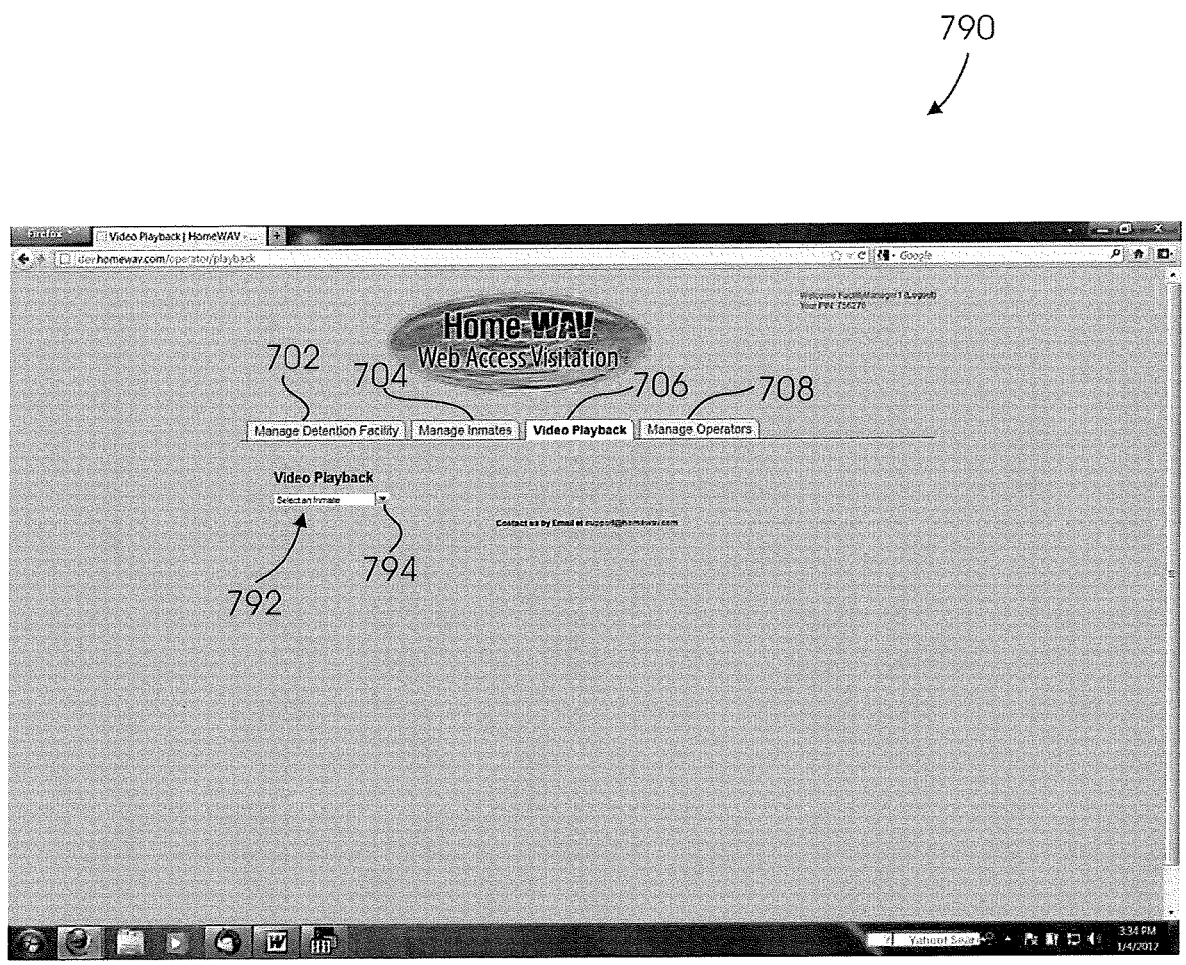
FIG. 6d is a screenshot of a video playback screen of the system for practicing the method of the invention.

Referring now also to FIG. 6d, there is shown a screenshot of the "Video Playback" screen 790.

A pull-down list box 792 activated by control 794 displays all inmates of the detention facility that have registered with the HomeWAV system. Selecting an inmate from the list of inmates transfers the operator to "Video Display" screen 810.

As with previous screens, the operator may return to "Manage Detention Facility" screen 700 by selecting button 702. Other actions "Manage Inmates", "Video Playback", and "Manage Operators" may be selected using buttons 704, 706, and 708, respectively.

Figure 6E:
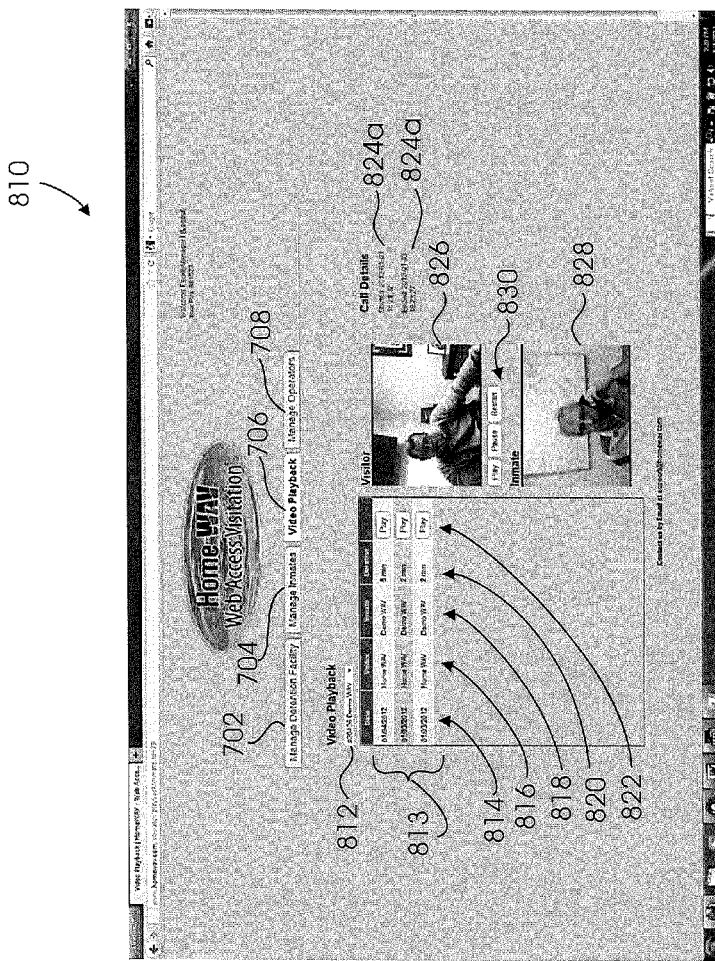
FIG. 6e is a screenshot of a video playback screen of the system for practicing the method of the invention.

Referring now to FIG. 6e there is shown a screenshot of the "Video Display" screen 812. The name and PIN 812 of the selected inmate for whom recorded video is to be viewed is displayed. A matrix of calls 813 with the most recent call at the top of the list is displayed. The columns of the call matrix 813 includes: Date 814, Visitor 816, Inmate 818, and Duration 820. A fifth column includes either a "Play" button 822 or status information if recorded data for the call is not available.

Selecting "Play" button 822 associated with a desired call initiates playback of the selected audio/video file.

A Call Details area, not specifically identified, contains date and start time 824a and date and end time 824b of the selected call.

A Visitor video display area 826 and an Inmate video display area 828 display respective visitor and inmate recorded video.

Controls 830 are used to control playback of the recorded video.

As with previous screens, the operator may return to "Manage Operators" screen 700 by selecting button 708. Other actions "Manage Detention Facility", "Manage Inmates", and "Video Playback" may be selected using buttons 702, 704, and 706, respectively.

If "Manage Operators" button 708 is selected from any screen, the operator is transported to "Manage Operators" screen 840.

Figure 7A:
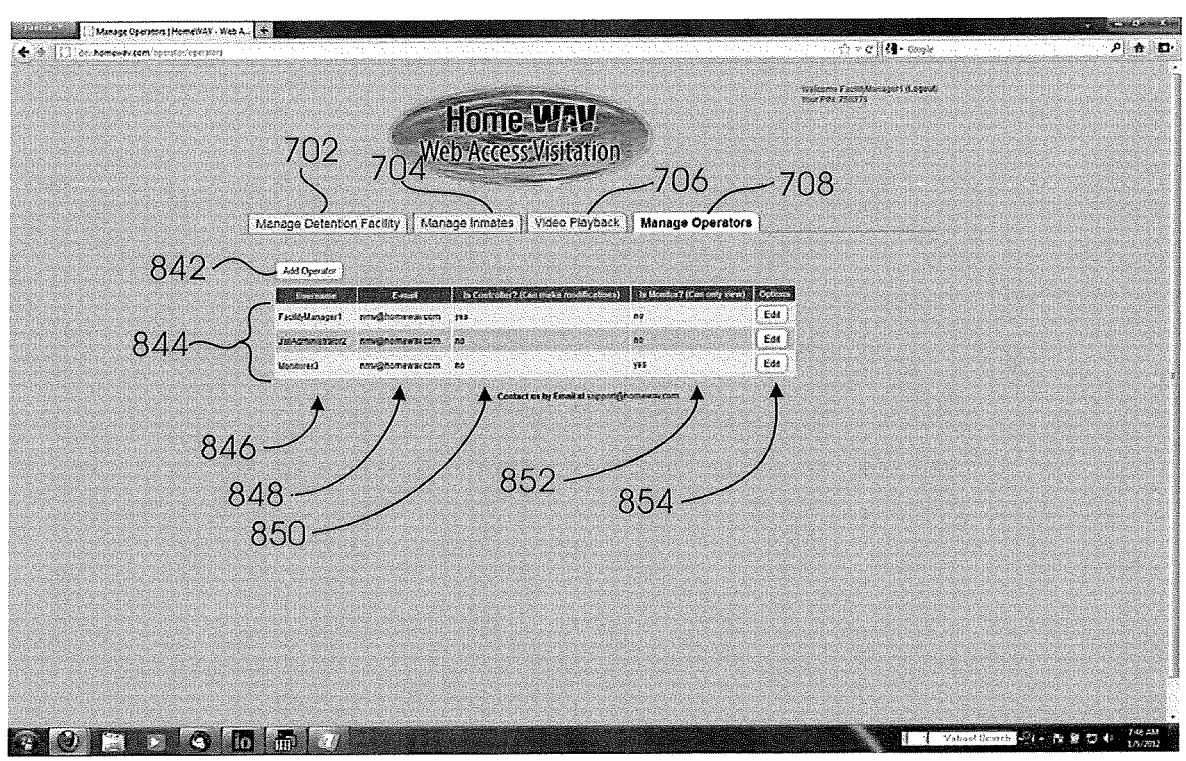
FIG. 7a is a screenshot of the manage operators screen of the system for practicing the method of the invention.

Referring now also to FIG. 7a there is shown a screenshot of the manage operators screen 840. An "Add Operator" button 842 transfers the operator to "Add Operator" screen 860 described in detail herein below.

A list of operators 844 is displayed. Information displayed in operator list 844 includes: Username 846, E-Mail 848, Is Controller? (can make modifications) 850, Is monitor? (can only view) 852, and Options 854. An "Edit" button associated with each Username 846 is located in Options column 854.

Selecting "Edit" (column 854) associated with an operator Username transfers the operator to "Edit an Operator" screen 860.

Figure 7B:
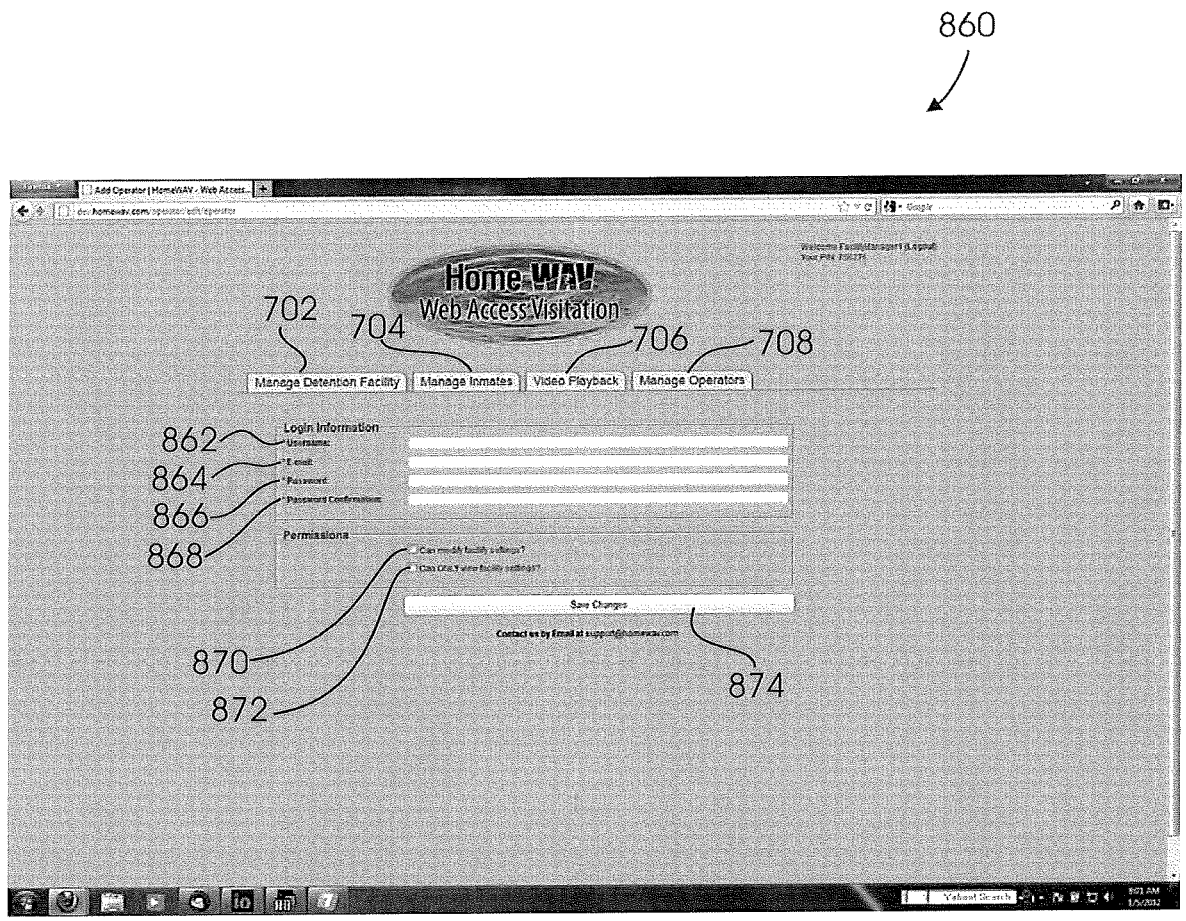
FIG. 7b is a screenshot of the add an operator screen of the system for practicing the method of the invention.
Figure 7C:
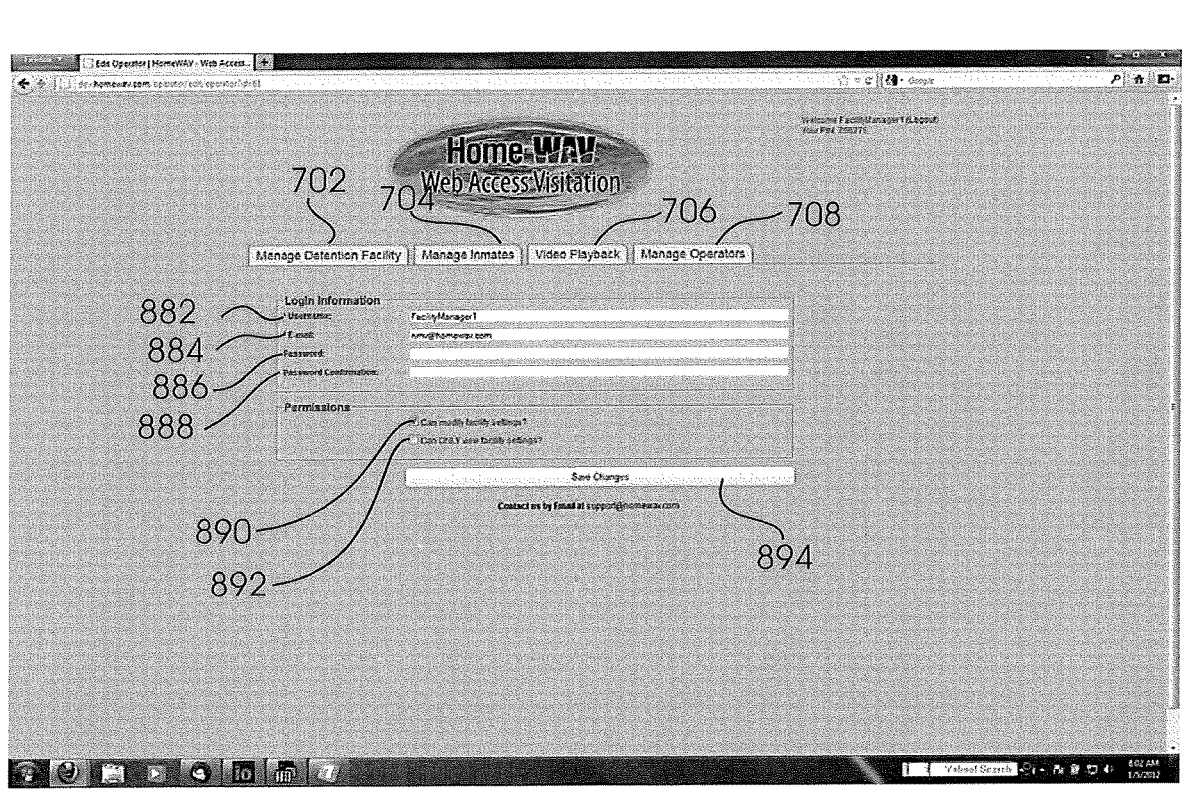
FIG. 7c is a screenshot of the "Edit an Operator" screen of the system for practicing the method of the invention.

Referring now also to FIG. 7c there is shown a screenshot of "Edit an Operator" screen 860. The Username 882, the E-Mail address 884, the Password 886, and the Password Confirmation fields are displayed.

A pair of check boxes 890, 892, respectively, allow the operator associated with the selected Username 882 to "Modify Facility Settings" 890, and "Only Display Settings, 892.

When all information on screen 880 is correct, the operator selects the "Save Changes" button 894 to save the record with all changes.

If "Add Operator" button 842 has been selected, the operator is transferred to "Add Operator" screen 860.

Referring now also to FIG. 7b, there is shown a screenshot of the "Add an Operator" screen 860. As with previous screens, the operator may return to "Manage Detention Facility" screen 700 by selecting button 702. Other actions "Manage Inmates, "Video Playback", and "Manage Operators" may be selected using buttons 704, 706, and 708, respectively.

Web-Based Embodiments

The present disclosure provides a system for providing video and/or telephonic visitation between inmates incarcerated in a prison, and visitors located remotely from the prison. Visitors each have an authorized, Internet connected computer or other Internet appliance including Voice Over Internet Protocol (VoIP) capability. Visitation may be initiated by either the inmate or the remote visitor.

As used herein the term VoIP refers to a specific method of packaging voice signals for transmission over an Internet connection. However, the applicant believes that other methods, protocols, etc. for packaging voice signals for Internet transmission may exist or may emerge in the future. Consequently, as used herein the term VoIP is intended to include any and all existing or emerging voice transmission methods or protocols in addition to the specific method chosen for purposes of disclosure (i.e., VoIP).

Referring next to FIGS. 8a and 8b there are shown top plan schematic views of two possible form factors for a device in accordance with the present disclosure. FIG. 8a shows a device 1100a in the form factor of a so-called tablet computer while FIG. 8b shows a device in the form factor of a so-called "smart" phone. It will be recognized that devices may be provided in a wide range of form factors and, consequently, the disclosure is not considered limited to the form factors chosen for purposes of disclosure.

Each device 1100a, 1100b has four fundamental elements depicted. Each device 1100a, 1100b has a forward-facing camera 1100a, 1100b; a screen 1104a, 1104b; a built-in microphone shown schematically at reference numbers 1106a, 1106b, respectively; and a headphone jack 1108a, 1108b, respectively.

Each device 1100a, 1100b has a wireless communications interface. For purposes of disclosure, a so-called "Wi-Fi" interface has been chosen as a communications interface. It will be recognized by those of skill in the art that other wireless interfaces currently exist and that the pace of development in wireless digital communication is rapid. Consequently, the disclosure is not considered limited to a particular wireless communications interface. Rather, the disclosure is intended to include any suitable wireless interface whether known or yet to be developed in addition to the Wi-Fi interface chosen for purposes of disclosure.

Each device 1100a, 1100b has a unique identifier that may be transmitted by the wireless interface to identify a particular device 1100a, 1100b. Such unique identifiers include but are not limited to a Media Access Control address ("MAC" address) or the like. MAC addresses are most often assigned by the manufacturer of the wireless interface included within a device 1100a, 1100b and are typically stored in the device's hardware, not specifically identified, for example, in read-only memory, or some other firmware mechanism. Such MAC addresses are referred to as burned-in addresses.

It will be recognized that exemplary devices 1100a, 1100b contain electronic support circuitry and a power supply (e.g., a rechargeable battery). Such devices 1100a, 1100b are considered to be well known and may be purchased as off-the-shelf devices. Optionally, such devices 1100a, 1100b may be custom built for the application and may contain security features, not specifically identified, designed to allow more secure operation in a correctional facility environment.

In a prison, any communication apparatus for use by inmates has heretofore been an apparatus constructed using "prison hardened" techniques and materials. Inmates have used such apparatus for all communications with the outside world.

The present disclosure supplements or replaces such apparatus with the devices 1100a, 1100b individually "owned" (i.e., purchased, rented, or leased) by individual inmates from the prison or from the system operator of the prison visitation system. The HomeWAV Web Access Visitation for Correctional Facilities by HomeWAV, LLC of Virginia Beach, Va. USA, hereinafter the HomeWAV system or simply the system, is assumed to be the system operator for purposes of disclosure.

Figure 9:
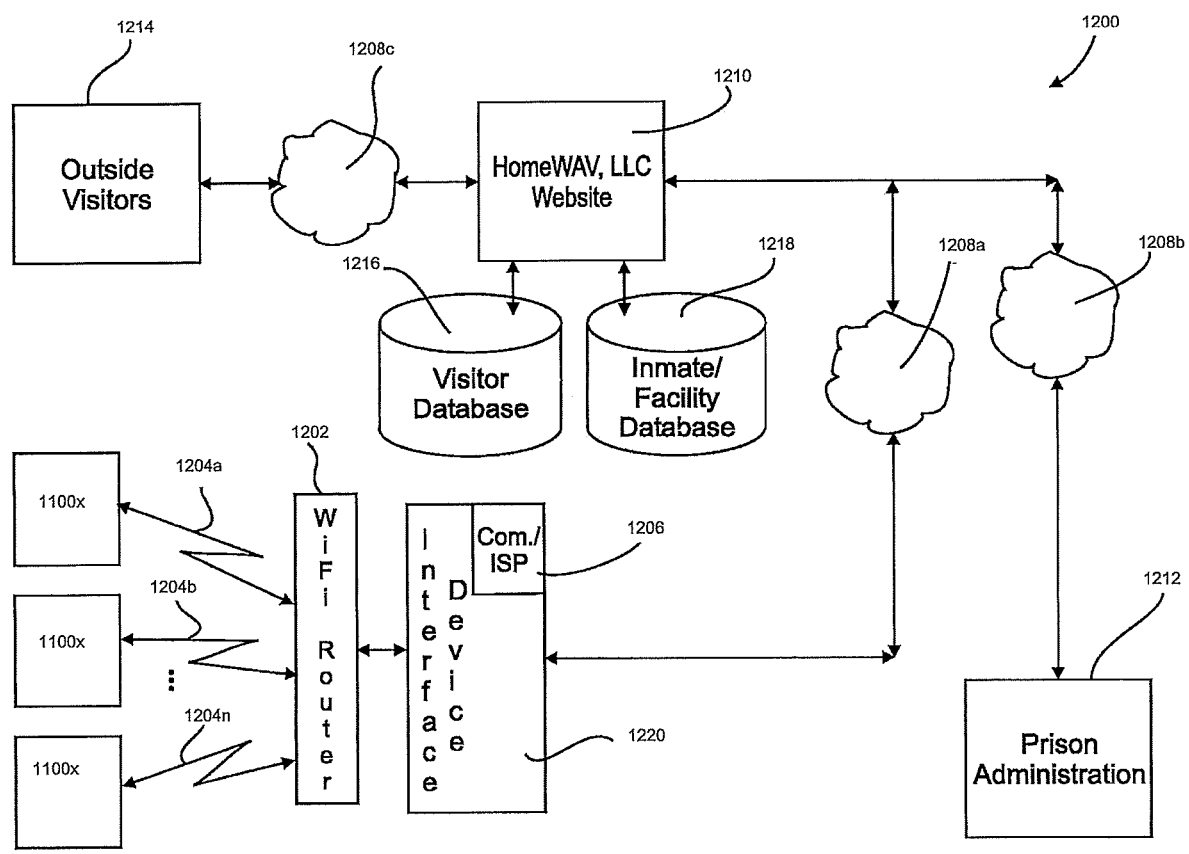
FIG. 9 is a simplified system block diagram of a portion a security system supporting the electronic devices of FIG. 1 in accordance with one exemplary embodiment.

Referring now to FIG. 9, there is shown a greatly simplified block diagram of the novel HomeWAV, LLC prison visitation system in accordance with the disclosure, generally at reference number 1200. Hereinafter, for purposes of brevity, the HomeWAV prison visitation system is referred to as "the HomeWAV system". The HomeWAV system 1200 provides "gate keeping" security functions that assure only valid, authorized devices 1100a, 1100b are allowed to communicate with the HomeWAV system 1200. Further, the HomeWAV system 1200 ensures that inmates may communicate only with authorized visitors as approved and controlled by the prison.

As used herein, reference number 100x, 1100x or simply 100 or 1100 is used to generically refer to any and all devices for example, devices 100a, 100b, 1100a, 1100b.

Using the devices 100x and 1100x with the system 1200 and methods of the present disclosure, inmates may communicate only with the HomeWAV system. Each device 1100x is pre-programmed such that it can only access the HomeWAV system. As used herein, the term pre-programmed refers to either software or hardware modifications or add-ons that limit an off-the-shelf device to exclusive communication with the HomeWAV system. Prisoners are allowed access to only those applications and programs on the HomeWAV system that have been approved by the prison. Specifically, device 1100x is pre-programmed to prevent uncontrolled access to the Internet.

More specifically, each device 1100x may be pre-programmed so that it will only link with a particular wireless 1202 router located within the prison. It is especially important to note that no two devices 1100x are allowed to communicate directly with one another, and each device will only be allowed to communicate with visitors who have been approved to visit with the inmate to whom the particular device has been assigned.

Communication capabilities usually associated with an off-the-shelf electronic appliance such as cell phones, smart phones, or tablet computers, etc. may be modified. In device 1100x, any existing cellular network communications or open wireless network communication (i.e., Wi-Fi) is typically disabled.

HomeWAV system 1200 incorporates security features that make it practical for an individual inmate to posses his or her own device 1100x. For example, each device 1100x may require biometric input from a particular inmate for the device to be activated. In most embodiments, a unique prisoner-generated personal identification number (PIN) may be required for device 1100x activation. Further, Home-WAV system 1200 limits each device 1100x to communicating with the IP addresses of a particular inmate's approved visitors' equipment as controlled by the Home-WAV, LLC website 1210 via portion 1208a of the "cloud". It will be recognized that while three "cloud portions" 1208a, 1208b, 1208c are shown on FIG. 9, that representation is done for clarity in depicting the flow of information in the HomeWAV prison visitation system. There is, of course, only a single "cloud" representing the entire Internet.

Three devices 1100x, representative of any number of such devices 1100x found in a prison, are shown communicating with a wireless router 1202 via communications paths 1204a, 1204b . . . 1204n using a built-in Wi-Fi communications interface, not specifically identified, within devices 1100x.

Router 1202 may have an integrated server, for example, an Interface Device shown schematically at reference number 1220, or it may be connected, along with other routers, not shown, with a server, not shown, located elsewhere in the prison. The prison's routers, servers, and associated connections, none of which are shown, constitute the prison's local area network (LAN), not specifically identified. The prison's LAN is, in turn connected to the wide area network (WAN) outside of the prison via a communications portion 1206 that may include the prison's Internet Service Provider (ISP), not specifically identified. The prison's LAN is thereby connected to the Internet, shown schematically as cloud portion 1208a.

A prison administration workstation, not shown, but described in detail in the '569 Patent is connected to the HomeWAV website 1210 via another Internet connection shown schematically as portion 1208b of the cloud.

Outside visitors communicate with the HomeWAV website 1210, via the Internet, shown schematically as cloud portion 1208c.

The HomeWAV website 1210 maintains and accesses databases of visitors 1216 and of inmates and prisons 1218. Using information from databases, the HomeWAV visitation system 1200 acts as a gate keeper whereby only registered visitors are connected to registered inmates with whom that visitor is specifically authorized to visit.

Based on input from Prison Administration 1212 all or selective portions of an inmate's communication may be disabled. Single, identified groups (e.g., a cell block, etc.), or all devices 1100x may be disabled by prison administration 1214. In addition to complete disabling of devices 1100x, hours of operation may be imposed on a device by device basis at the discretion of prison administration 1214. Additional control may be exercised by prison administration 1212 as also described in detail in the priority '569 Patent.

The HomeWAV system 1200 of FIG. 9 relates only to prison visitation system using devices 1100x in possession of individual inmates. In the priority '569 Patent, there is disclosed a system for video visitation that allows inmates to initiate video visitation calls from secure terminals within the prison during allowed hours to pre-approved outside visitors equipped with an Internet enabled computer or other similar appliance. These prisoner-initiated video visitations do not rely on prison personnel to either establish, schedule, or monitor these visitations. All visits, unless excepted by attorney-client or clergy privilege, are recorded for security purposes. The system of the '569 Patent, however, has no provision for video or telephone visitation originated by an approved outside visitor to an inmate.

The HomeWAV system 1200 of FIG. 9 is assumed to have all necessary security enhancements to allow outside visitor originated video or telephonic visitation. Such system enhancements are discussed in detail herein below.

The novel concept of letting inmates have individual communications devices under their own control opens numerous possibilities for enhanced visitation via VoIP telephone and/or video visitation.

Figure 10A:
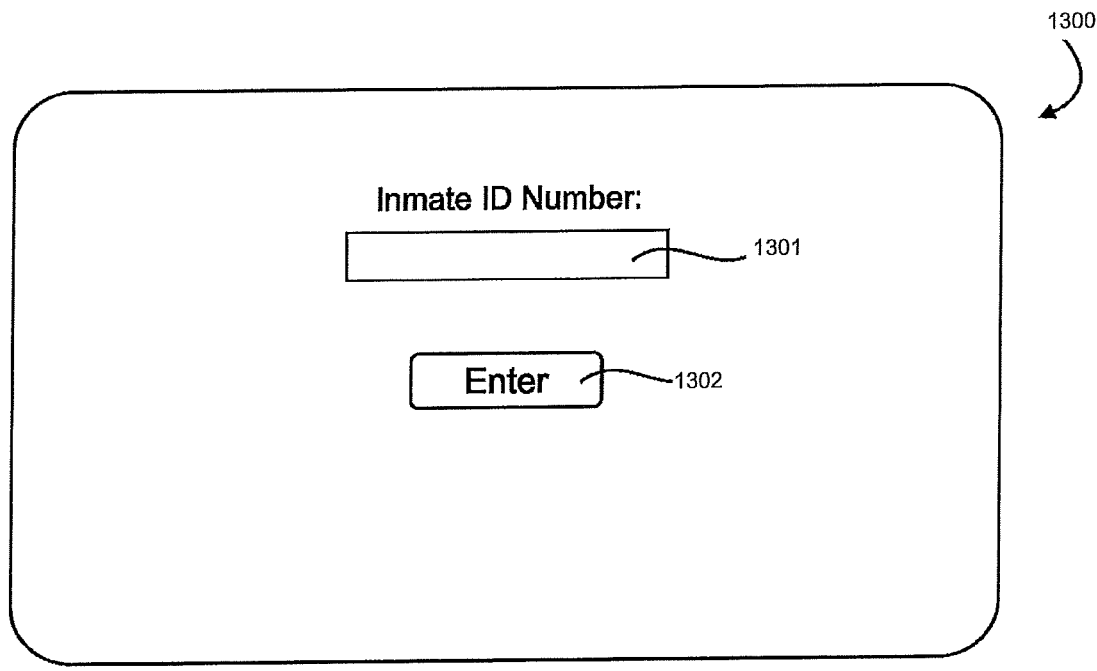
FIG. 10a is a screen shot of the screen the inmate views when his/her device wakes up in accordance with one exemplary embodiment.
Figure 10B:
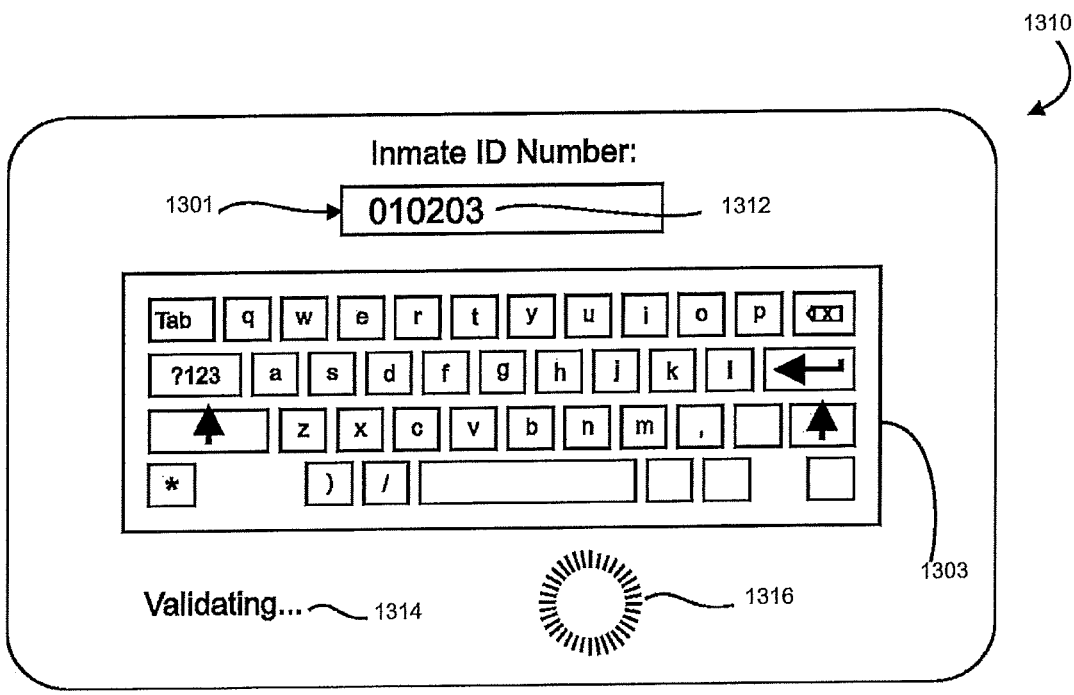
FIG. 10b is a screen shot of an inmate's sign in screen.
Figure 10C:
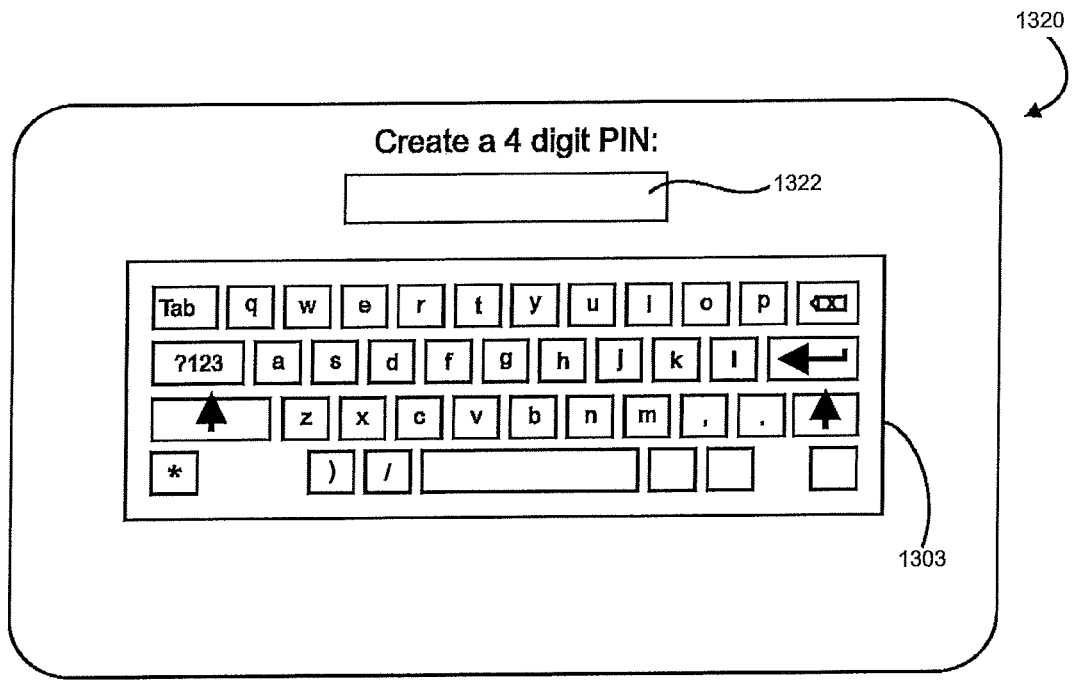
FIGS. 10c and 10d are screen shots of an inmate's create a new PIN process in accordance with one exemplary embodiment.
Figure 10D:
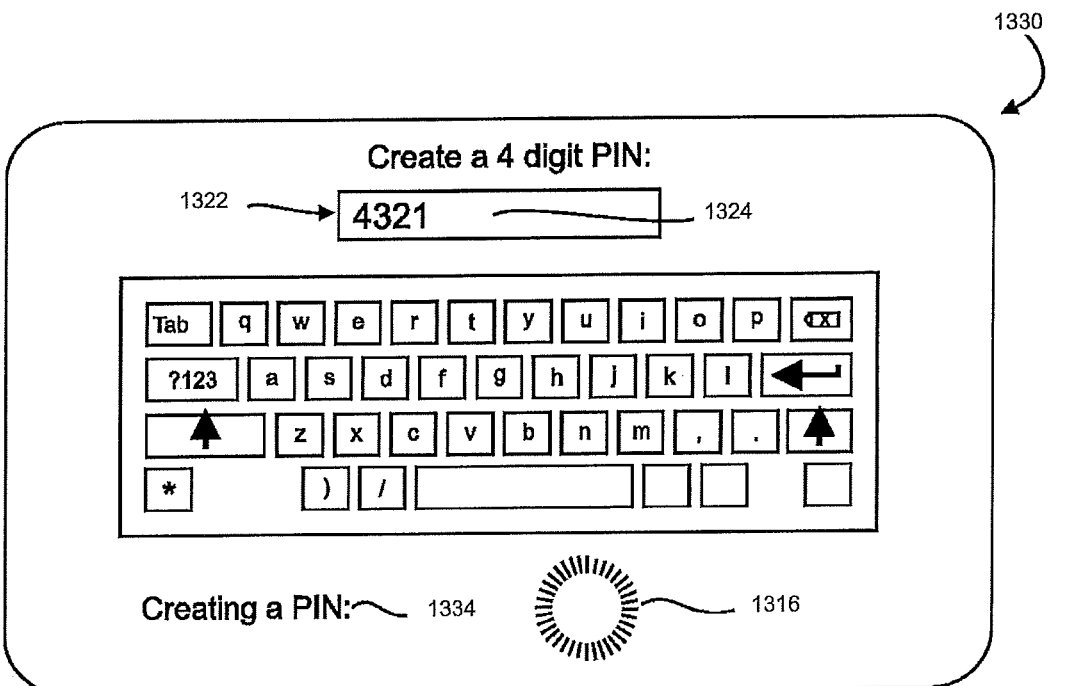
Figure 10E:
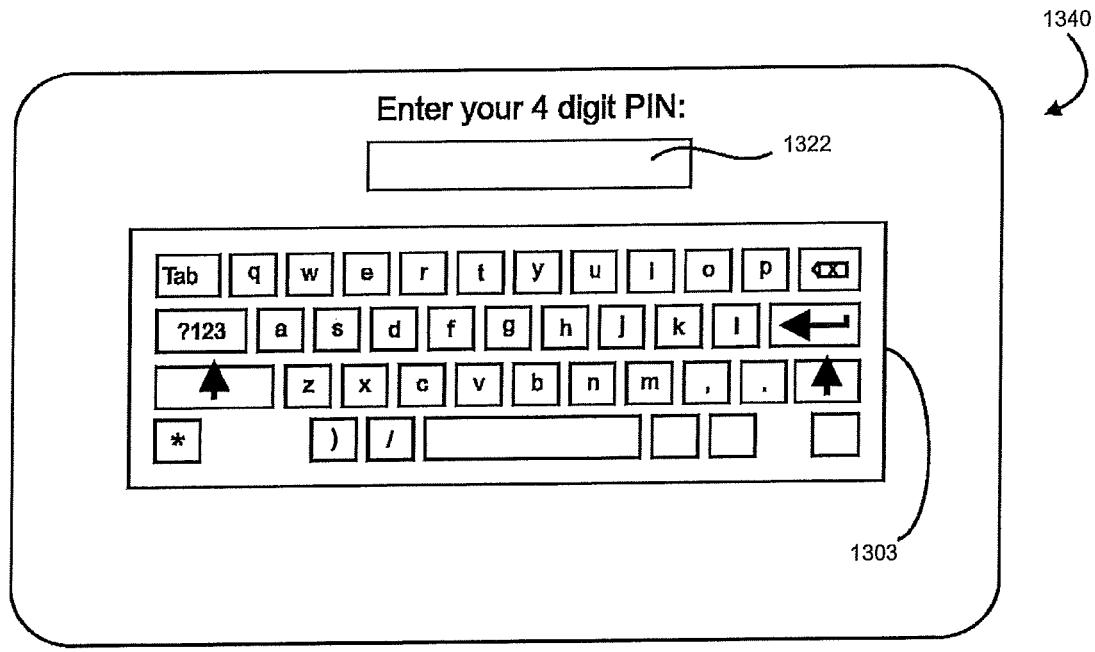
FIGS. 10e and 10f are screen shots of an inmate's existing PIN entry and validation process in accordance with one exemplary embodiment.
Figure 10F:
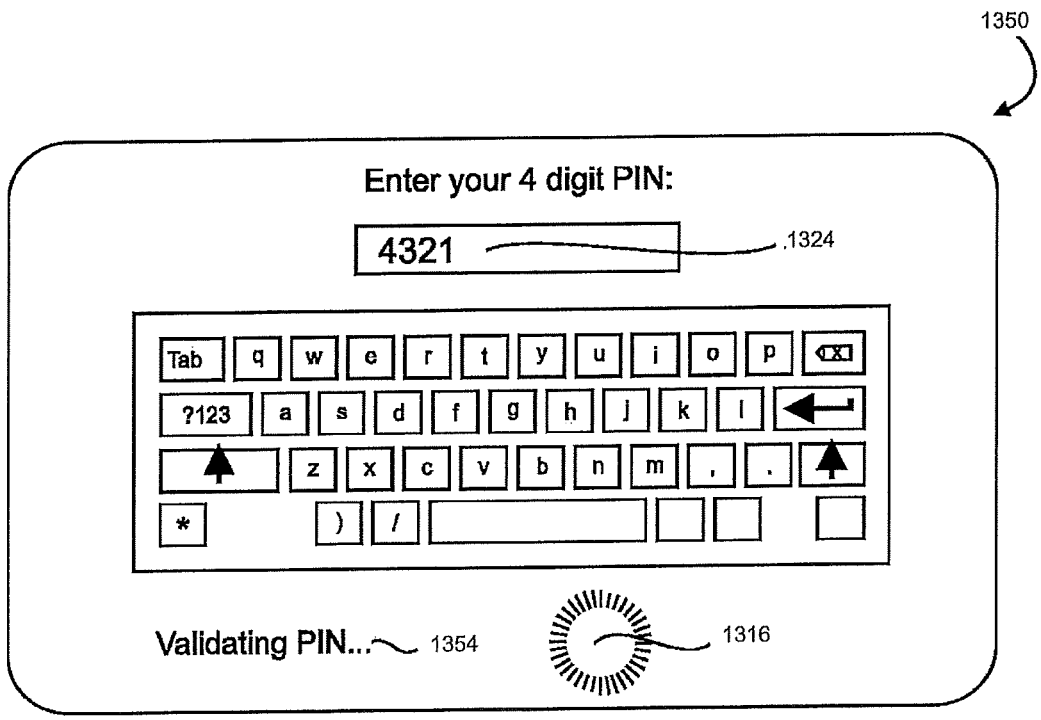
Figure 10G:
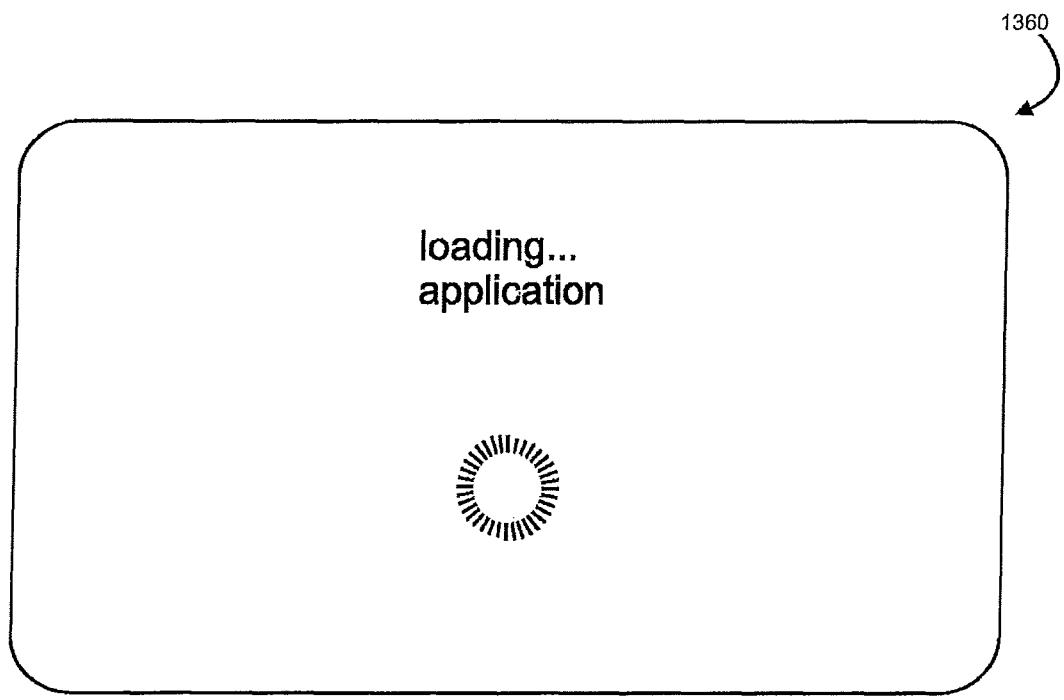
FIG. 10g is a screen shot of an application loading status screen in accordance with one exemplary embodiment.
Figure 10H:
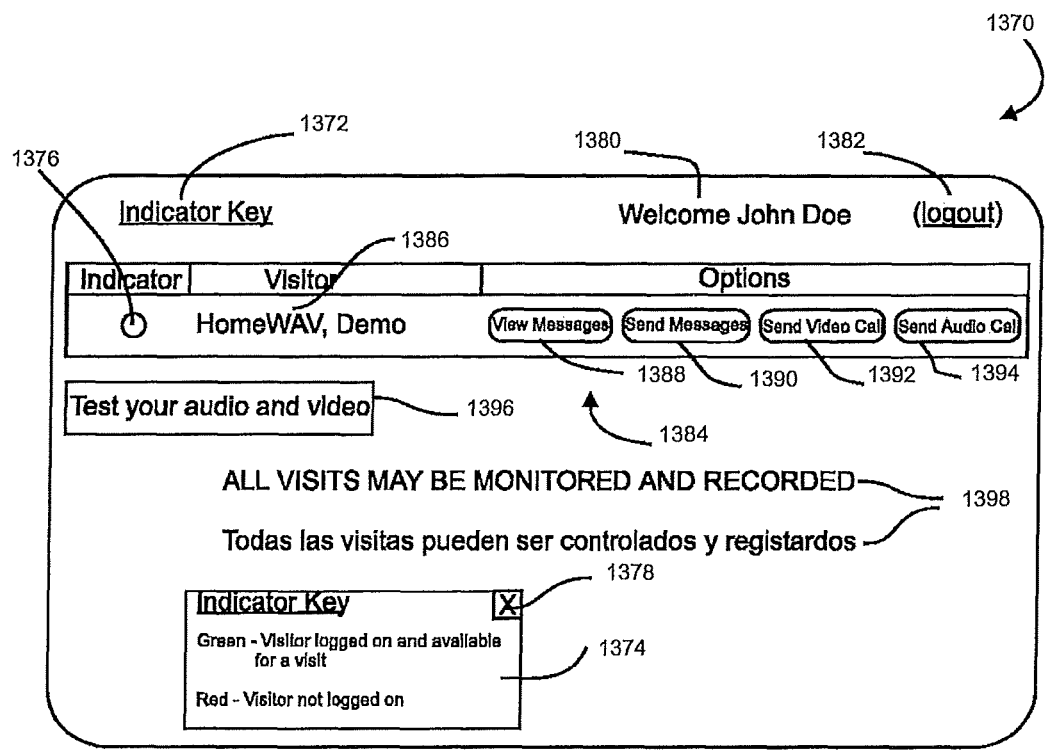
FIG. 10h is a screen shot of an inmate's home screen in accordance with one exemplary embodiment.
Figure 10I:
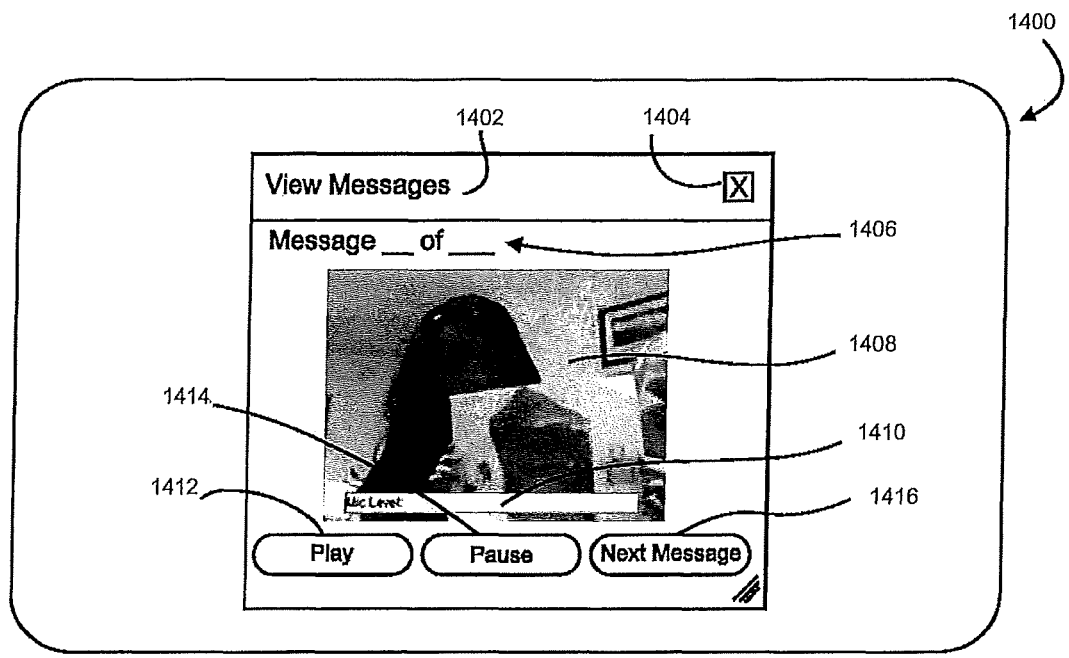
FIG. 10i is a screen shot of a view and play messages process in accordance with one exemplary embodiment.
Figure 10J:
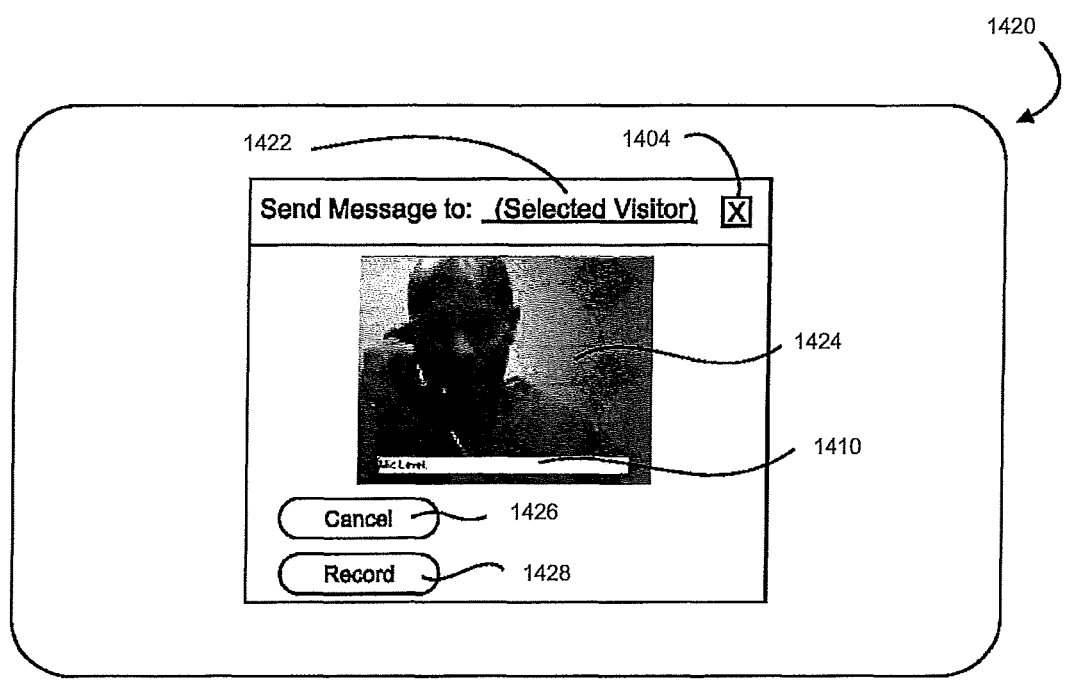
FIG. 10j is a screen shot of a send message process in accordance with one exemplary embodiment.
Figure 10K:
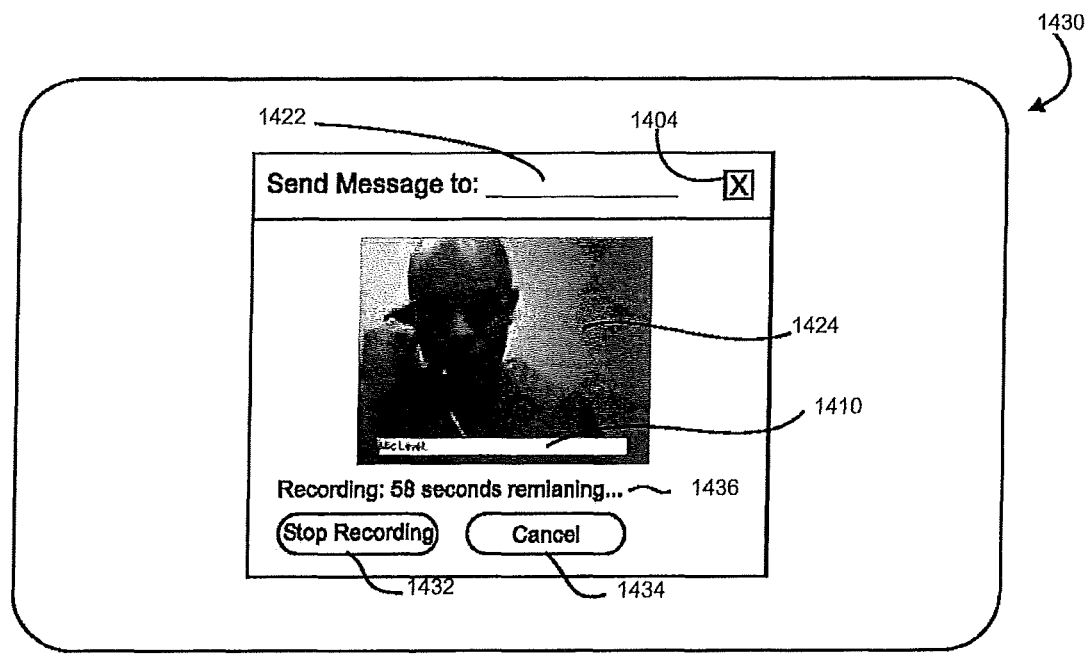
FIGS. 10k and 10l are screen shots of the record a message process in accordance with one exemplary embodiment.
Figure 10L:
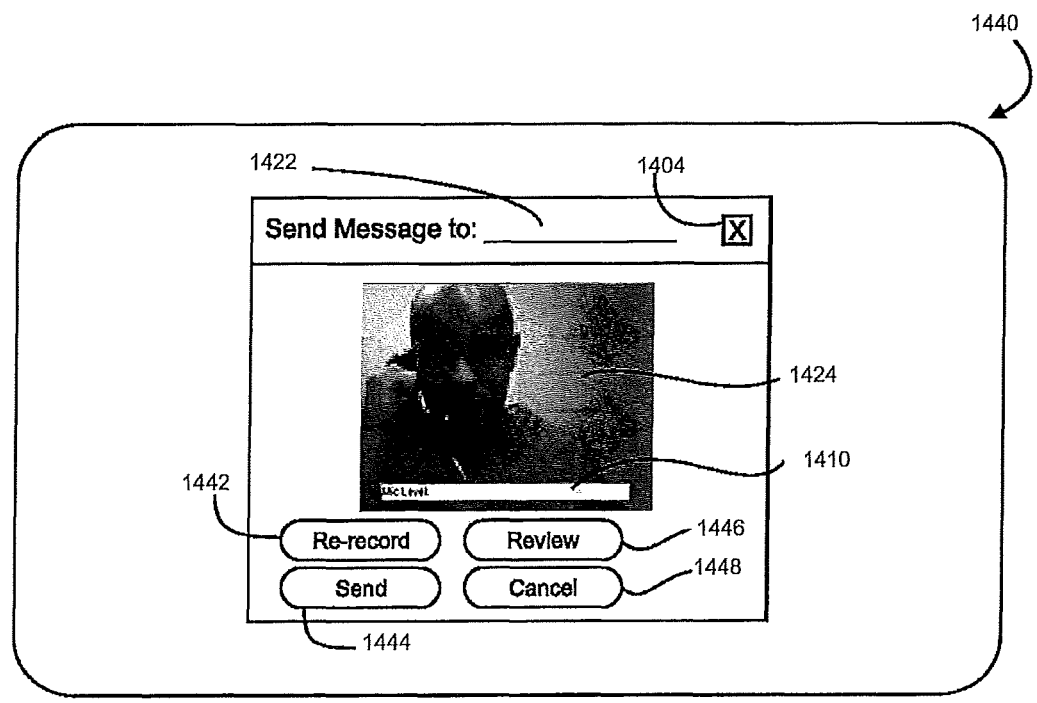
Figure 10M:
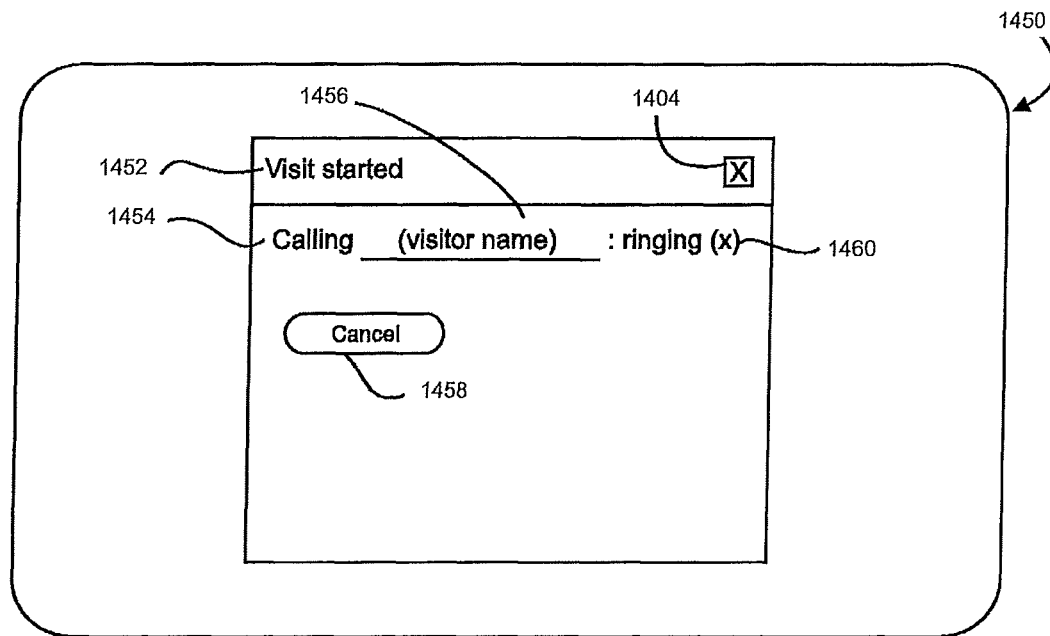
FIG. 10m is a screen shot of the initiate a video visitation process.
Figure 10N:
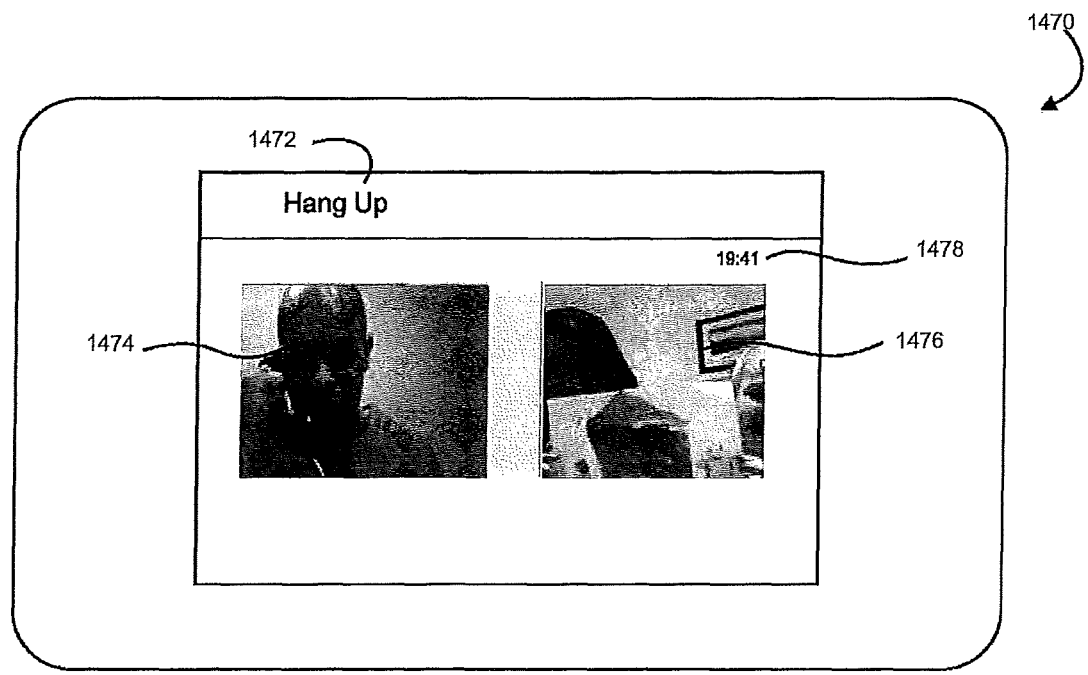
FIG. 10n is a screen shot of a video visitation in process in accordance with one exemplary embodiment.
Figure 10O:
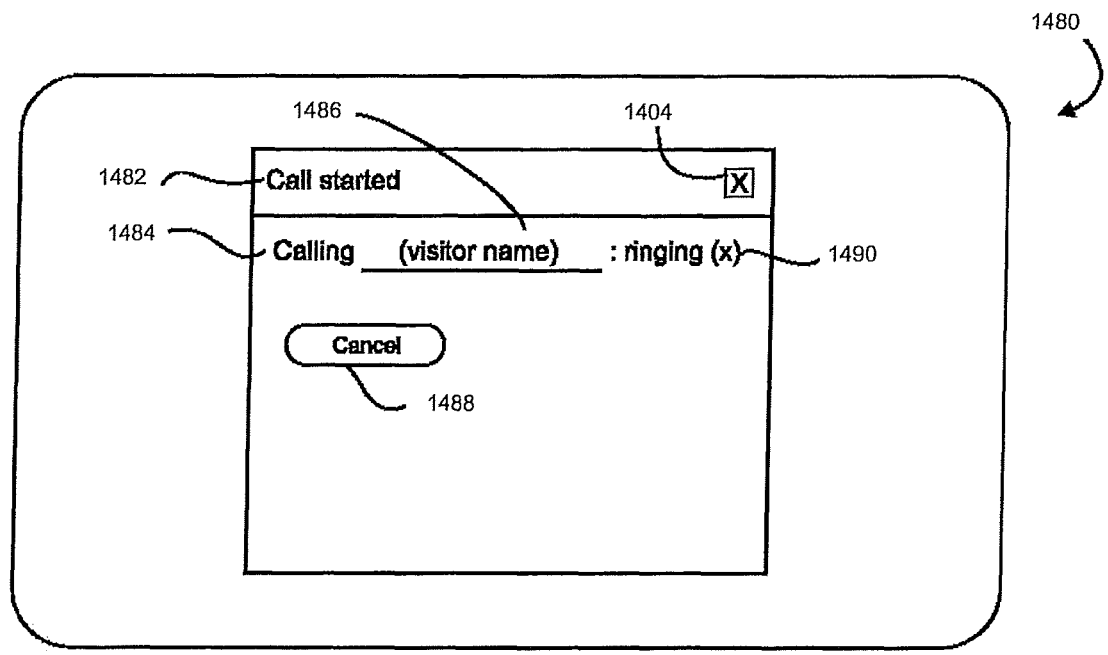
FIG. 10o is a screen shot of the initiate a VoIP telecommunication process in accordance with one exemplary embodiment.
Figure 10P:
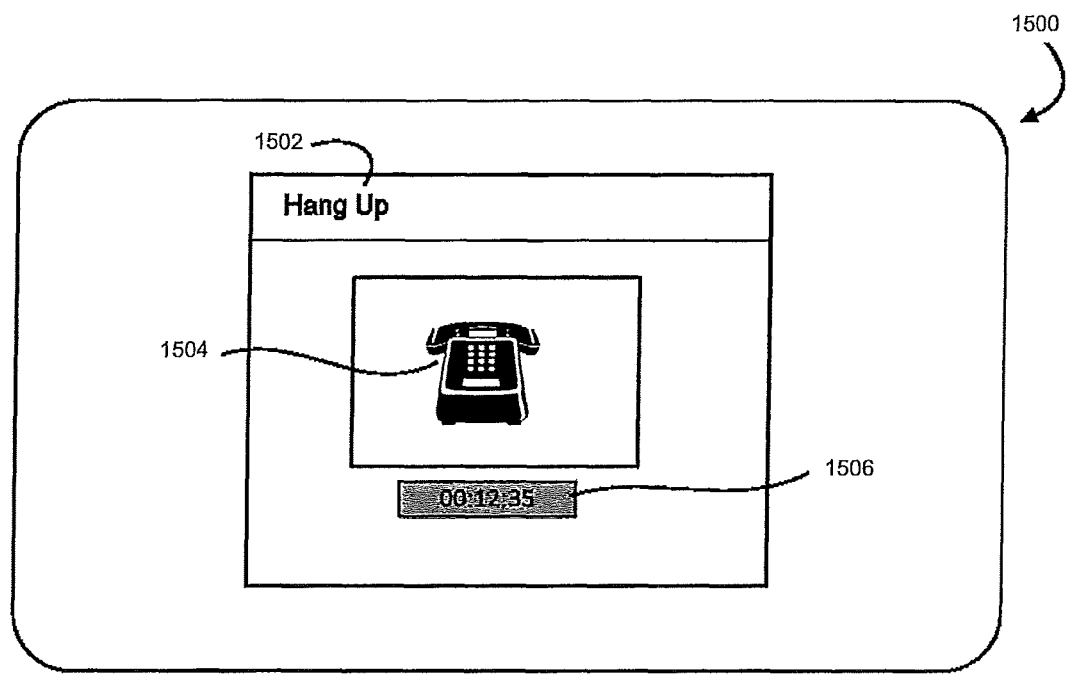
FIG. 10p is a screen shot of the VoIP telecommunication in process in accordance with one exemplary embodiment.

Refer now also to FIGS. 10a-10p.

FIG. 10a, shows a "wakeup" screen shot 1300 of device 1100x that is displayed when device 1100x is turned on, and assuming that device 1100x is a touch screen device and the screen is touched. A field 1301 shows where the inmate may enter his or her Inmate ID No. An "Enter" button 1302 is also shown.

FIG. 10b shows a screen 1310 that appears after "wakeup" screen 1300 and displays a touch screen keyboard 1303 and field 1301 into which an inmate has typed his or her Inmate ID Number, 1312.

Once the inmate has entered his or her ID Number 1312, a status message 1314 that indicates that the information is being validated is displayed. In addition, a rotating icon 1316 indicates that the device 1100x is processing the information. The entered Inmate ID Number 1312 is checked against a list of authorized inmate numbers possibly stored in device identification database 1208. In addition, the MAC Address or similar unique ID of the device 1100x is checked against a list of authorized devices 1100x. In some cases, the MAC Address is checked against the Inmate ID Number 1312 to ensure that the correct inmate is using the device 1100x.

Assuming that the MAC address etc. is valid and the inmate has entered a valid Inmate ID Number 1312, one of two screens will be displayed to the inmate.

If this is the first time signing into the HomeWAV system from device 1100x, a new screen 1320 (FIG. 10c) is displayed. On screen 1320, the inmate is instructed to Create a 4 Digit PIN in a field 1322. After the inmate enters a 4 digit PIN 1324, the system informs the inmate that the PIN 1324 is being created (screen 1330=FIG. 10d).

If, however, it is not the first time the inmate has logged into the HomeWAV system from device 1100x, then screens 1320 and 1330 (FIGS. 10c and 10d) are not displayed. Instead, screen 1340 (FIG. 10e) is displayed and the inmate is instructed to enter his or her PIN 1324 in window 1322 using virtual keyboard 1303.

Once the PIN 1324 is entered, screen 1350 (FIG. 10f) is displayed and a status message 1354 indicates that the PIN 1324 is being validated. Again, rotating icon 1316 indicates that the device 1100x is processing the information.

Once the PIN 1324 is validated, a new screen 1360 (FIG. 10g) is displayed that indicates to the inmate that the "application" (i.e., the HomeWAV system) is loading.

When the loading is complete, the Inmate sees screen 1370 (FIG. 10h). This is the home screen from which all inmate initiated HomeWAV visitation tasks are managed.

The device 1100x is constrained via hardware, software, firmware, or by other means believed to be known to those of skill in the art such that the only options that an inmate may choose are displayed on screen 1370. The four options are: 1) viewing received video messages 1388; 2) creating and sending a video message 1390; 3) initiating a video visit with an authorized visitor 1392; and 4) initiating a VoIP phone call to an authorized visitor 1394. The inmate selects the desired action by touching the appropriate controls on the screen of device 1100x.

Screen 1370 presents the inmate a list of visitors 1386 who have registered and prepaid for minutes for visitation with that particular inmate. The priority '569 Patent includes a complete discussion of visitor registration and payment procedure. Consequently, neither visitor registration nor payment procedures are further discussed herein.

An "Indicator Key" link 1372, when selected, produces pop-up box 1374. Pop-up box 1374 shows the definitions of all possible colors of indicator(s) 1376. Selecting control 1378 removes pop-up box 1374 from the screen.

The message "Welcome "John Doe" (the actual inmate name is displayed) 1380 is displayed at the top of the screen 1370. A logout control 1382 near the upper right corner of screen 1370, when activated, logs the inmate out of the HomeWAV system.

A "Test your audio and video" button 1396 allows the inmate to test the operational readiness of his or her device 1100x and to ensure that audio volume is properly adjusted.

One or more lines of information 1384 (only one line shown for simplicity) give the inmate the current status of all potential (i.e., registered) visitors. When multiple potential visitors are registered, a line for each such visitor is displayed. The scrolling functions of device 1100x are used to select and highlight the desired visitor with whom the inmate wishes to communicate.

The Visitor Name 1386 is shown adjacent status indicator 1376. Four option buttons 1388, 1390, 1392, 1394 allow the inmate to "View Messages", "Send Message", "Send Video Call", and "Send Audio Call", respectively.

A message 1398, typically provided in both English and Spanish, reminds the inmate that any audio call or video visit may be monitored and/or recorded.

Selecting "View Messages" control 1388 causes screen 1400 (FIG. 10i) to be displayed. A status line 1406 displays which of the saved messages is currently being displayed.

A central portion of screen 1400 displays an image 1408 originated by the person leaving the message being viewed.

Volume level may be adjusted using control 1410.

Play button 1412, Pause button 1414, and Next Message button 1416 each perform the indicated action.

Pressing Exit button 1404 returns the inmate to home screen 1370.

Another action selectable from home screen 1370 is to record and send a video message. This is accomplished using the Send Messages button 1390. Pressing Send Messages button 1390 causes screen 1420 (FIG. 10j) to be displayed. It should be noted that the message will be sent to the visitor previously selected on screen 1370.

The name 1422 of the visitor to whom the inmate is sending a message is displayed near the top of screen 1420. Again, Exit button 1404 returns the inmate to home screen 1370.

An image 1424 of the inmate creating the message is displayed in a central portion of screen 1420.

Microphone level is adjustable using control 1410.

Two action buttons, Cancel 1426 and Record 1428 are used to control the recording of a message to be sent.

Selecting record button 1428 causes screen 1430 (FIG. 10k) to be displayed.

Most of screen 1430 needs no additional explanation as it is in large part a replication of screen 1420 previously discussed.

A status message 1436 indicates the amount of recording time remaining during which the inmate should complete his or her recording.

Two action buttons, Stop Recording 1432 and Cancel 1434 perform the indicated functions. Selection of the Stop Recording button 1432 causes screen 1440 (FIG. 10l) to be displayed.

Screen 1440 allows the inmate to select several functions related to the just-recorded message. He or she may choose to re-record the message by selecting Re-record button 1442. When selected, Re-record button 1442 returns the inmate back to screen 1420 where he or she may re-record his or her message.

Send button 1444 sends the message to the selected visitor and, once sent, the inmate is returned to home screen 1370.

Review button 1446 allows the inmate to play back his or her message.

Cancel button 1448 discards any recorded message and return the inmate to home screen 1370.

Once back at home screen 1370 the inmate may select another action.

The inmate may initiate a video visit to the selected visitor by pressing Send Video Call control 1392. When Send Video Call control 1392 is selected, screen 1450 (FIG. 10m) is displayed and the call to the selected visitor is initiated. The status message 1452 indicates that the visit is started.

Message 1454 indicates the name of the visitor being called 1456 and the number of rings 1460.

Cancel button 1458 terminates the calling process.

Assuming the visitor being called 1456 answers, screen 1470 (FIG. 10n) is then displayed.

A hang up control 1472 is used to terminate the call. Video 1474 captured by camera 1102a (FIG. 8a) of device 1100x is displayed in a left panel of screen 1470.

Visitor originated video 1476 is displayed in a right panel of screen 1470.

The maximum time remaining for the visit 1478 is displayed above the upper right hand corner of visitor originated video 1476. The maximum time for a visit may be a prison-imposed time maximum or may indicate the number of prepaid minutes remaining in an inmate's account.

At the conclusion of the call, either the inmate or the visitor may hang up, control 1472. The inmate is then returned to home screen 1370.

Finally, an inmate may initiate a VoIP call to a selected visitor by selecting "Send Audio Call" button 1394. Selecting button 1394 causes screen 1480 (FIG. 10*o*) to be displayed.

A status message "Call Started" 1482 is displayed.

A message 1484 Calling "Jane Smith" (actual visitor's name is shown) 1486 and a count of the rings 1490 is also displayed.

A Cancel button 1488 is used to terminate the calling process.

When the visitor being called answers, screen 1500 (FIG. 10*p*) is displayed. The telephone icon 1504 remains on the screen for the duration of the call. A Hang Up control 1502 is used to terminate the voice call.

Call time remaining 1506 is displayed on screen 1500 under telephone icon 1504.

Inmate originated video messages, VoIP phone calls or video visits have been described hereinabove. Device 1100*x* is also adapted and configured to directly receive visitor originated VoIP telecommunications and video visitations.

Such video visitations and/or VoIP telecommunications are received directly by the inmate without any intervention by prison personnel.

A visitor who has been registered by the prison and who has placed funds in an account associated with the inmate with whom he or she wishes to visit logs into the HomeWAV system from his or her computer. As mentioned hereinabove, the term computer is used herein to represent any device capable of VoIP and/or video communication with the HomeWAV system.

Figure 11A:
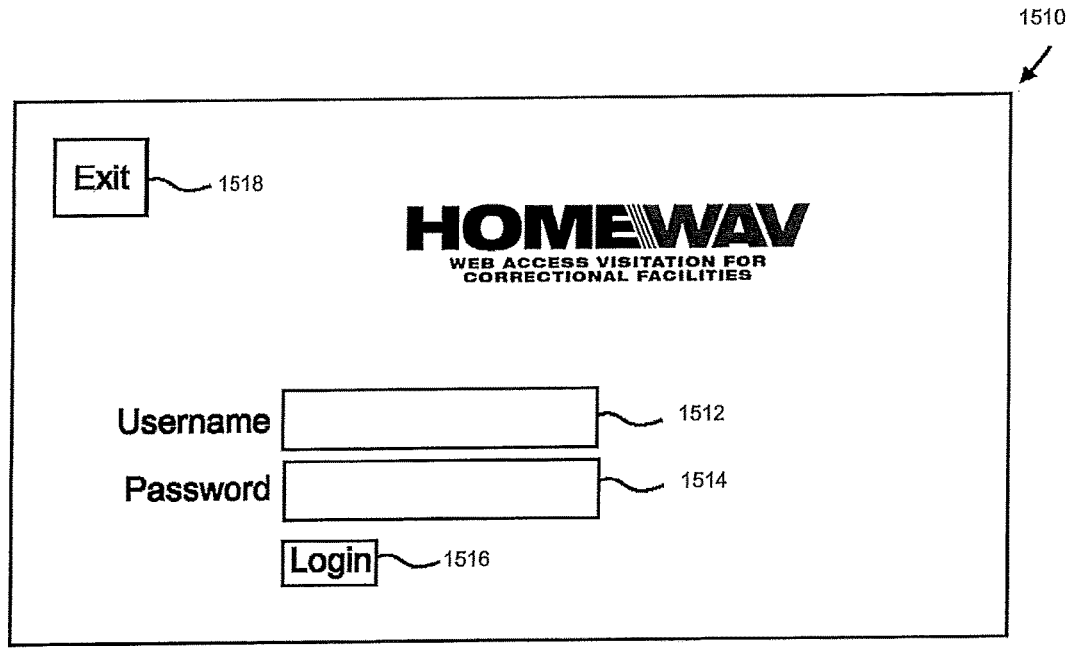
FIG. 11a is a screen shot of a visitor's login process in accordance with one exemplary embodiment.

The visitor station displays a login screen 1510 (FIG. 11*a*) and is requested to enter his or her user name 1512 and password 1514. User name and password were previously established during a visitor registration process described in the priority '569 Patent. Consequently, the registration process is not further described or discussed herein.

Once the user name 1512 and password 1514 are entered, the visitor selects the Login button 1516 to log into the HomeWAV system. Alternately if the user wishes to terminate the process, he or she selects the Exit button 1518.

Figure 11D:
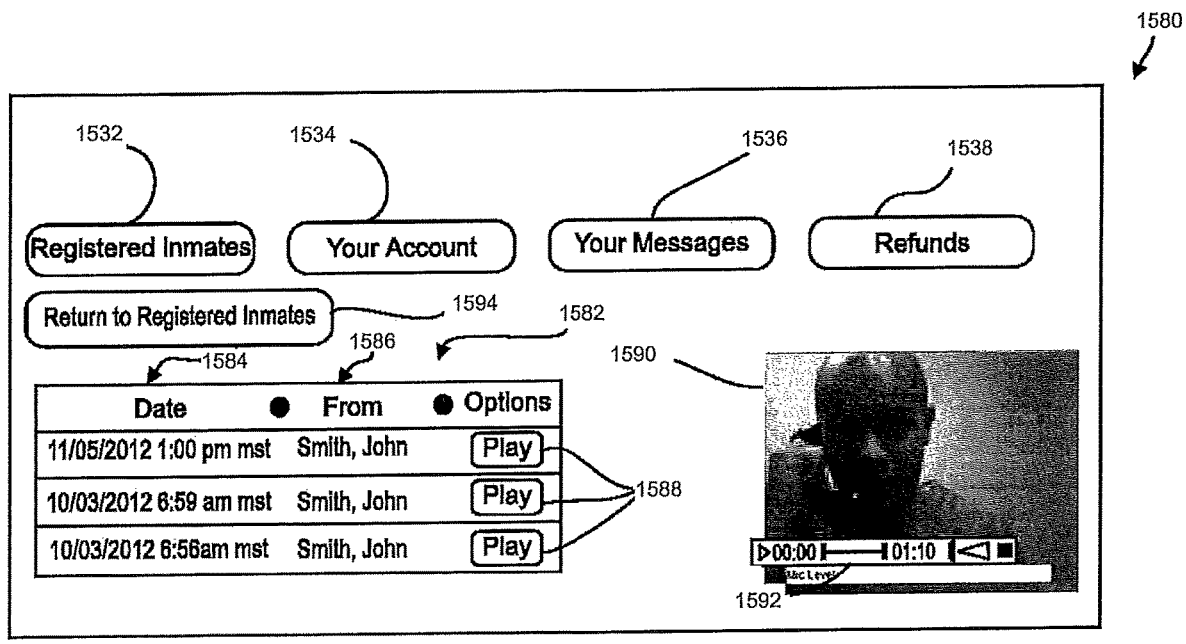
FIG. 11d is a screen shot of a visitor's view and play messages process in accordance with one exemplary embodiment.
Figure 11B:
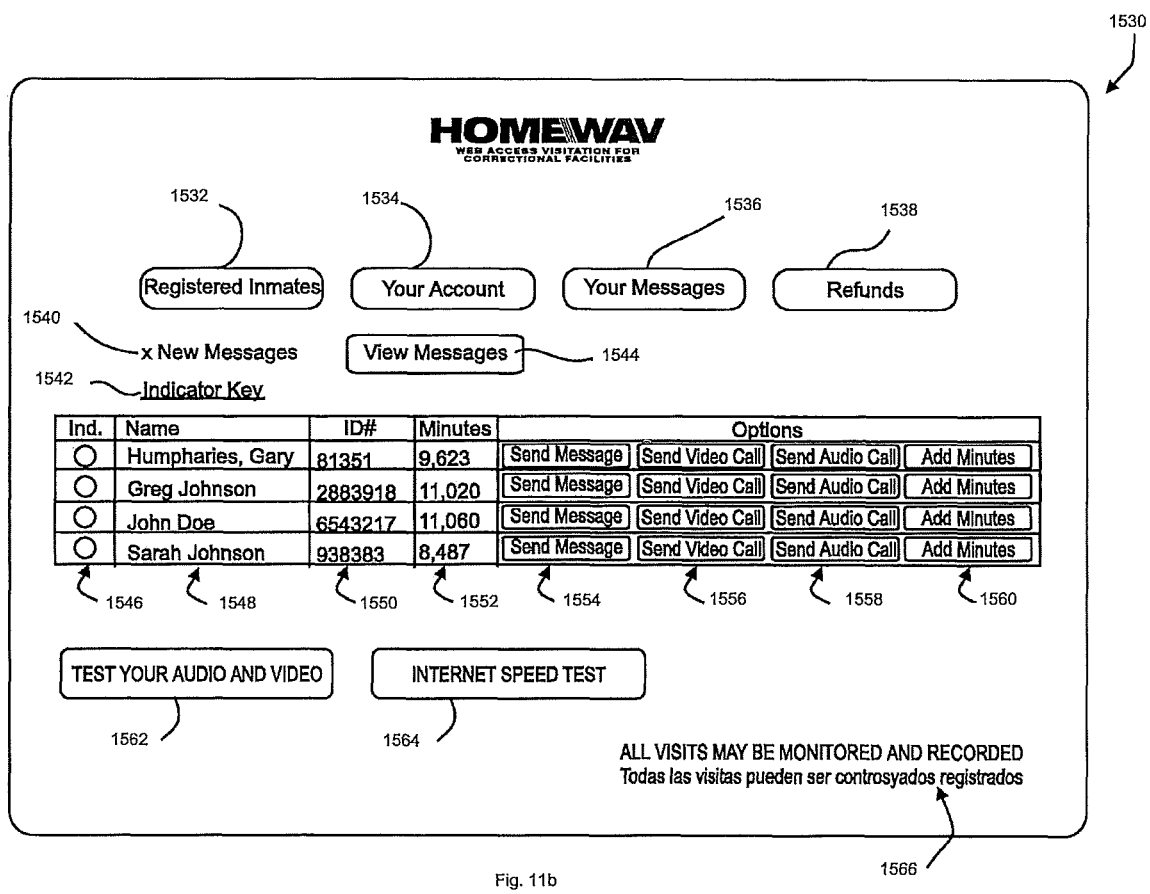
FIG. 11b is a screen shot of the Registered Inmate screen in accordance with one exemplary embodiment.

Upon logging in, the user is presented with screen 1530 (FIG. 11*b*), the Registered Inmates Screen. All visitor actions are initiated from screen 1530.

Figure 11C:
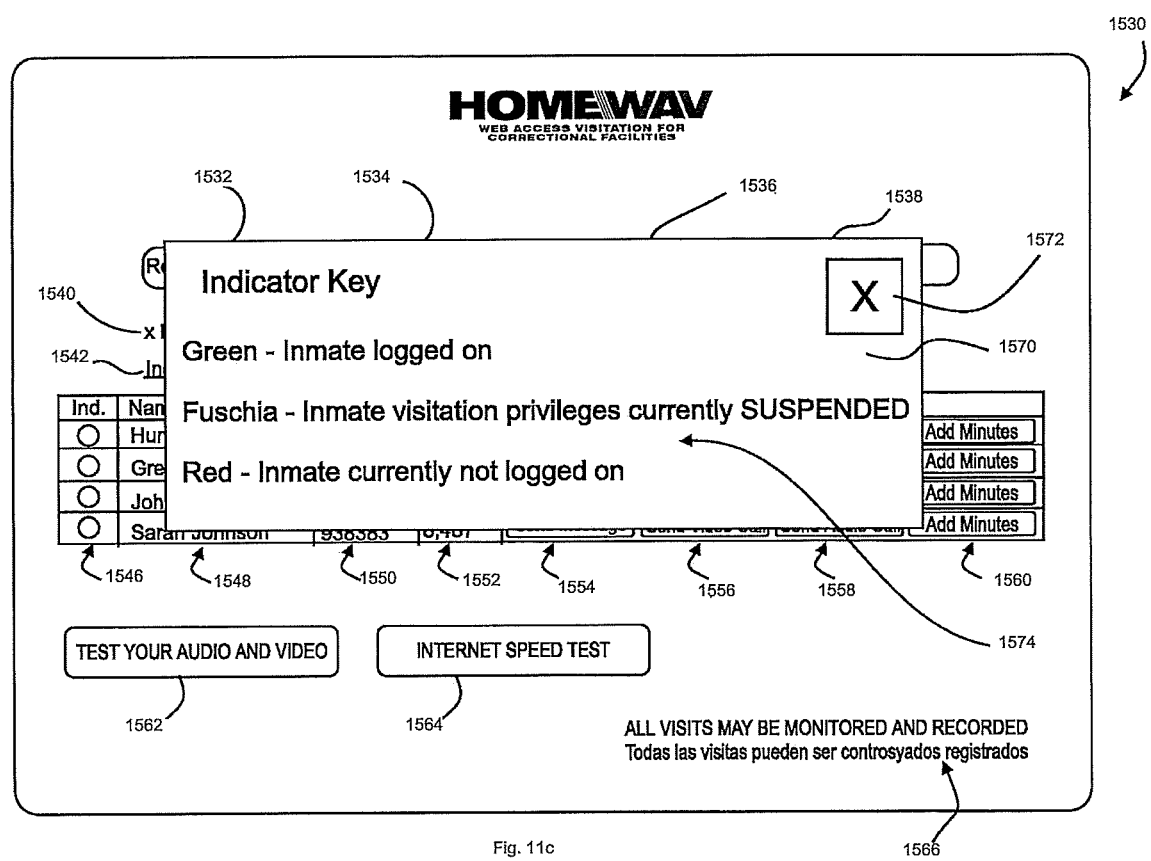
FIG. 11c is a screen shot of the Registered Inmate screen of FIG. 4b with a pop-up window displayed in accordance with one exemplary embodiment.

An "Indicator" link 1542, when selected, causes a pop-up box 1570 to appear. Pop-up box is shown in FIG. 11*c* overlying screen 1530. Pop-up box 1570 provides definitions 1574 of colors displayed in an Indicator (Ind.) field 1546 on screen 1530. A green indicator shows that an inmate is logged into the HomeWAV system. A fuchsia indicator shows that the particular inmate has had his or her privileges suspended and is unavailable for either a video visit or VoIP telecommunication. A red indicator shows that the particular inmate is currently not logged into the HomeWAV system. Pop-up screen 1570 is closed by selecting the close button 1572.

One of the selectable actions available to the registered visitor is to view messages received from an inmate. A "New Messages" shows a count 1540 of messages received but not yet viewed by the visitor. Pressing the "View Messages" button 1544 causes a "View Incoming Messages" screen 1580 (FIG. 11*d*) to be displayed.

Screen 1580 shows a list 1582 of received messages. Each message has a date & time stamp 1584, an inmate name 1586 and an associated "Play" button 1588.

Selecting a "Play" button 1588 associated with the message desired to be played displays the message in a display window 1590. A playback control panel 1590 controls playback control using standard symbols believed to be universally known. Playback control panel 1592 typically contains "Stop" and "Play" control, a "Speaker Volume Control", and "Elapsed Time Display", etc. None of these playback controls are individually identified. It will be recognized that other control may be added or some existing controls may be removed. Consequently, the disclosure is not considered limited to a particular set of playback controls. Rather, the disclosure is intended to include any combination of playback controls.

Each video message received may be viewed a predetermined number of times after which it will be automatically erased from the System. The number of times is typically chosen by the system operator (i.e., HomeWAV).

When a visitor has played all messages of interest, selecting "Return to Registered Inmates" control 1594 returns the user to Registered Inmates Screen 1530.

For each inmate name 1548, four action buttons are provided: "Send Message", "Send Video Call", "Send Audio Call", And "Add Minutes".

Figure 11E:
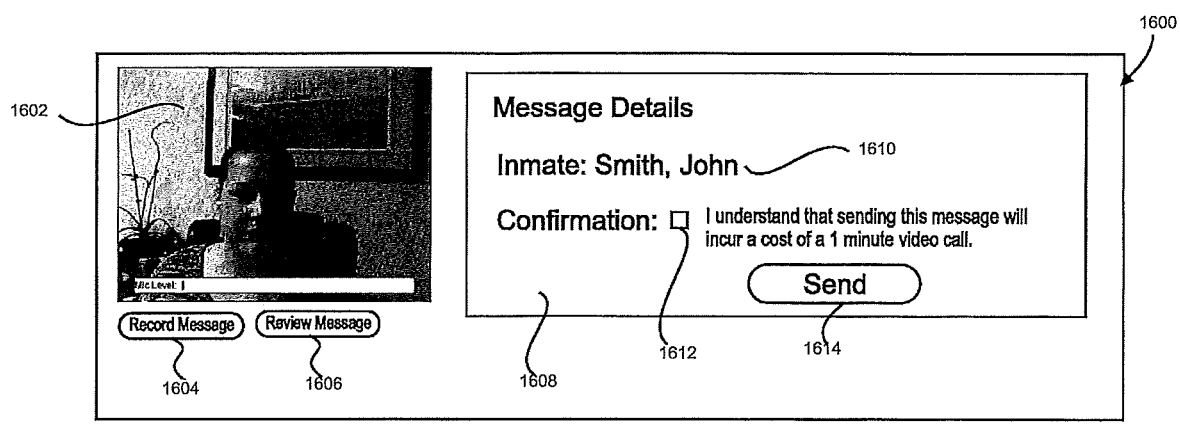
FIGS. 11e through 11g are screen shots of a visitor's record and send a message process in accordance with one exemplary embodiment.
Figure 11F:
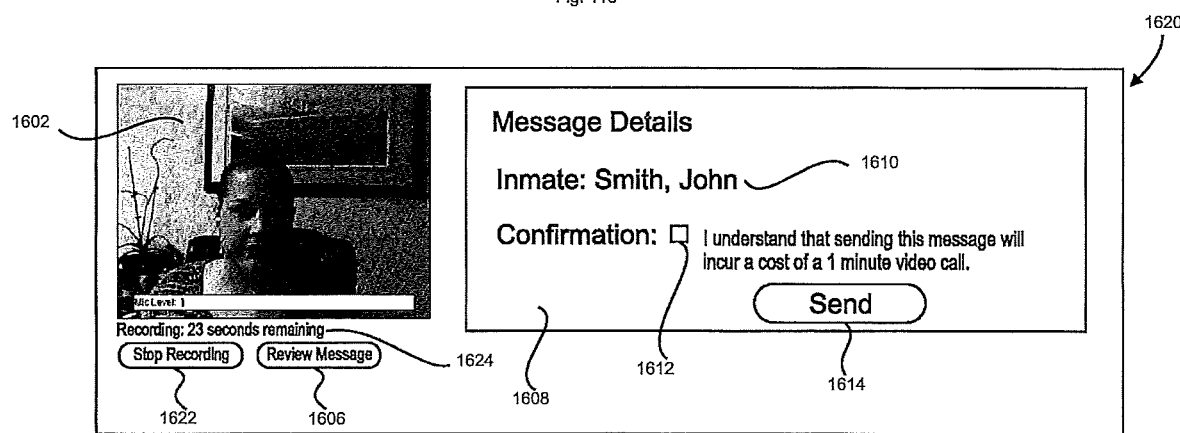

When the visitor selects the "Send Message" button 1554, screen 1600 (FIG. 11*e*) is presented. An image 1602 of the visitor is displayed and two recording controls "Record Message" 1604 and "Review Message" 1606 may be selected by the visitor. When "Record Message" button 1604 is selected, screen 1620 (FIG. 11*f*) replaces screen 1600. Screen 1620 is similar to screen 1600 except that the recording controls now consist of "Stop Recording" 1622 and "Review Recording" 1606. A status line 1624 displays a message that a recording is in process and the time remaining for the recorded message.

Figure 11G:
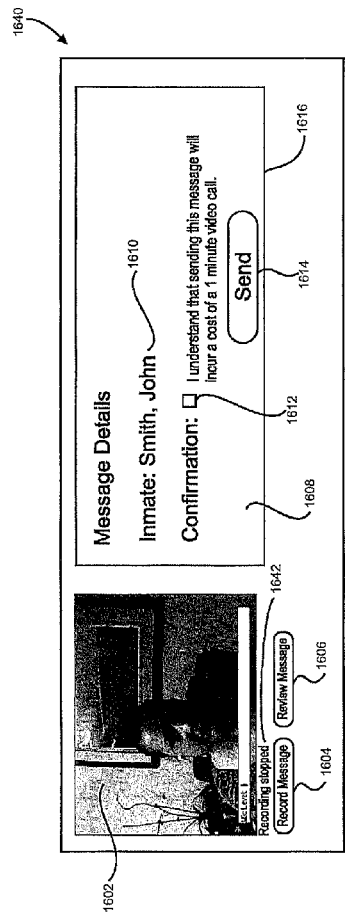

Upon selecting the "Stop Recording" control 1622, a third screen, screen 1640 (FIG. 11*g*) is displayed. Screen 1640 is similar to both screen 1600 and 1620. Recording controls again consist of "Record Message" 1604 and "Review Recording" 1606. A status line 1642 shows that the recording process is stopped.

All of the screens 1600, 1620, and 1640 have a message details box 1616 that displays the name of the inmate selected to receive the message, 1610. In addition, a "Send" button is included to actually send the message to the inmate 1610. However, before the message is sent, the visitor should acknowledge that the cost of sending the message will be the cost of one video minute. The user acknowledges this by clicking check box 1612. Once acknowledged, the message is sent when the "Send" button is selected.

Once the message is sent, the visitor is returned to the Registered Inmates Screen 1530.

Figure 11H:
FIG. 11h is a screen shot of the process whereby a visitor initiates a video visit in accordance with one exemplary embodiment.

If the visitor wishes to initiate a video visit, he or she selects "Send Video Call" 1556 and a new screen 1660 (FIG. 11*h*) is presented.

Screen 1660 displays a status message "Visit Started" 1662. In addition, another status message 1666 displays the name of the inmate being called.

A Cancel button 1666 may be selected to cancel the establishment of a video visit. An additional control 1668 likewise cancels the establishment of a video visit.

If cancelled, the visitor is returned to the Registered Inmates Screen 1530.

Figure 11I:
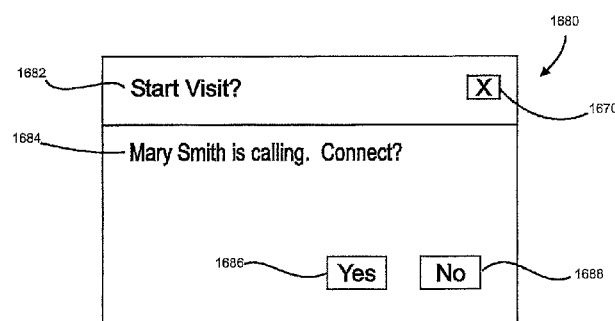
FIG. 11i is a screen shot of an inmate's alert screen that a visitor is attempting to initiate a video visit in accordance with one exemplary embodiment.

If the device 1100*x* in possession of the inmate being called is turned on and, assuming that the inmate's privileges have not been suspended, inmate's device 1100*x* displays screen 1680 (FIG. 11*i*).

Screen 1680 displays the message "Start Visit" 1682. A message "Mary Smith is calling. Connect?" 1684 is also displayed. The inmate should use either "Yes" button 1686 or "No" button 1688 to either accept or reject the visit, respectively. A control 1670 also declines the visit and returns the inmate's device to its home screen 1370 (FIG. 10*h*).

Figure 11J:
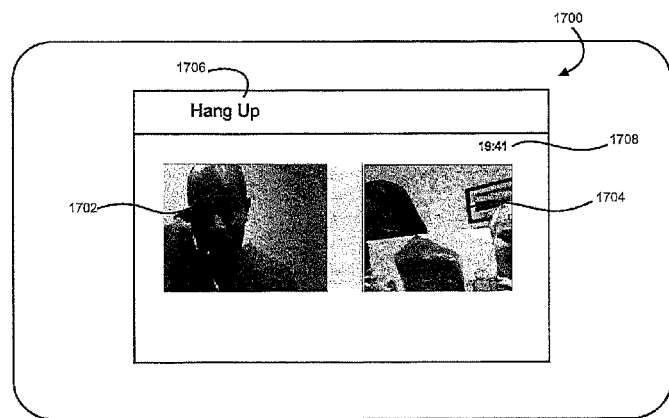
FIG. 11j is a screen shot of a video visit from the visitor's point of view in accordance with one exemplary embodiment.

If the inmate chooses to accept the visit by selecting the "Yes" button 1686 screen 1700 (FIG. 11*j*) is displayed on the visitors screen. Screen 1700 displays images of the inmate being called and the visitor at reference numbers 1702, 1704, respectively. The maximum time remaining for the visit 1708 is also displayed. The visit may be terminated by the visitor by selecting the "Hang Up" control 1706. When the video visit is complete, the visitor is returned to the "Registered Inmates Screen" 1530.

Figure 11K:
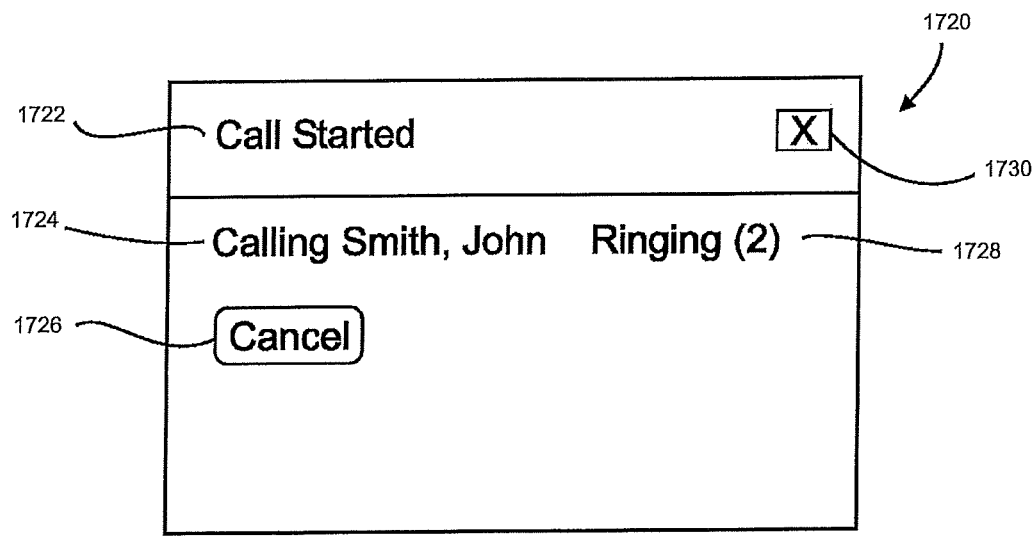
FIG. 11k is a screen shot of the process whereby a visitor initiates a VoIP telecommunication in accordance with one exemplary embodiment.

A visitor may initiate a VoIP telecommunication with the selected inmate by selecting a "Send Audio Call" button 1558 associated with the desired inmate from the Registered Inmates Screen 1530. Upon selecting the "Send Audio Call" button 1558, screen 1720 (FIG. 11*k*) is presented. Screen 1720 indicates that the call is started 1722. A message "Calling Smith, John" 1724 is also displayed. A ring count 1728 shows the number of times the inmate's phone has rung. A "Cancel" button 1726 may be used by the visitor to terminate the call. Another control 1730 also terminates the calling attempt and returns the visitor to the "Registered Inmates Screen" 1530.

Figure 11L:
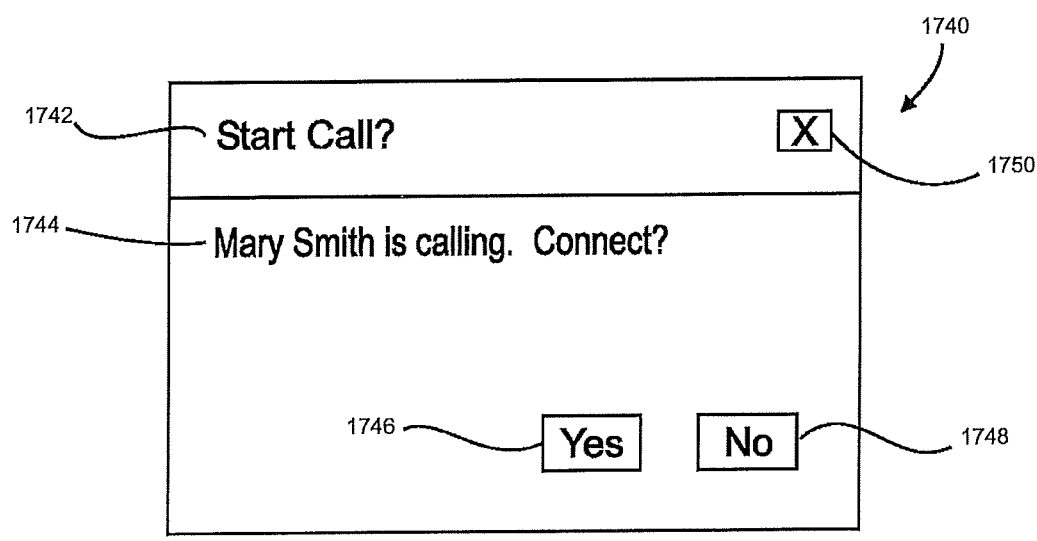
FIG. 11l is a screen shot of an inmate's alert screen that a visitor is attempting to initiate a VoIP telecommunication in accordance with one exemplary embodiment.

If the device 1100*x* in possession of the inmate being called is turned on and, assuming that the inmate's privileges have not been suspended, screen 1104 of inmate's device 1100*x* displays screen 1740 (FIG. 11*l*).

Screen 1740 displays the message "Start Call? 1742. A message "Mary Smith is calling. Connect?" 1744 is also displayed. The inmate should use either "Yes" button 1746 or "No" button 1748 to either accept or reject the call, respectively. A control 1750 also declines the call a returns the inmate's device to its home screen 1370 (FIG. 10*h*).

Figure 11M:
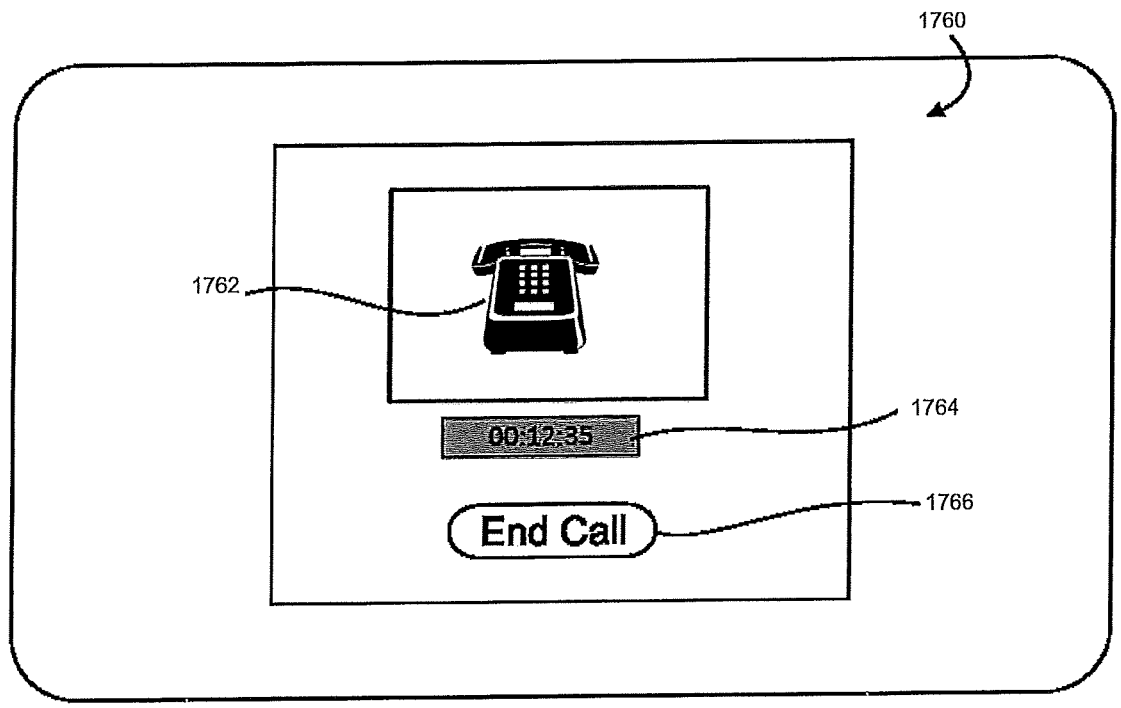
FIG. 11m is a screen shot of a VoIP telecommunication screen from the point of view of the visitor in accordance with one exemplary embodiment.
Figure 11N:
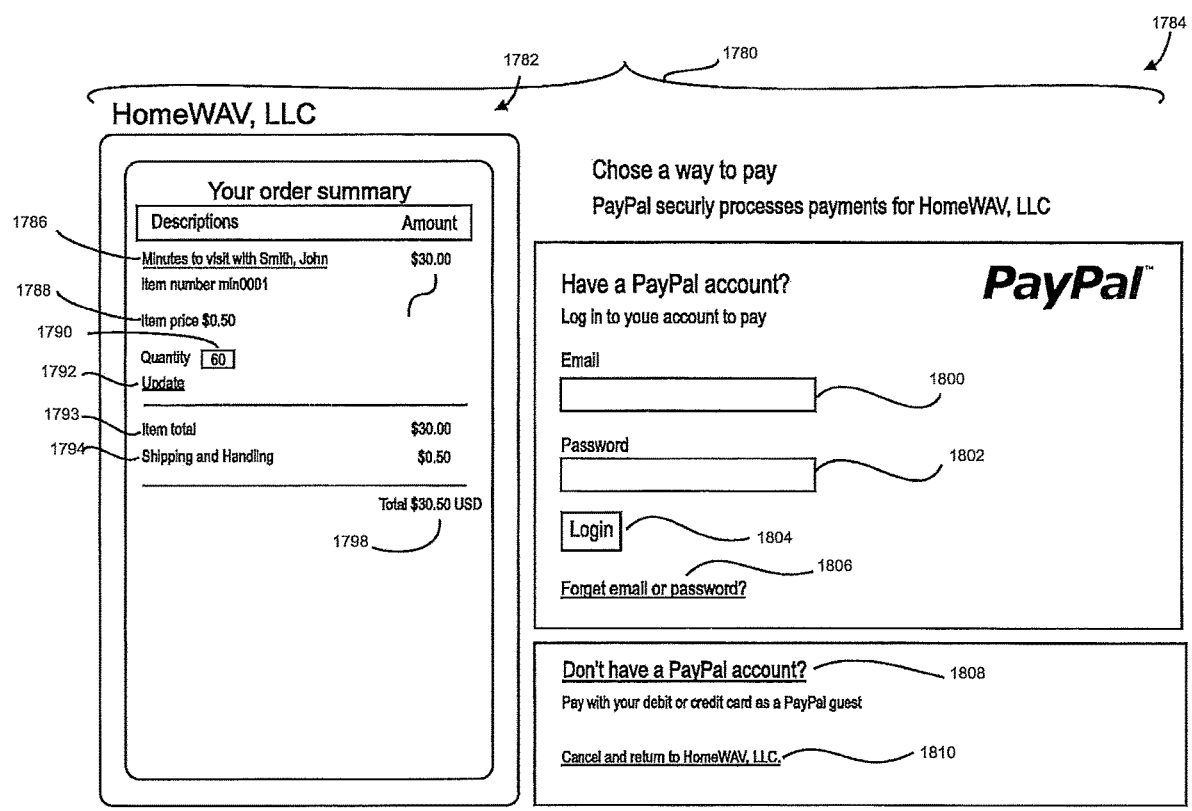
FIG. 11n is a screen shot of the add minutes process in accordance with one exemplary embodiment.

If the inmate chooses to accept the call by selecting the "Yes" button 1746 screen 1760 (FIG. 11*m*) is displayed on the visitors screen. A telephone icon 1762 remains on the visitor's screen for the duration of the call.

The call duration 1764 is displayed on the visitor's screen 1760.

An "End Call" button 1766 provides a mechanism whereby the visitor may terminate the call.

When the VoIP call is ended, the visitor is returned to the Registered Inmate Screen 1530.

Finally, the visitor may add funds to an account associated with a particular inmate. By selecting the "Add Minutes" button 1560 associated with the particular inmate, the new screen 1780 is displayed on the visitor's screen. Screen 1780 has two portions, a HomeWAV order portion 1782 and a PayPal payment portion 1784.

Screen 1784 displays "Minutes to visit with Smith, John" 1786. The price per minute (i.e., Item price) 1788, usually set by the system operator, is also displayed.

The visitor enters the number of minutes he or she wishes to purchase in a quantity box 1790. Selecting the "Update" link 1792 updates the Item Total 1793.

A Shipping and Handling charge 1794 may be imposed by the system operator. In the case chosen for purposes of disclosure, the Shipping and Handling charge 1794 is $0.50.

Finally, the total for the transaction 1798 is displayed.

The only way to add funds to an inmate's visitation account is by using an on-line payment service. The well known PayPal® has been chosen for purposes of disclosure. Those of skill in the art will recognize that other on-line payment services exist, any suitable one of which may be substituted for PayPal®. Consequently, the disclosure is intended to include any suitable on-line payment service. Consequently, the disclosure is not considered limited to the PayPal® on-line payment service chosen for purposes of disclosure.

Assuming the visitor has previously set up a PayPal account, he or she enters an e-mail address 1800 and a password 1802, and selects the Login button to sign in to their PayPal® account. Once signed in the financial transaction is completed.

If the user does not already have a PayPal® account set up, the "Don't have a PayPal account?" link 1808 is selected.

A "Cancel and return to HomeWAV, LLC". Link 1810 terminates the Add Minutes operation.

At the conclusion of the "Add Minutes" process, the user is returned to the Registered Inmates Screen" 1530.

The operation of the novel inmate visitation system of the present disclosure wherein either inmates or visitors may originate video visitations or VoIP telecommunications has been described in detail hereinabove. It will be recognized that the operation of the inventive system depends upon "infrastructure" described in detail in the '569 Patent. For that reason, some points regarding the information described and claim in the '569 Patent are reiterated below.

As has been described in detail in the priority '569 Patent a prison administrator workstation (PAWS) may be located within the prison and also connected to either a network or directly to a network controller and/or switch. In alternate embodiments, the PAWS may have its own modem associated and connected directly to the Internet. Also the PAWS may be located outside the prison when desired.

An Internet connection is typically provided between Internet interface/modem and the Internet "cloud" represented schematically at reference number 214 in FIG. 2 of the '569 Patent.

A visitor workstation or Internet "appliance" also described in detail in the '569 Patent is also connected to Internet by a suitable Internet connection.

A HomeWAV, LLC website supports a web server. The web server runs application code that implements the applications of the novel remote web-based visitation system of the disclosure. In the embodiment chosen for purposes of disclosure, the applications, discussed in detail herein below, are implemented in either JAVA or PHP (http://www.php-.net). PHP is a server-side HTML embedded scripting language that provides web developers with a full suite of tools for building dynamic websites. In addition, some custom Adobe® Flash® ActionScript codes are provided to interact with flash.homeway.com discussed in detail in the '569 Patent. ActionScript is a dialect of ECMAScript (i.e., it is a superset of the syntax and semantics of the language more widely known JavaScript), and is used primarily for the development of websites and software targeting the Adobe Flash Player platform. ECMAScript is the scripting language standardized by Ecma International in the ECMA-262 specification and ISO/IEC 16262 specifications. The language is widely used for client-side scripting on the web.

It will be recognized that website design and implementation is believed to be well known to those of skill in the art. Consequently, alternate web development tools/languages may be utilized to develop similar applications. Consequently, the disclosure is not considered limited to the development tools and/or languages chosen for purposes of disclosure. Rather, the disclosure is intended to include any suitable languages, scripts, etc.

The HomeWAV, LLC website also embodies and supports storage provided to contain application code and the databases necessary to implement the remote web-based visitation system of the disclosure.

A second website associated with the remote web-based visitation system of the disclosure is Flash.HomeWAV.com website. Flash.HomeWAV.com website records and stores all audio/video (A/V) visits. As discussed in detail in the '569 Patent, certain A/V visits by clergy or legal representatives may be exempt from recording. Typically, all other A/V visits are recorded by one or more A/V servers. Storage devices retain A/V transcripts of all visits not exempt from the recording requirement.

Finally, one or more HomeWAV Administrators at workstations that include a computer and a modem that are connected to the Internet through an Internet connection provide certain gate keeping and administrative functions by interacting with HomeWAV website. Such gate keeping and administrative functions are also discussed in detail in the '569 Patent.

Since other modifications and changes varied to fit particular operating requirements and environments will be apparent to those skilled in the art, the disclosure is not considered limited to the example chosen for purposes of disclosure, and covers all changes and modifications which do not constitute departures from the true spirit and scope of this disclosure.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A computer-implemented visitation system for a population of incarcerated inmates in a correctional facility, the system comprising:
    at least one inmate computer device in the correctional facility, the at least one inmate computer device comprising a processor, a display and an input element for use by an incarcerated inmate, the at least one inmate computer device being pre-programmed to communicate exclusively with a visitation services computer system;
    at least one database including data and information regarding the correctional facility, authorization data and information for the population of incarcerated inmates to access visitation services, visitation privilege status data and information for the population of incarcerated inmates, and financial account information for visitation session charges;
    wherein the at least one inmate computer device is configured, via an inmate interface presented on the inmate computer device, to:
        accept login credentials from an inmate user to uniquely identify and confirm the inmate user as a pre-registered authorized inmate user having active visitation privileges to conduct a visitation session in the correctional facility according to the data and information the database; and
        accept a selection from the pre-registered authorized inmate user to initiate a visitation session with a remotely located non-incarcerated visitor without requiring endpoint control to schedule or initiate the visitation session by administrative personnel of the correctional facility;
    wherein the visitation services computer system is configured to:
        receive the accepted selection from the pre-registered authorized inmate user;
        transmit a text message to a visitor computer device of the remotely located non-incarcerated visitor, the text message including an invitation to a visitation session with the pre-registered authorized inmate user; and
        establish, when funds exist in a financial account to apply to a charge for the visitation session and when the visitor accepts the invitation via the visitor computer device, an interconnection between the visitor computer device and the at least one inmate computer device to commence an electronic visitation session.

2. The computer-implemented system of claim 1, wherein the at least one inmate computer device is further configured to complete the electronic visitation session, via the established interconnection and via the inmate interface of the at least one inmate computer device, without requiring endpoint control to terminate the visitation session by administrative personnel of the correctional facility.

3. The computer-implemented system of claim 1, wherein the electronic visitation session is an audio/video visitation session.

4. The computer-implemented system of claim 1, wherein the at least one inmate computer device is further configured to display, via the inmate interface, a time remaining for an electronic visitation session in progress, the displayed time remaining being based upon a maximum visitation session time limit determined by the correctional facility or the amount of funds available in the financial account.

5. The computer-implemented system of claim 4, wherein the financial account includes prepaid funds that are applied to the electronic visitation session on a per minute basis, and wherein the displayed time remaining is based on the amount of prepaid funds at a predetermined per minute charge.

6. The computer-implemented system of claim 1, wherein the electronic visitation session is recorded for subsequent monitoring by personnel of the correctional facility unless the electronic visitation session has a privileged communication status.

7. The computer-implemented system of claim 1, the system further comprising an administrator computer device, wherein the electronic visitation session is monitored in real-time by personnel of the correctional facility, via the administrator computer device, unless the electronic visitation session has a privileged communication status.

8. The computer-implemented system of claim 1, wherein the at least one inmate computer device is further configured to:
    display, on the inmate interface, a plurality of pre-registered remotely located non-incarcerated visitors to the confirmed pre-registered authorized inmate user and a status of each of the plurality of pre-registered remotely located, non-incarcerated visitors as available or not available for an electronic visitation session with the confirmed pre-registered authorized inmate user; and
    accept a selection of one of the plurality of pre-registered remotely located, non-incarcerated visitors by the pre-registered authorized inmate user to initiate an electronic visitation session without requiring endpoint control to schedule, initiate, or terminate the visitation session by administrative personnel of the correctional facility.

9. The computer-implemented system of claim 1, wherein the at least one inmate computer device is further configured to:
    display, on the inmate interface, an option to record a message for a remotely located non-incarcerated visitor; and
    record the message via the inmate interface of the at least one inmate computer device.

10. The computer-implemented system of claim 9, wherein the at least one inmate computer device is configured to record a video message.

11. The computer-implemented system of claim 1, wherein the at least one inmate computer device is further configured to:
    display, on the inmate interface, an option to receive a message from a remotely located non-incarcerated visitor; and
    playback the message via the inmate interface of the at least one inmate computer device.

12. The computer-implemented system of claim 11, wherein the at least one inmate computer device is further configured to playback a video message.

13. The computer-implemented system of claim 1, wherein the visitation services computer system is a server-based system.

14. The computer-implemented system of claim 1, wherein the visitation services computer system is remotely located from the correctional facility.

15. The computer-implemented system of claim 1, wherein the at least one inmate computer device is a jail-hardened device.

16. The computer-implemented system of claim 1, wherein the at least one inmate computer device is a portable computing device.

17. The computer-implemented system of claim 1, wherein the at least one inmate computer device has a touch screen.

18. The computer-implemented system of claim 1, wherein the at least one inmate computer device is a tablet computer.

19. A computer-implemented visitation system for a population of incarcerated inmates in a correctional facility, the system comprising:
    a visitation services computer device in communication with a database including authorized inmate user data and information for the population of incarcerated inmates, and visitation privilege status information for the population of incarcerated inmates: and
    an inmate computer device in the correctional facility, the inmate computer device comprising a processor, a display and an input element for use by an incarcerated inmate user in the correctional facility, the inmate computer device being pre-programmed to communicate exclusively with the visitation services computer device;
    wherein the inmate computer device is configured, via an inmate interface presented on the inmate computer device, to:
        present an option to a uniquely identified one of an authorized inmate user in the population of incarcerated inmates, as determined by the authorized user data and information and the privilege status information in the database, to initiate an electronic visitation session with a remotely located non-incarcerated visitor without requiring endpoint control to schedule or initiate a visitation session by administrative personnel of the facility;
    wherein the visitation services computer device is configured to:
        when the option to the uniquely identified one of an authorized inmate user to initiate an electronic visitation session is selected, transmit a text message to a visitor computer device of the remotely located non-incarcerated visitor, the text message including an invitation to an electronic visitation session with the pre-registered authorized inmate user; and
        establish an interconnection between the visitor computer device and the inmate computer device when prepaid funds exist to apply to a visitation session and when the remotely located non-incarcerated visitor accepts the invitation via the visitor computer device, the interconnection being established for a time duration up to a maximum time limit determined by the correctional facility or until existing prepaid funds are depleted;
    wherein the inmate computer device is operable to complete the electronic visitation session, via the inmate interface of the inmate computer device, with the remotely located non-incarcerated visitor without requiring endpoint control to terminate the electronic visitation session by administrative personnel of the correctional facility; and
    wherein the inmate computer device is a jail-hardened device or a portable device.

20. The computer-implemented system of claim 19, wherein the visitation services computer device comprises at least one computer server.

21. A computer-implemented visitation system for incarcerated inmates in a correctional facility, the system comprising:
    at least one computer device in communication with a database including authorized user data and information for the incarcerated inmates and financial account information linked to authorized inmate users for visitation services charges, the at least one computer device being configured to:
        determine, according to the authorized user data and information for the incarcerated inmates in the database, whether a uniquely identified inmate user in the correctional facility is authorized and has active privilege status to participate in an electronic visitation session;
        present an inmate interface to the uniquely identified authorized inmate user having active privilege status to participate in a visitation session, the inmate interface including an option to initiate an electronic visitation session with an identified non-incarcerated visitor at a remote location without requiring endpoint control to schedule or initiate the visitation session by administrative personnel of the correctional facility;

when the option to initiate the visitation session is selected by the uniquely identified authorized inmate user in the correctional facility, authorize and transmit a text message to the identified non-incarcerated visitor at the remote location, the text message including an invitation to an electronic visitation session with the uniquely identified authorized inmate user;

when financial funds are determined to exist to apply to an electronic visitation session and when the identified non-incarcerated visitor accepts the invitation from the remote location, establish an electronic visitation session between the uniquely identified authorized inmate user in the correctional facility and the identified non-incarcerated visitor at the remote location for a time duration up to a maximum time limit determined by the correctional facility or until existing financial funds are depleted; and unless the visitation session has a privileged communication status, provide access to personnel of the correctional facility to monitor possible security breaches in the established electronic visitation session.

22. The computer system of claim 21, wherein the at least one computer device is further configured to terminate the electronic visitation session at the option of the uniquely identified authorized inmate user without requiring endpoint control to terminate the visitation session by administrative personnel of the correctional facility.

23. The computer system of claim 21, wherein the at least one computer device includes a combination of computer devices including at least one computer server.

24. The computer system of claim 21, wherein the at least one computer device includes a combination of computer devices including at least one portable computer device.

25. The computer system of claim 24, wherein the at least one computer device includes at least one tablet computer or a smartphone.

26. The computer system of claim 21, wherein the at least one computer device includes an inmate computing device and a server-based visitation services computer system.

27. The computer system of claim 26, further comprising an administrator computer device and a visitor computer device.

28. The computer system of claim 27, wherein the inmate computer device, the administrator computer device, and the visitor device are selected from the group of a jail-hardened device, a desktop computer, a laptop computer, a notebook computer, a tablet computer, a smartphone and combinations thereof.

29. The computer system of claim 21, wherein the at least one computer device includes an inmate computer device having a touch screen.

30. The computer system of claim 21, wherein the at least one computer device records the established electronic visitation session unless the visitation session has a privileged communication status.

* * * * *